United States Patent
Takano

(10) Patent No.: US 11,284,290 B2
(45) Date of Patent: Mar. 22, 2022

(54) TERMINAL DEVICE, COMMUNICATION CONTROL DEVICE, BASE STATION, GATEWAY DEVICE, CONTROL DEVICE, METHOD, AND RECORDING MEDIUM

(71) Applicant: Sony Corporation, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/971,311

(22) PCT Filed: Jan. 22, 2019

(86) PCT No.: PCT/JP2019/001754
§ 371 (c)(1),
(2) Date: Aug. 20, 2020

(87) PCT Pub. No.: WO2019/167474
PCT Pub. Date: Sep. 6, 2019

(65) Prior Publication Data
US 2021/0084525 A1   Mar. 18, 2021

(30) Foreign Application Priority Data

Feb. 27, 2018   (JP) .............................. JP2018-032710

(51) Int. Cl.
*H04W 28/02*   (2009.01)
*H04W 72/04*   (2009.01)
(Continued)

(52) U.S. Cl.
CPC ... *H04W 28/0268* (2013.01); *H04W 72/0486* (2013.01)

(58) Field of Classification Search
CPC ......... H04W 28/0268; H04W 72/0486; H04W 28/16; H04W 4/06; H04W 88/18
See application file for complete search history.

(56) References Cited

U.S. PATENT DOCUMENTS

| 10,805,847 | B2 * | 10/2020 | Ke ................. H04W 28/0268 |
| 2011/0069684 | A1 * | 3/2011 | Jeon ............... H04W 72/0406 |
| | | | 370/336 |

(Continued)

FOREIGN PATENT DOCUMENTS

| JP | 2012-009987 A | 1/2012 |
| JP | 2017-200172 A | 11/2017 |

(Continued)

OTHER PUBLICATIONS

International Search Report and Written Opinion dated Apr. 16, 2019 for PCT/JP2019/001754 filed on Jan. 22, 2019, 11 pages including English Translation of the International Search Report.

(Continued)

*Primary Examiner* — Harry H Kim
(74) *Attorney, Agent, or Firm* — Xsensus LLP

(57) ABSTRACT

A method and corresponding terminal device that performs communication using at least one of a plurality, of network slices and includes a control circuitry that reports information used to determine a resource allocation to a network slice of the plurality of network slices used by the terminal device to a communication control device that controls the plurality of network slices.

10 Claims, 26 Drawing Sheets

(51) Int. Cl.
    *H04W 28/16*  (2009.01)
    *H04W 4/06*   (2009.01)
    *H04W 88/18*  (2009.01)

(56) References Cited

U.S. PATENT DOCUMENTS

| | | | |
|---|---|---|---|
| 2011/0235600 A1* | 9/2011 | Sun | H04W 72/1215 |
| | | | 370/329 |
| 2019/0306872 A1* | 10/2019 | Paredes Cabrera | H04L 5/0082 |
| 2020/0267753 A1* | 8/2020 | Adjakple | H04W 72/1226 |
| 2020/0367109 A1* | 11/2020 | Chen | H04W 28/24 |

FOREIGN PATENT DOCUMENTS

| | | |
|---|---|---|
| WO | 2016/175255 A1 | 11/2016 |
| WO | 2017/110678 A1 | 6/2017 |
| WO | 2018/034156 A1 | 2/2018 |

OTHER PUBLICATIONS

3GPP, "3rd Generation Partnership Project; Technical Specification Group Services and System Aspects; Telecommunication management; Management of 5G networks and network slicing; Concepts, use cases and requirements," Release 15, 3GPP TS 28.530 V0.4.0, Dec. 2017, pp. 1-27.

* cited by examiner

TERMINAL DEVICE, COMMUNICATION CONTROL DEVICE, BASE STATION, GATEWAY DEVICE, CONTROL DEVICE, METHOD, AND RECORDING MEDIUM

CROSS-REFERENCE TO RELATED APPLICATIONS

The present application is based on PCT filing PCT/JP2019/001754, filed Jan. 22, 2019, which claims priority to JP 2018-032710, filed Feb. 27, 2018, the entire contents of each are incorporated herein by reference.

FIELD

The present disclosure relates to a terminal device, a communication control device, a base station, a gateway device, a control device, a method, and a recording medium.

BACKGROUND

In 3rd Generation Partnership Project (3GPP), a radio access system and a radio network (hereinafter, also referred to as "Long Term Evolution (LTE)", "LTE-Advanced (LTE-A)", "LTE-Advanced Pro (LTE-A Pro)", "New Radio (NR)", "New Radio Access Technology (NRAT)", "5G", "Evolved Universal Terrestrial Radio Access (EUTRA)", or "Further EUTRA (FEUTRA)") for cellular mobile communication have been examined. Meanwhile, in the following explanation, LTE includes LTE-A, LTE-A Pro, and EUTRA, and NR includes NRAT and FEUTRA. A base station device (a base station) in LTE is also referred to as an evolved NodeB (eNodeB), a base station device (a base station) in NR is also referred to as a gNodeB, and a terminal device (a mobile station, a mobile station device, or a terminal) in LTE and NR is also referred to as a User Equipment (UE). LTE and NR are cellular communication systems in which a plurality of areas that are covered by the base station devices are arranged in a cellular manner. A single base station device may manage a plurality of cells.

NR is a next generation radio access system following LTE, and is a Radio Access Technology (RAT) different from LTE. NR is an access technology that can deal with various use cases including Enhanced mobile broadband (eMBB), Massive machine type communications (mMTC), and Ultra reliable and low latency communications (URLLC). NR has been examined to realize a technical framework that is compatible with use scenarios, requirements, arrangement scenarios, and the like in the various use cases.

For example, in NR, a slicing technology for accommodating communication in a plurality of modes corresponding to various use cases has been examined. With the slicing technology, it is possible to share a logical network called a network slice (also simply referred to as a slice) in a single physical network. As for the slicing technology, for example, Patent Literature 1 discloses a technology for dynamically allocating a radio resource of a base station to a plurality of network slices provided by the base station.

CITATION LIST

Patent Literature

Patent Literature 1: JP 2017-200172 A

SUMMARY

Technical Problem

It has not been long since the slicing technology proposed in Patent Literature 1 described above or the like was developed, and therefore, it is hard to say that technologies for utilizing the network slice in various aspects are fully proposed. For example, a technology for appropriately allocating a resource to a network slice used by a specific terminal device is one of the technologies that are not fully proposed.

Therefore, in the present disclosure, a mechanism capable of appropriately allocating a resource to a network slice is proposed.

Solution to Problem

According to the present disclosure, a terminal device is provided that performs communication using at least any of network slices, the terminal device includes: a control unit configured to report information to a communication control device, the information being used to determine resource allocation to a network slice used by the terminal device, the communication control device controlling the plurality of network slices.

Moreover, according to the present disclosure, a communication control device is provided that controls a plurality of network slices, the communication control device includes: a control unit configured to determine resource allocation to a network slice used by a terminal device that performs communication using at least any of the network slices, on the basis of information that is reported from the terminal device and that is used to determine resource allocation to the network slice used by the terminal device.

Moreover, according to the present disclosure, a base station is provided that provides a radio communication service to a terminal device that performs communication using at least any of network slices, the base station includes: a control unit configured to report second information to a communication control device, the second information being used to determine resource allocation to a network slice used by the terminal device, the communication control device controlling the plurality of network slices.

Moreover, according to the present disclosure, a gateway device is provided that relays information that is transmitted and received by a terminal device that performs communication using at least any of network slices, the gateway device includes: a control unit configured to report second information to a communication control device, the second information being used to determine resource allocation to a network slice used by the terminal device, the communication control device controlling the plurality of network slices.

Moreover, according to the present disclosure, a control device is provided that provides a service using a network slice to a terminal device that performs communication using at least any of network slices, the control device comprising: a control unit configured to report first information to a communication control device, the first information being used to determine resource allocation to a network slice used by the terminal device, the communication control device controlling the plurality of network slices.

Moreover, according to the present disclosure, a method is provided that implemented by a terminal device that performs communication using at least any of network slices, the method includes: reporting information to a communication control device, the information being used to determine resource allocation to a network slice used by the terminal device, the communication control device controlling the plurality of network slices.

Moreover, according to the present disclosure, a method is provided that implemented by a communication control device that controls a plurality of network slices, the method includes: determining resource allocation to a network slice used by a terminal device that performs communication using at least any of the network slices, on the basis of information that is reported from the terminal device and that is used to determine resource allocation to the network slice used by the terminal device.

Moreover, according to the present disclosure, a method is provided that implemented by a base station that provides a radio communication service to a terminal device that performs communication using at least any of network slices, the method includes: reporting second information to a communication control device, the second information being used to determine resource allocation to a network slice used by the terminal device, the communication control device controlling the plurality of network slices.

Moreover, according to the present disclosure, a method is provided that implemented by a gateway device that relays information that is transmitted and received by a terminal device that performs communication using at least any of network slices, the method includes: reporting second information to a communication control device, the second information being used to determine resource allocation to a network slice used by the terminal device, the communication control device controlling the plurality of network slices.

Moreover, according to the present disclosure, a method is provided that implemented by a control device that provides a service using a network slice to a terminal device that performs communication using at least any of network slices, the method includes: reporting first information to a communication control device, the first information being used to determine resource allocation to a network slice used by the terminal device, the communication control device controlling the plurality of network slices.

Moreover, according to the present disclosure, a recording medium is provided that stores therein a program that causes a computer for controlling a terminal device that performs communication using at least any of network slices to execute: reporting information to a communication control device, the information being used to determine resource allocation to a network slice used by the terminal device, the communication control device controlling the plurality of network slices.

Moreover, according to the present disclosure, a recording medium is provided that stores therein a program that causes a computer for controlling a communication control device that controls a plurality of network slices to execute: determining resource allocation to a network slice used by a terminal device that performs communication using at least any of the network slices, on the basis of information that is reported from the terminal device and that is used to determine resource allocation to the network slice used by the terminal device.

Moreover, according to the present disclosure, a recording medium is provided that stores therein a program that causes a computer for controlling a base station that provides a radio communication service to a terminal device that performs communication using at least any of network slices to execute: reporting second information to a communication control device, the second information being used to determine resource allocation to a network slice used by the terminal device, the communication control device controlling the plurality of network slices.

Moreover, according to the present disclosure, a recording medium is provided that stores therein a program that causes a computer for controlling a gateway device that relays information that is transmitted and received by a terminal device that performs communication using at least any of network slices to execute: reporting second information to a communication control device, the second information being used to determine resource allocation to a network slice used by the terminal device, the communication control device controlling the plurality of network slices.

Moreover, according to the present disclosure, a recording medium is provided that stores therein a program that causes a computer for controlling a control device that provides a service using a network slice to a terminal device that performs communication using at least any of network slices to execute: reporting first information to a communication control device, the first information being used to determine resource allocation to a network slice used by the terminal device, the communication control device controlling the plurality of network slices.

Advantageous Effects of Invention

As described above, according to the present disclosure, a mechanism capable of appropriately allocating a resource to a network slice is provided. Meanwhile, the effects described above are not limitative. That is, with or in the place of the above effects, any of the effects described in this specification or other effects that can be recognized from this specification may be achieved.

DESCRIPTION OF EMBODIMENTS

Figure 1:
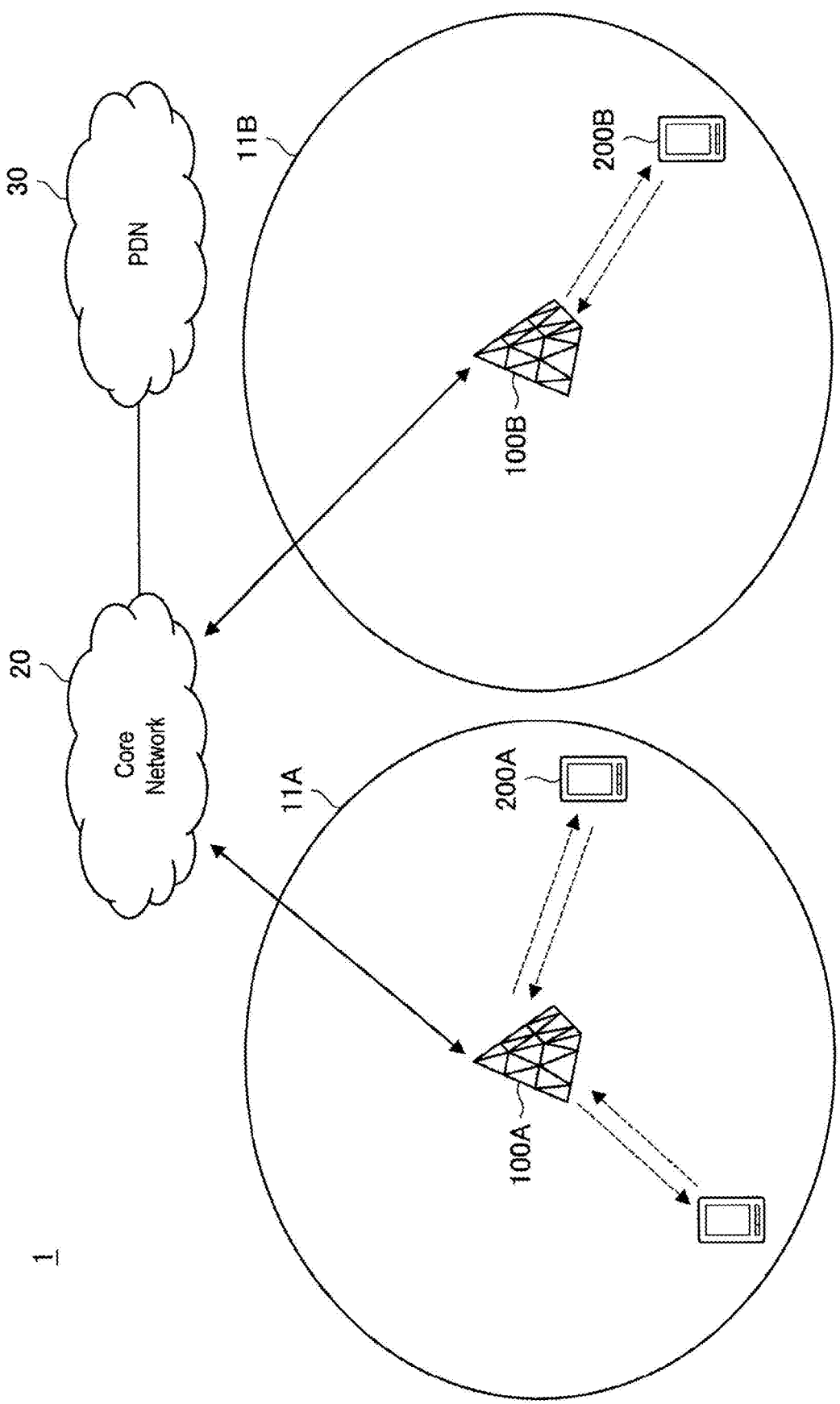
FIG. 1 is a diagram schematically illustrating an example of an overall configuration of a system according to one embodiment of the present disclosure.

Preferred embodiments of the present disclosure will be described in detail below with reference to the accompanying drawings. Meanwhile, in the present specification and the drawings, structural elements that have substantially the same functions and configurations will be denoted by the same reference symbols, and repeated explanation of the structural elements will be omitted.

In addition, hereinafter, explanation will be given in the following order.

1. Overview
1.1. System configuration example
1.2. Examination
1.3. Detailed configuration example of entire system
2. Configuration example of each of devices
2.1. Configuration example of base station
2.2. Configuration example of terminal device
2.3. Configuration example of NSME
2.4. Configuration example of service control device
2.5. Configuration example of gateway device
3. Technical feature
3.1. Segments of network slice
3.2. Control based on prediction of traffic
3.2.1. Technical problem
3.2.2. Technical feature
3.3 Control based on performance measurement result
3.3.1. Technical problem
3.3.2. Technical feature
4. Application examples
5. Conclusion

1. OVERVIEW

1.1. System Configuration Example

FIG. 1 is a diagram schematically illustrating an example of an overall configuration of a system 1 according to one embodiment of the present disclosure. As illustrated in FIG. 1, the system 1 includes base stations 100 (100A and 100B), terminal devices 200 (200A and 200B), a core network 20, and a packet data network (PDN) 30.

The base station 100 operates a cell 11 (11A or 11B), and provides a radio service to one or more terminal devices located inside the cell 11. For example, the base station 100A provides a radio service to the terminal device 200A, and the base station 100B provides a radio service to the terminal device 200B. The cell 11 may be operated in accordance with an arbitrary radio communication system, such as LTE or New Radio (NR). The base station 100 is connected to the core network 20. The core network 20 is connected to the PDN 30.

The core network 20 may include a Mobility Management Entity (MME), a Serving gateway (S-GW), a PDN gateway (P-GW), a Policy and Charging Rule Function (PCRF), and a Home Subscriber Server (the HSS). Alternatively, the core network 20 may include NR entities that have the same functions as the devices as described above. The MME is a control node that deals with a control plane signal and manages a moving state of a terminal device. The S-GW is a control node that deals with a user plane signal and is a gateway device that switches between user data transfer paths. The S-GW is connected to a plurality of base stations and functions as an anchor point in a handover or the like. The P-GW is a control node that deals with a user plane signal and is a gateway device that serves as a connection point between the core network 20 and the PDN 30. The S-GW and the P-GW relay user plane signals that are transmitted and received by terminal devices. The PCRF is a control node that performs policy and charging control on Quality of Service (QoS) or the like for a bearer. The HSS is a control node that deals with subscriber data and performs service control.

The terminal device 200 performs radio communication with the base station 100 on the basis of control performed by the base station 100. For example, the terminal device 200 transmits an uplink signal to the base station 100 and receives a downlink signal from the base station 100. The terminal device 200 may be what is called a User Equipment (UE). The terminal device 200 may also be referred to as a user.

1.2. Examination (1) Overview of Network Slice

First, LTE and NR as the successor of LTE, which are examined in 3GPP, will be described with reference to FIG. 2 and FIG. 3.

Figure 2:
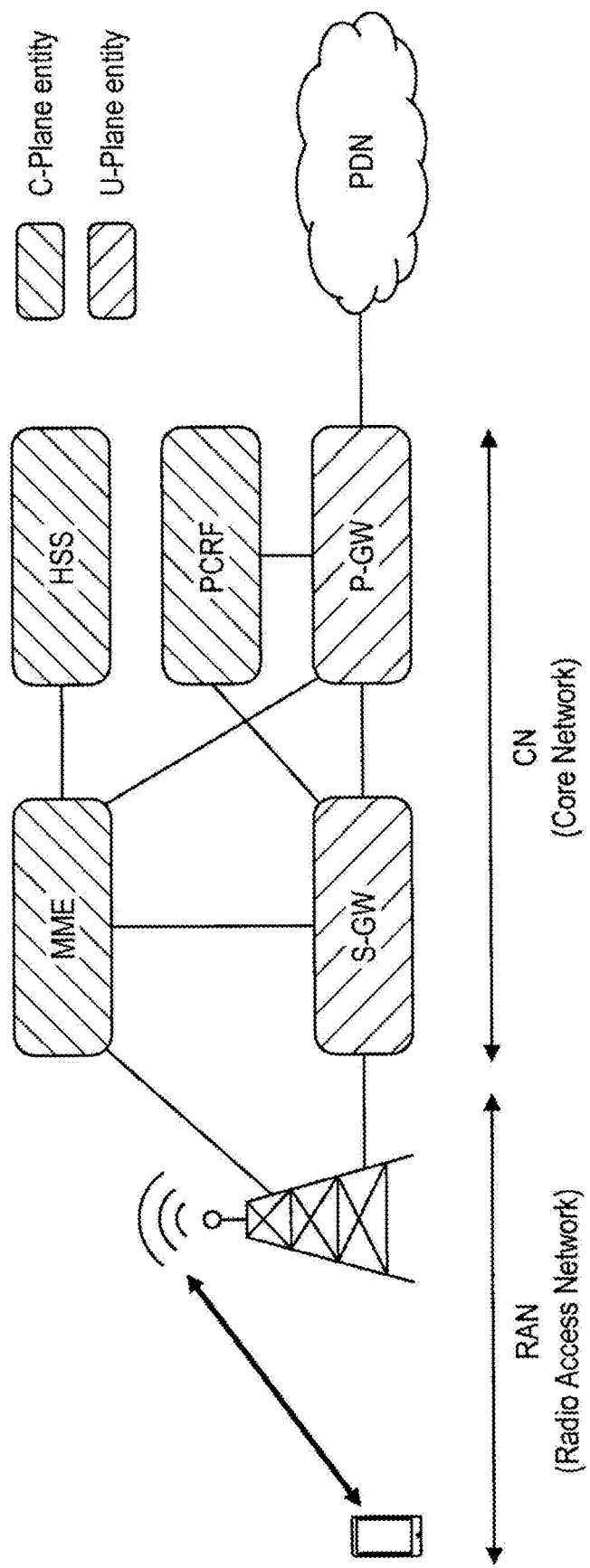
FIG. 2 is a diagram illustrating an overview of a network configuration of LTE.

FIG. 2 is a diagram illustrating an overview of a network configuration of LTE. As illustrated in FIG. 2, the network configuration of LTE is classified into a RAN and a CN. The CN may include, for example, a Mobility Management Entity (MME), a Serving gateway (S-GW), a PDN gateway (P-GW), a Policy and Charging Rule Function (PCRF), and a Home Subscriber Server (HSS). Among these devices, the MME, the HSS, and the PCRF are entities for a control plane (C-Plane), and the S-GW and the P-GW are entities for a user plane (U-Plane). Each of the entities will be described in detail below. The MME is a control node that deals with a control plane signal and manages a moving state of a terminal device. The S-GW is a control node that deals with a user plane signal and is a gateway device that switches between user data transfer paths. The P-GW is a control node that deals with a user plane signal and is a gateway device that serves as a connection point between the core network 20 and the PDN 30. The PCRF is a control node that performs policy and charging control on Quality of Service (QoS) or the like for a bearer. The HSS is a control node that deals with subscriber data and performs service control.

Figure 3:
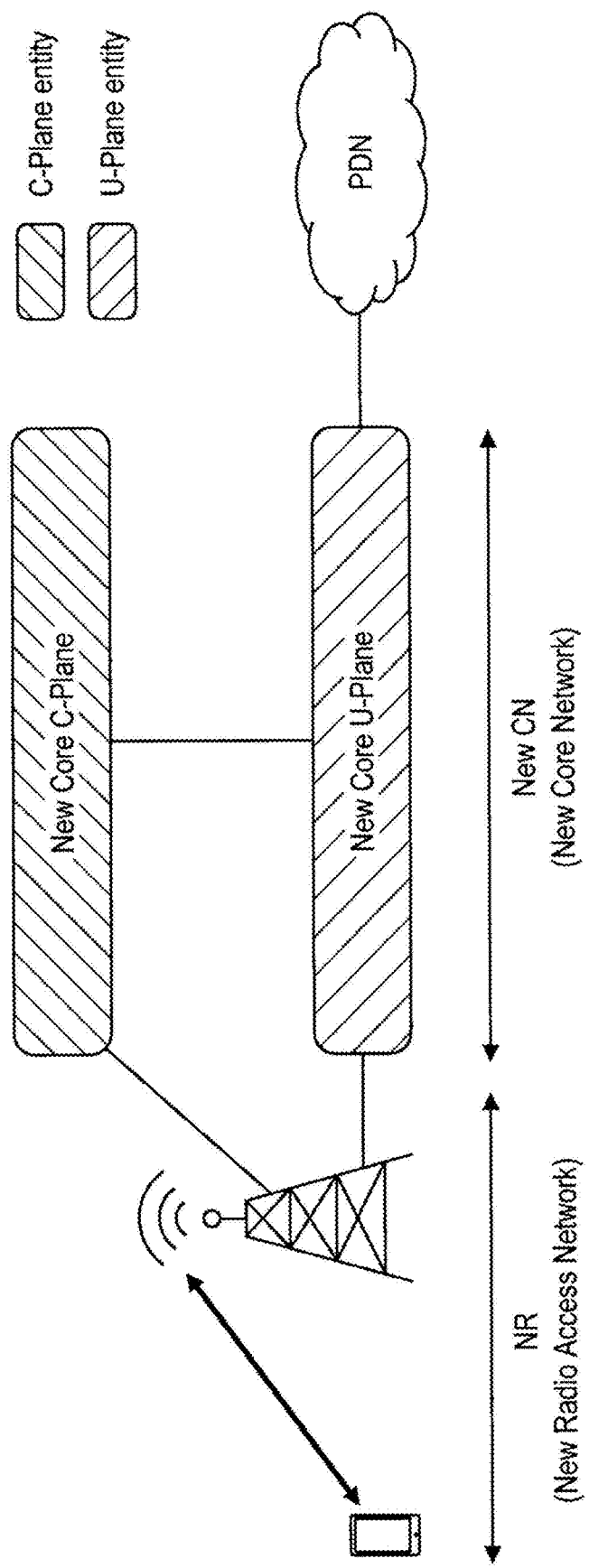
FIG. 3 is a diagram illustrating an overview of a network configuration of NR.

FIG. 3 is a diagram illustrating an overview of a network configuration of NR. As illustrated in FIG. 3, the network configuration of NR is classified into an NR and a New CN. The New CN includes a New Core C-Plane that performs processes related to a control plane, and a New Core U-Plane that performs processes related to a user plane.

NR has two features. A first feature is to realize high-speed and large-capacity communication using a frequency band of equal to or larger than 6 GHz to smaller than 100 GHz. A second feature is to effectively accommodate communication in a plurality of modes for various use cases. Here, the communication in the plurality of modes includes high-speed and large-capacity communication (Mobile Broad Band), low-latency communication (Low Latency), Machine Type Communication (MTC), and Device to Device (D2D), and the like. In NR, it is examined to accommodate the communication in the plurality of modes in a single network.

As a technology for a core network side that is to be connected to a RAN, Evolved Packet Core (EPC) has been adopted in LTE; however, New Core is being examined as the successor of EPC. New Core is required to effectively accommodate the communication in the plurality of modes as described above, and to reduce CAPEX/OPEX (capital expenditures and operating expenses).

To provide communication in the plurality of modes while maintaining low CAPEX/OPEX, it is difficult to physically divide a network for each of the communication modes. Therefore, it is examined to operate a plurality of logical networks corresponding to the plurality of communication modes in a physically single network, and to flexibly change capacities of the logical networks in accordance with a demanded communication volume for each of the communication modes.

To cope with this, it may be possible to implement, as a virtual machine, each of nodes (in other words, communication equipment) in a core network, and virtually execute operation of a node corresponding to a target communication mode for each of the logical networks. This is because functions implemented by the virtual machine can be increased or decreased in accordance with an increase or a decrease in the demand for communication, and computer resources allocated for each of the functions can be increased or decreased. The functions implemented by the virtual machine are networked by being connected to other functions by a virtual network technology. As the virtual network technology as described above, for example, a technology called Open Flow has been known, in which a central controller distributes rules of each of switches, and the switches operate in accordance with the rules distributed by the controller. According to Open Flow, it is possible to flexibly operate the network by freely switching between the switches that connect the functions implemented by the virtual machine.

The virtual machine technology is a technology for operating one or more logical machines (that is, the virtual machines) in a physical server. With use of the virtual machine technology, the physical server is able to give different functions to virtual machines or operate a plurality of virtual machines having the same functions to thereby distribute a processing load.

As described above, a technology for providing logical networks (that is, pipes for communication) with different properties by combining the virtual machines and the virtual network technology, such as Open Flow, is also referred to as Slicing. Meanwhile, the virtual network is a technology for virtually realizing a network that connects virtual machines.

Figure 4:
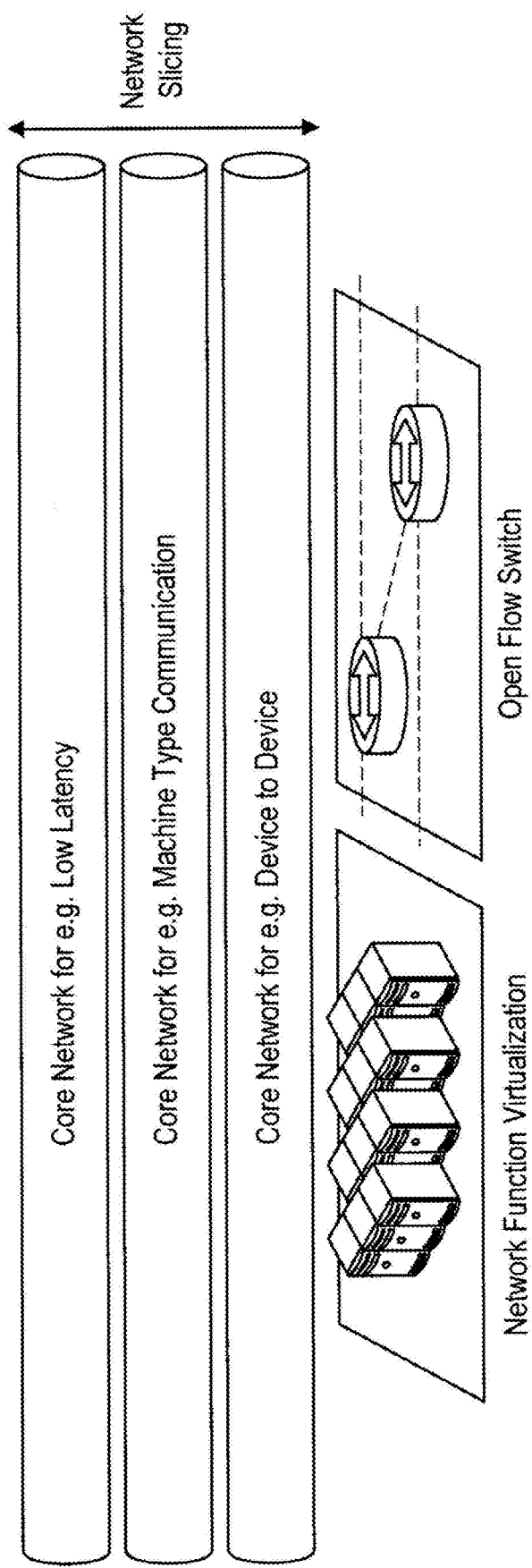
FIG. 4 is a diagram for explaining an overview of a slicing technology.

FIG. 4 is a diagram for explaining an overview of a slicing technology. As illustrated in FIG. 4, by combining virtual machines and Open Flow switches, a core network for low-latency communication, a core network for MTC, and a core network for D2D are realized on a single physical network. In other words, logically independent networks capable of providing different communication services are realized on the single physical network. The logical networks provided in the slicing technology are also referred to as slices or network slices. According to the slicing technology, it is possible to flexibly provide logical networks for different uses. Further, according to the slicing technology, it is possible to flexibly change a capacity of each of network network slices by increasing or decreasing calculation resources allocated to the virtual machines or by changing switching.

Given the fact that New Core is required to effectively accommodate communication in a plurality of modes while reducing CAPEX/OPEX, it is preferable to adopt the slicing technology in a cellular network.

Here, the cellular network is configured with a RAN and a CN. The slicing technology is mostly considered as being easily adoptable to the CN side. This is because, in LTE, various nodes, such as an MME, a P-GW, an S-GW, and a PCRF, are present on the CN side, and only a base station is present on the RAN side. However, to enable a single base station to provide radio services corresponding to various communication modes using a limited frequency band and to flexibly change a communication resource amount for each of the communication modes, it is desirable to adopt the slicing technology even on the RAN side.

Meanwhile, Quality of Service (QoS) for guaranteeing communication quality on a network has been known as a concept that is apparently similar to the network slice. However, QoS controls only a delay time and a communication band. In contrast, the network slice is more than able to control the delay time and the communication band. For example, signaling, such as an attach procedure, itself may be different between different network slices. Further, a network access method itself may be different between different network slices. In other words, the network slice is able to provide unique signaling and a unique access method while controlling the delay time and the communication band. Therefore, QoS may be regarded as a subset of the network slice, where QoS is able to provide a part of functions provided by the network slice.

(2) Network Slice Provided by System

Each of the base station 100, the terminal device 200, and the CN 20 according to the present embodiment is able to provide one or more logical networks that provide different communication services. In other words, each of the base station 100, the terminal device 200, and the CN 20 is able to provide one or more network slices. This will be described with reference to FIG. 5.

Figure 5:
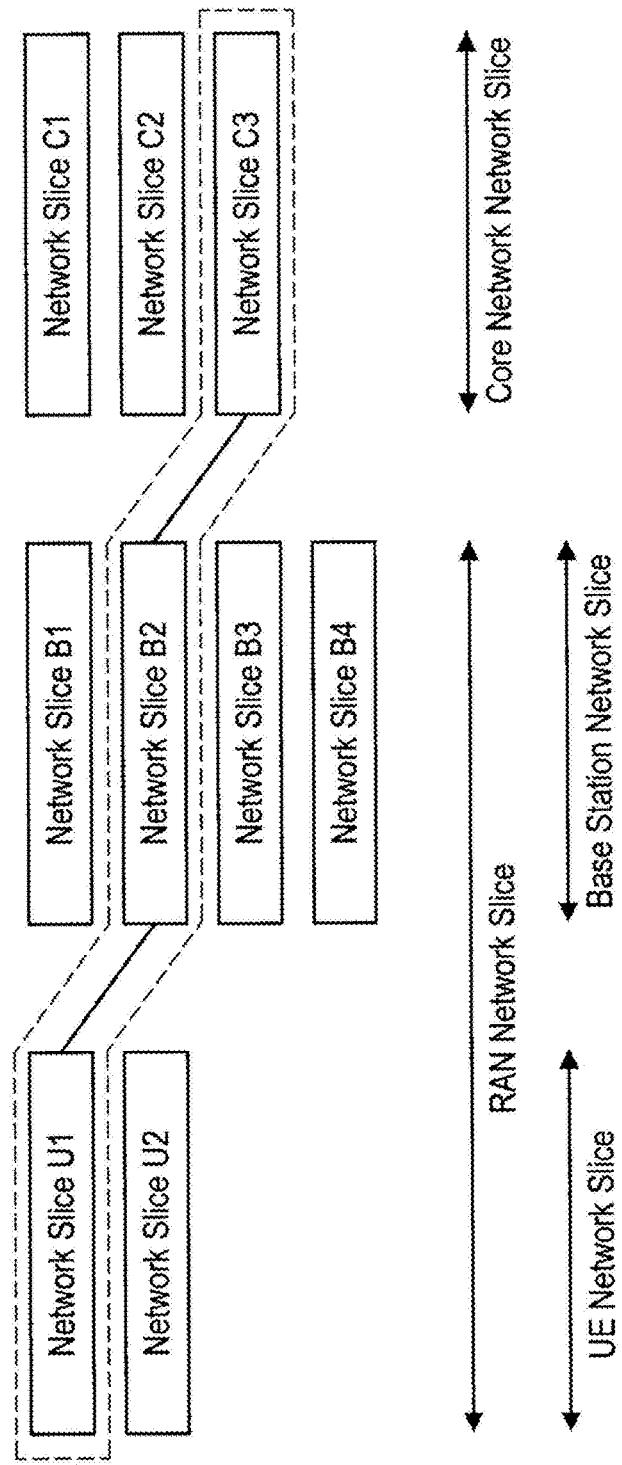
FIG. 5 is a diagram for explaining an example of how the system according to the present embodiment provides network slices.

FIG. 5 is a diagram for explaining an example of how the system according to the present embodiment provides network slices. As illustrated in FIG. 5, for example, the terminal device 200 provides network slices U1 and U2, the base station 100 provides network slices B1 to B4, and the CN 20 provides network slices C1 to C3. In general, it is assumed that the slicing technology is applied to the CN and network slices are provided in the CN. In contrast, in the present embodiment, as illustrated in FIG. 5, the network slices are provided even on the RAN side, and each of the base station 100 and the terminal device 200 provide the network slices.

The network slices provided by each of the base station 100, the terminal device 200, and the CN 20 are associated with one another, so that an end-to-end network slice is created from the terminal device 200 to the CN 20. In the example illustrated in FIG. 5, the network slices U1, B2, and C3 are associated with one another, so that the end-to-end network slice is created. Meanwhile, a subject that associates the network slices with one another may be arbitrary. For example, a control entity in the CN 20 associates the network slices with one another. The control entity as described above may also be referred to as a Slicing management entity. The Slicing management entity associates the network slices with one another in accordance with a request issued by the terminal device 200 or in accordance with resource conditions of the network slices provided by the CN 20.

Therefore, it is desirable that the base station 100, the terminal device 200, and the CN 20 provide information on the network slices that can be provided by the respective devices to one another. With the provision of the technology related to the network slices, the terminal device 200 becomes able to request attachment and connect to a desired network slice after recognizing what kind of network slice is provided from the network side and recognizing a state (for example, a degree of congestion) of the network slice. Meanwhile, the information on the network slice may be regarded as capability information indicating a capability related to the network slice.

In the following, the capability of the network slice will be described.

Capability of Network Slice Provided by the CN 20

The CN 20 is able to provide one or more network slices. Examples of the network slice provided by the CN 20 include a network slice for low-latency and a network slice for MTC. The network slice for low latency is a network to which computer resources are fully allocated such that the number of steps of switches to be passed is reduced and a processing delay is reduced. In contrast, the network slice for MTC is a network to which a larger number of computer resources are allocated to a process for a control plane than a process for a user plane. With this configuration, the network slice for MTC is suitable for a communication mode in which a large number of terminals are accommodated and a data volume to be transmitted at one time is small. Other examples of the network slice provided by the CN 20 include a network slice compatible with EPC and a network slice compatible with NR.

Examples of the capability of the network slice provided by the CN 20 include the number of steps of switches, an amount of computer resources, compatibility of the network slice with EPC, and compatibility of the network slice with NR.

Capability of Network Slice Provided by Base Station 100

The base station 100 is able to provide one or more network slices. The base station 100 is able to simultaneously operate a plurality of component carries using a carrier aggregation technology. A frequency and a time slot to be used for MTC, high-speed and large-capacity communication, or low-latency communication among the plurality of component carries largely depend on resource scheduling performed by the base station 100. Therefore, from the viewpoint of the resource allocation, the network slice and the scheduling are apparently similar to each other. However, in the scheduling, it is difficult to set a parameter, such as the number of terminals to be accommodated in MTC, and therefore, the scheduling is similar to but different from the network slice.

Examples of the capability of the network slice provided by the base station 100 include how much resources can be provided for low-latency communication and an amount of delay at the time the resources are provided. Further, in the case of a communication mode in which a large number of terminals simultaneously connect to a network as in MTC, examples of the capability of the network slice provided by the base station 100 include the number of terminals that can be accommodated.

Capability of Network Slice Provided by Terminal Device 200

The terminal device 200 is able to provide one or more network slices. In other words, the terminal device 200 is able to perform processes corresponding to one or more communication modes. For example, if a protocol that handles MTC is implemented, the terminal device 200 is able to provide network slices for MTC. The same applies to other communication modes, such as low-latency communication.

Examples of the capability of the network slice provided by the terminal device 200 include a type of a communication mode (MTC, low-latency communication, and the like) for which processes can be performed, that is, a type of a communication mode for which the corresponding network slices can be provided.

(3) Relationship Between Bearers and Network Slice

In a RAN and EPC in LTE, a session called a bearer is created for each QoS, and a different bearer is prepared for different QoS. A terminal device first creates a default bearer, thereafter creates a dedicated bearer corresponding to necessary QoS, and performs communication. To create the bearers, a transaction in which the terminal device, a base station, an MME, an S-GW, a P-GW, and a PCRF are involved is needed, so that a delay or the like occurs. In contrast, a single network slice is able to provide a plurality of kinds of QoS, so that it is possible to reduce a delay or the like. This will be described with reference to FIG. 6.

Figure 6:
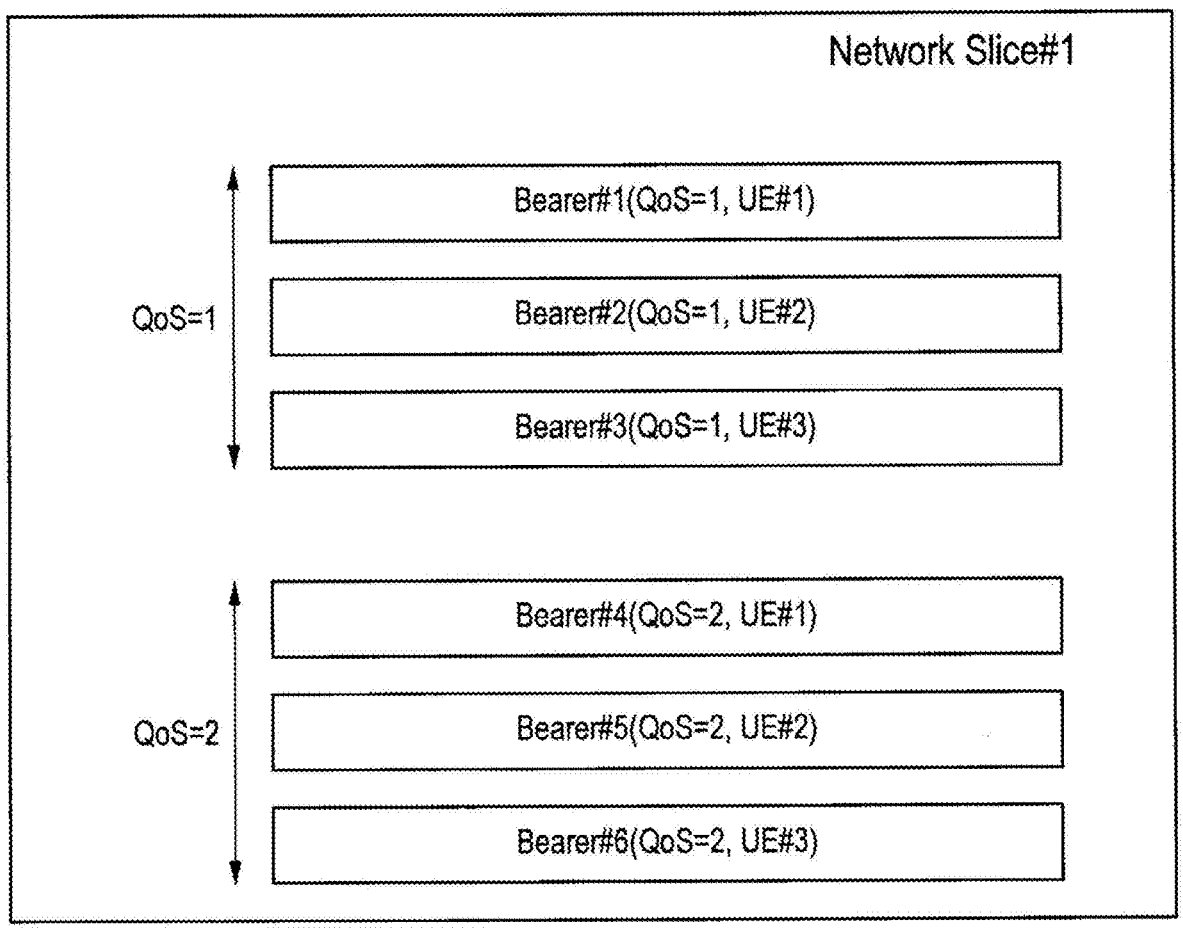
FIG. 6 is a diagram illustrating an example of a relationship between bearers and a network slice.

FIG. 6 is a diagram illustrating an example of the relationship between bearers and a network slice. As illustrated in FIG. 6, a single network slice (#1) includes a plurality of bearers (#1 to #6). In FIG. 6, the bearers #1 to #3 are bearers for which a value of QoS is set to 1, and the bearers #4 to #6 are bearers for which a value of QoS is set to 2. Further, the bearers #1 and #4 are bearers used for a UE #1, the bearers #2 and #5 are bearers used for a UE #2, and the bearers #3 and #6 are bearers used for a UE #3. In this manner, the single network slice may include the plurality of bearers for a plurality of kinds of QoS for the plurality of terminal devices 200. Therefore, the plurality of terminal devices 200 are able to perform communication using bearers with the plurality of kinds of QoS via the single network slice.

In FIG. 6, the single network slice is illustrated; however, it is possible to provide a plurality of network slices to the single terminal device 200. The terminal device 200 performs communication using at least any of the network slices. In other words, the terminal device 200 may be able to perform communication using one or more network slices.

(4) Independence of Network Slice

It is desirable that independence of a network slice is secured. The independence of the network slice is defined such that traffic in the network slice does not have an impact on traffic in other network slices and is not influenced by the traffic in the other network slices. If the independence of the network slice is secured, communication using the network slice is not influenced by dynamic conditions in the other network slices. When it comes to a network slice in a RAN, if the independence of the network slice is secured, radio resources allocated to the network slice and transmission chances are not influenced by the other network slices.

In the network slice for which independence is secured, communication that is completely independent of the other network slices is performed. For example, in a single network slice, the base station 100 transmits a downlink signal, and the terminal device 200 transmits an uplink control signal, such as ACK or NACK, in response to the received downlink signal.

A plurality of network slices are basically different networks, and therefore, it is desirable to secure independence of these network slices. In contrast, it may be possible to provide network slices for each of which independence is not secured. For example, if network slices in a RAN are provided using a single shared channel, in some cases, it may be difficult to provide network slices for each of which independence is secured. It is desirable that independence of each of network slices is secured even in a RAN.

(5) Use Case of Low-Latency Communication

To realize low-latency communication, in some cases, a network slice for low-latency communication may be created. In this case, it may be possible to adopt a technology in which an application server (for example, a content cache server or a server for providing games) used by a terminal device is arranged near the terminal device. This technology is also referred to as Mobile Edge Computing (MEC). An application compatible with MEC is also referred to as an MEC application. A server in which the MEC application is arranged is also referred to as an MEC application server. Creation of a network slice for low-latency communication may also be referred to as creation of a network slice based on determination on whether the MEC application server is arranged in the network.

(6) Multimedia Broadcast and Multicast Service (MBMS)

MBMS is a mechanism for simultaneously distributing contents, such as videos, to terminal devices by using a cellular network. The contents are typically broadcasted or multicasted from the base station to the terminal devices, but may be unicasted in some cases. MBMS using an LTE network is also referred to as evolved MBMS (eMBMS). In the following, MBMS and eMBMS will collectively be referred to as MBMS without being specifically distinguished from each other. According to MBMS, it is possible to flexibly control a frequency bandwidth independent of the number of terminal devices that view the contents.

(7) Overview of Proposed Technology

According to the proposed technology, a network slice capacity is dynamically controlled on the basis of information that is collected from an entity that is involved in the network slice. The network slice capacity is an amount of resources allocated to the network slice.

Examples of the information to be collected include information for predicting traffic that may occur in the future in a network slice used by the terminal device 200. With this information, it is possible to set an appropriate network slice capacity in expectation of traffic that may occur in the future in the network slice used by the terminal device 200. Other examples of the information to be collected include information indicating a measurement result of performance of the network slice used by the terminal device 200. With this information, it is possible to set an appropriate network slice capacity in accordance with current conditions of the network slice used by the terminal device 200.

Here, as one of technologies related to dynamic resource allocation, a scheduling request in LTE has been known. A terminal device, when performing communication, transmits a scheduling request to a base station, and performs communication with the base station using a resource that is allocated in accordance with the scheduling request.

The proposed technology and the scheduling request are technologies that are similar to but different from each other. In particular, the proposed technology is a technology for allocating a resource to a communication path called a network slice itself. In contrast, the scheduling request is a technology for allocating a resource to a terminal device from among resources that have been allocated to a communication path. More specifically, LTE may be regarded as a configuration in which a single network slice is present, and the scheduling request may be regarded as a technology for controlling resource allocation in the single network slice.

As illustrated in FIG. 6, the network slice includes bearers corresponding to a plurality of kinds of QoS for each of the terminal devices 200. The scheduling request in LTE is targeted at a plurality of bearers included in a single network slice, and is used to adjust resources among the bearers. In contrast, the proposed technology is targeted at a plurality of network slices, and is used to adjust resources among the network slices.

1.3. Detailed Configuration Example of Entire System

Figure 7:
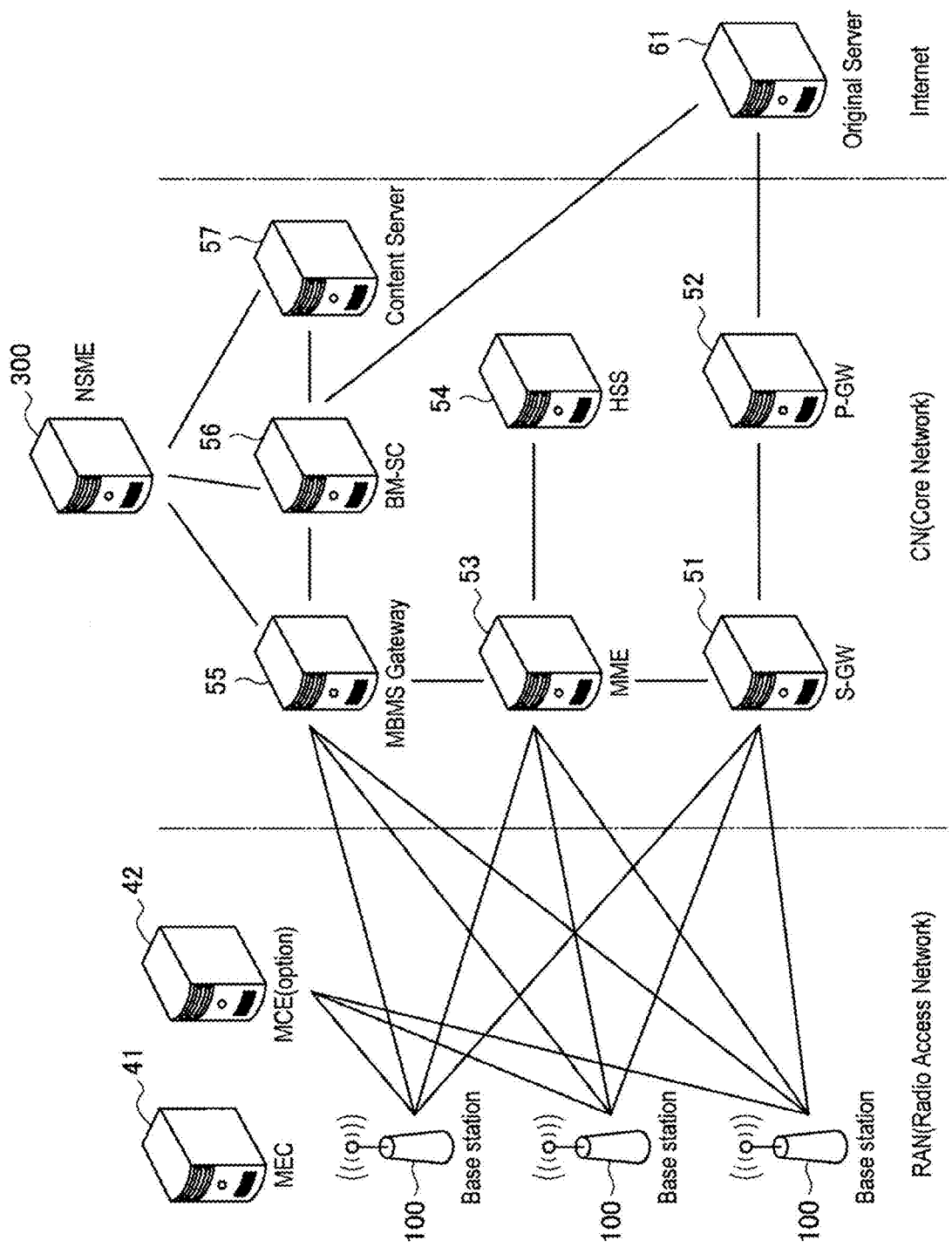
FIG. 7 is a diagram illustrating details of one example of an overall configuration of the system according to the present embodiment.

In the present embodiment, various entities including entities related to MBMS may be involved. Therefore, an entire configuration example of the system 1 will be described in detail with reference to FIG. 7. FIG. 7 is a diagram illustrating details of one example of an overall configuration of the system 1 according to the present embodiment. As illustrated in FIG. 7, the system 1 is mainly classified into a RAN, a core network, and the Internet (PDN).

In FIG. 7, the base stations 100, an S-GW 51, a P-GW 52, an MME 53, and an HSS 54, which have been described above with reference to FIG. 1, are illustrated. These entities are identified by names used in LTE, for convenience of explanation. When the proposed technology is applied to 5G, processes performed by these entities are performed by entities (for example, VNFs) that have the same functions as those of the entities in LTE. In other words, in the following explanation, the names, such as the S-GW 51, in LTE may be replaced with names of the entities that have the same functions in 5G.

In FIG. 7, an MEC application server 41 as described above is illustrated in the RAN. The MEC application server 41 is a service control device that provides a service for an MEC application using a network slice to the terminal device 200. The MEC application server 41 may be implemented as a logical entity and may be included in the base station 100 or the like. The MEC application server 41 may be included in the core network.

An original server 61 is a server that is arranged on the Internet and provides contents. For example, an application to be provided to the terminal device 200 is arranged on the original server 61.

In the core network, a Network slice management entity (NSME) 300 is arranged. The NSME 300 is a communication control device that controls a plurality of network slices that may be provided to the terminal device 200. The NSME 300 may be implemented as a logical entity, and may be included in the base station 100 or a different device in the core network.

In FIG. 7, entities related to MBMS are illustrated. The entities related to MBMS are an MCE 42, an MBMS gateway 55, a BM-SC 56, and a content server 57.

Multicell/Multicast Coordination Entity (MCE) 42

The MCE 42 is classified as an entity on the RAN side. The MCE 42 is a service control device that provides an MBMS service using a network slice to the terminal device 200. The MCE 42 may be implemented as a logical entity, and may be included in the base station 100. The MCE 42 may be arranged separately from the base station 100.

The MCE 42 has three roles. A first role is to allocate temporal and frequency resources for MBMS. A second role is to determine a modulation system and an encoding rate, in other words, a Modulation and Coding Scheme (MCS). A third role is to execute a counting procedure.

The counting procedure is a procedure of collecting information indicating a degree of user's interest in a service (distribution of a content). The temporal and frequency resources for MBMS are allocated or allocation is stopped in accordance with the number of users who are interested in the service, which is collected through the counting procedure.

In 5G, it is expected that an MBMS content is provided to each of terminal devices using a beam specific (UE Specific) to the terminal device. Even if communication between the base station and the terminal device is handled as unicast, distribution of contents from the content server 57 to the base station 100 is performed by broadcast (by multicast in an Internet protocol (IP) layer). Through the counting procedure, the base station 100 for which multicast is to be performed is identified. An example of the flow of a typical counting procedure in MBMS will be described with reference to FIG. 8.

Figure 8:
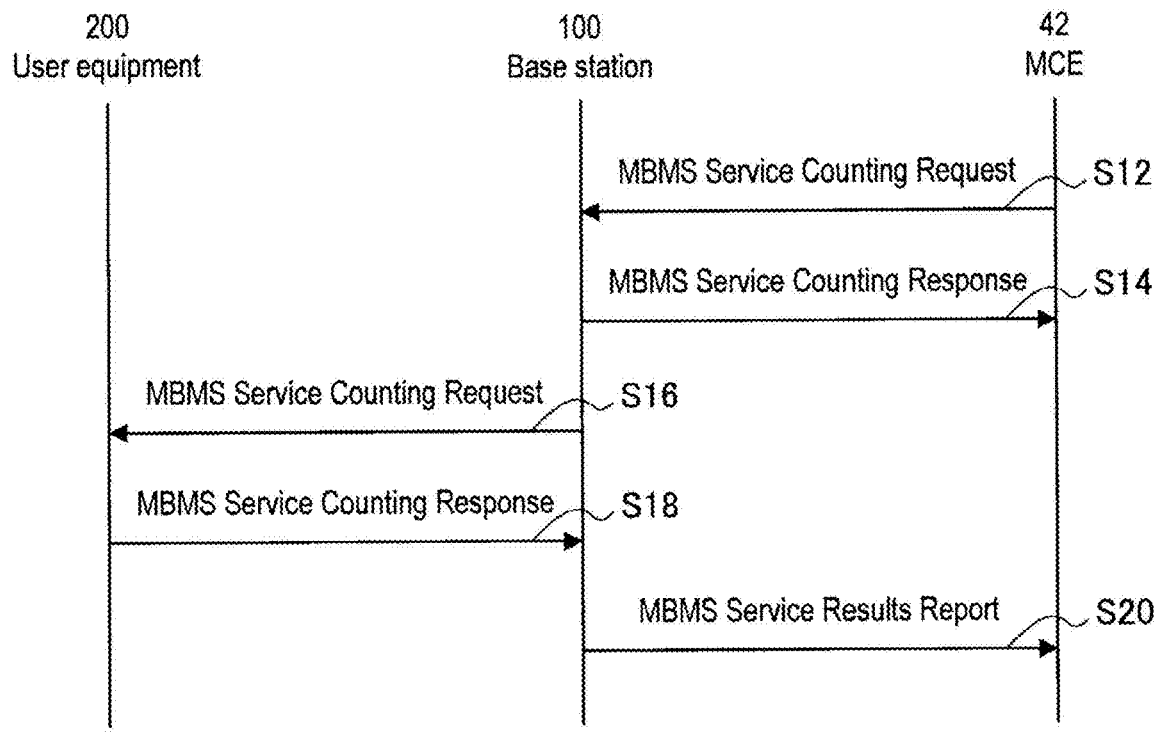
FIG. 8 is a sequence diagram illustrating an example of the flow of a typical counting procedure in MBMS.

FIG. 8 is a sequence diagram illustrating an example of the flow of the typical counting procedure in MBMS. In the present sequence, the terminal device 200, the base station 100, and the MCE 42 are involved. As illustrated in FIG. 8, first, the MCE 42 transmits an MBMS service counting request to the base station 100 (Step S12). Subsequently, the base station 100 returns an MBMS service counting response to the MCE 42 (Step S14), and transmits an MBMS service counting request to the terminal device 200 (Step S16). Subsequently, the terminal device 200 returns an MBMS service counting response to the base station 100 (Step S18). Then, the base station 100 transmits an MBMS service results report to the MCE 42 (Step S20).

MBMS Gateway 55

The MBMS gateway 55 is an entity that is arranged on the core network. The MBMS gateway 55 has a function to transmit a packet to the base station 100 corresponding to an IP multicast address. In the application layer, contents are broadcasted to the terminal device 200. However, in the IP layer, contents are multicasted to the base station 100 that is identified through signaling that is performed in advance between the base station 100 and the MBMS gateway 55.

BM-SC 56

The BM-SC 56 is an entry point of an MBMS content. The BM-SC 56 mainly has four functions. A first function is to perform MBMS session management to manage start and termination of an MBMS service. A second function is to allocate an ID called Temporary Mobile Group Identity (TMGI) to each of MBMS sessions. A third function is to allocate QoS to each of MBMS sessions. A fourth function is to provide information, such as a program listing, on broadcasting to a user at an application level (see TS29.061).

Content Server 57 The content server 57 is a server that provides an MBMS content. The content server 57 is arranged in the core network. The server that provides the MBMS content may be arranged outside of the core network. For example, the original server 61 arranged on the Internet may provide an MBMS content.

2. CONFIGURATION EXAMPLE OF EACH OF DEVICES

A configuration example of each of the devices included in the system 1 will be described below with reference to FIG. 9 to FIG. 13.

2.1. Configuration Example of Base Station

Figure 9:
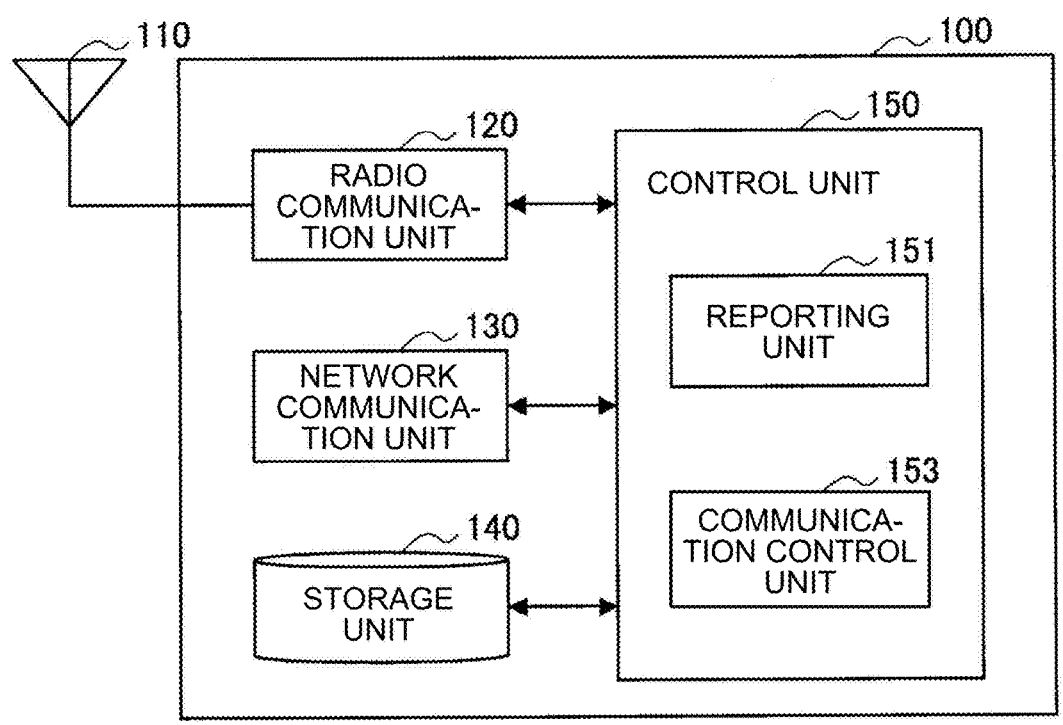
FIG. 9 is a block diagram illustrating an example of a configuration of a base station according to the present embodiment.

FIG. 9 is a block diagram illustrating an example of a configuration of the base station 100 according to the present embodiment. With reference to FIG. 9, the base station 100 includes an antenna unit 110, a radio communication unit 120, a network communication unit 130, a storage unit 140, and a control unit 150.

(1) Antenna Unit 110

The antenna unit 110 emits, as radio waves, signals output by the radio communication unit 120 to a space. Further, the antenna unit 110 converts radio waves in the space into signals, and outputs the signals to the radio communication unit 120.

(2) Radio Communication Unit 120

The radio communication unit 120 transmits and receives a signal. For example, the radio communication unit 120 transmits a downlink signal to a terminal device, and receives an uplink signal from the terminal device.

(3) Network Communication Unit 130

The network communication unit 130 transmits and receives information. For example, the network communication unit 130 transmits information to other nodes, and receives information from the other nodes. For example, the other nodes include the other base stations 100, the MEC application server 41, the MCE 42, entities in the core network, and the like.

(4) Storage Unit 140

The storage unit 140 temporarily or permanently stores therein a program and various kinds of data for operation of the base station 100.

(5) Control Unit 150

The control unit 150 provides various functions of the base station 100. The control unit 150 includes a reporting unit 151 and a communication control unit 153. The reporting unit 151 has a function to report various kinds of information on use of a network slice by the terminal device 200. For example, the reporting unit 151 reports performance measurement information (corresponding to second information) (to be described later) to the NSME 300, and reports capability information on a report of the performance measurement information to the MME 53. The communication control unit 153 has a function to perform communication with the terminal device 200 using the network slice, under the control of the NSME 300. For example, the communication control unit 153 allocates a resource corresponding to a network slice capacity determined by the NSME 300 to a network slice provided by the base station 100. Meanwhile, the control unit 150 may further include other structural elements in addition to the above-described structural elements. In other words, the control unit 150 may perform operation other than operation of the above-described structural elements.

2.2. Configuration Example of Terminal Device

Figure 10:
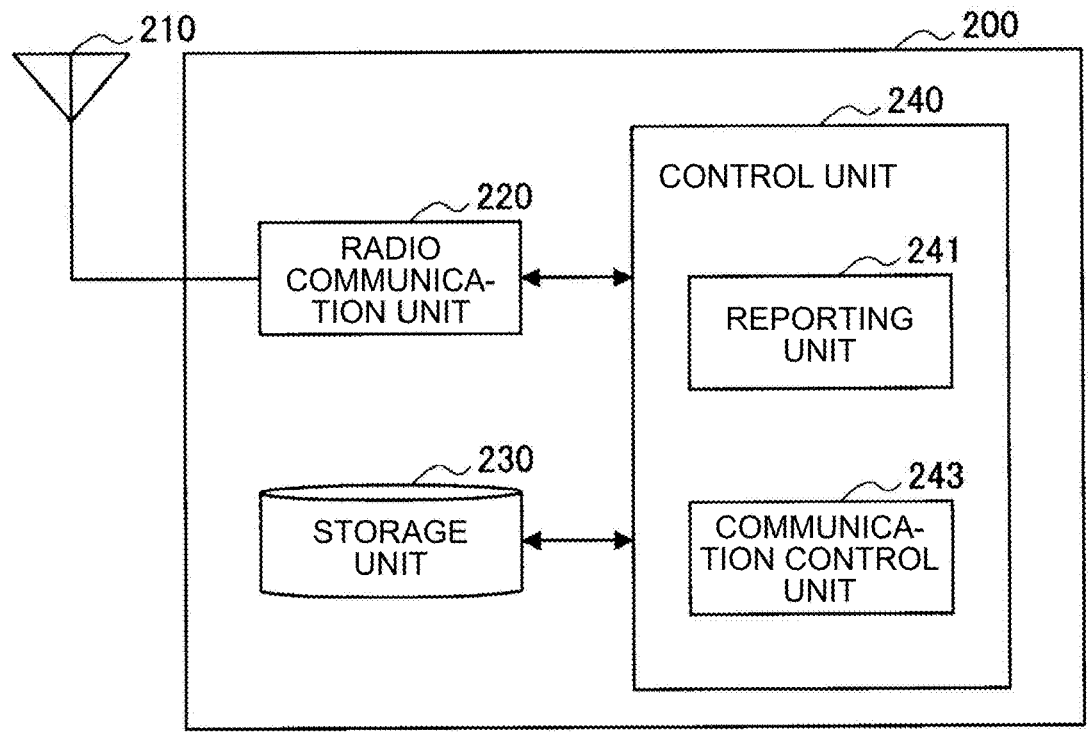
FIG. 10 is a block diagram illustrating an example of a configuration of a terminal device according to the present embodiment.

FIG. 10 is a block diagram illustrating an example of a configuration of the terminal device 200 according to the present embodiment. With reference to FIG. 10, the terminal device 200 includes an antenna unit 210, a radio communication unit 220, a storage unit 230, and a control unit 240.

(1) Antenna Unit 210

The antenna unit 210 emits, as radio waves, signals output by the radio communication unit 220 to a space. Further, the antenna unit 210 converts radio waves in the space into signals, and outputs the signals to the radio communication unit 220.

(2) Radio Communication Unit 220

The radio communication unit 220 transmits and receives a signal. For example, the radio communication unit 220 receives a downlink signal from a base station, and transmits an uplink signal to the base station.

(3) Storage Unit 230

The storage unit 230 temporarily or permanently stores therein a program and various kinds of data for operation of the terminal device 200.

(4) Control Unit 240

The control unit 240 provides various functions of the terminal device 200. The control unit 240 includes a reporting unit 241 and a communication control unit 243. The reporting unit 241 has a function to report various kinds of information on use of a network slice by the terminal device 200. For example, the reporting unit 241 reports traffic prediction information (corresponding to first information) (to be described later) and the performance measurement information to the NSME 300, and reports capability information on a report of the traffic prediction information and the performance measurement information to the MME 53. The communication control unit 243 has a function to perform communication with the base station 100 using the network slice, under the control of the NSME 300. For example, the communication control unit 243 allocates a resource corresponding to a network slice capacity determined by the NSME 300 to a network slice provided by the terminal device 200. Meanwhile, the control unit 240 may further include other structural elements in addition to the above-described structural elements. In other words, the control unit 24 may perform operation other than operation of the above-described structural elements.

2.3. Configuration Example of NSME

Figure 11:
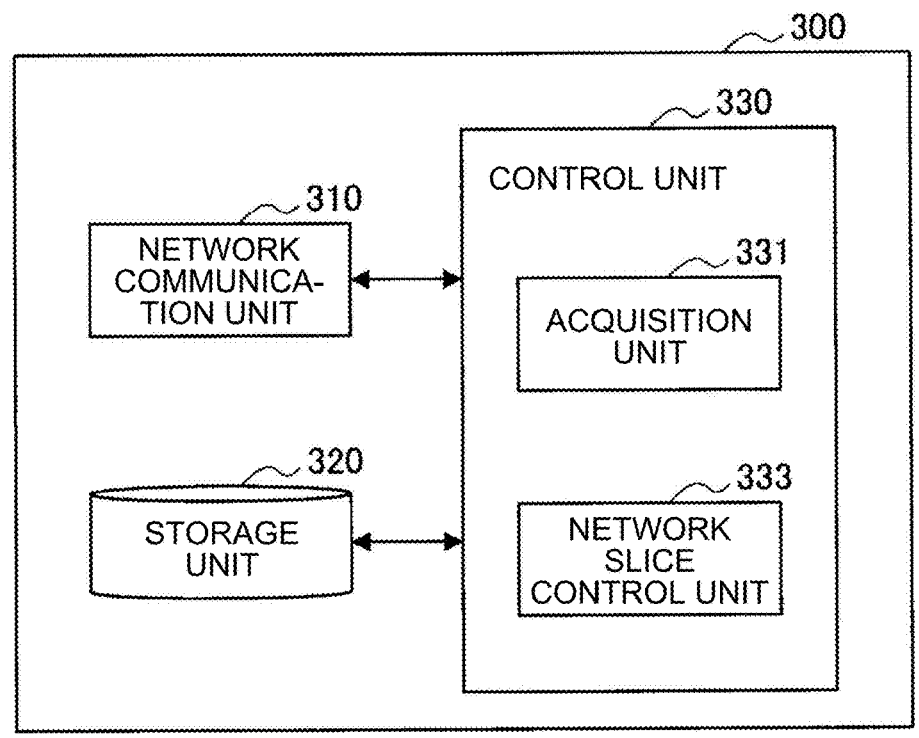
FIG. 11 is a block diagram illustrating an example of a configuration of an NSME according to the present embodiment.

FIG. 11 is a block diagram illustrating an example of a configuration of the NSME 300 according to the present embodiment. With reference to FIG. 11, the NSME 300 includes a network communication unit 310, a storage unit 320, and a control unit 330.

(1) Network Communication Unit 310

The network communication unit 310 transmits and receives information. For example, the network communication unit 310 transmits information to other nodes, and receives information from the other nodes. For example, the other nodes include the base station 100, the MEC application server 41, the MCE 42, entities in the core network, and the like.

(2) Storage Unit 320

The storage unit 320 temporarily or permanently stores therein a program and various kinds of data for operation of the NSME 300.

(3) Control Unit 330

The control unit 330 provides various functions of the NSME 300. The control unit 330 includes an acquisition unit 331 and a network slice control unit 333. The acquisition unit 331 has a function to acquire various kinds of information on use of a network slice, where the information is reported from each of entities involved in the network slice. For example, the acquisition unit 331 acquires the traffic prediction information, the performance measurement information, and the capability information on a report of the traffic prediction information and the performance measurement information. The network slice control unit 333 has a function to control a plurality of network slices that may be used by the terminal device 200. For example, the network slice control unit 333 controls a network slice capacity used by the terminal device 200, on the basis of the information acquired by the acquisition unit 331. Meanwhile, the control unit 330 may further include other structural elements in addition to the above-described structural elements. In other words, the control unit 330 may perform operation other than operation of the above-described structural elements.

2.4. Configuration Example of Service Control Device

Figure 12:
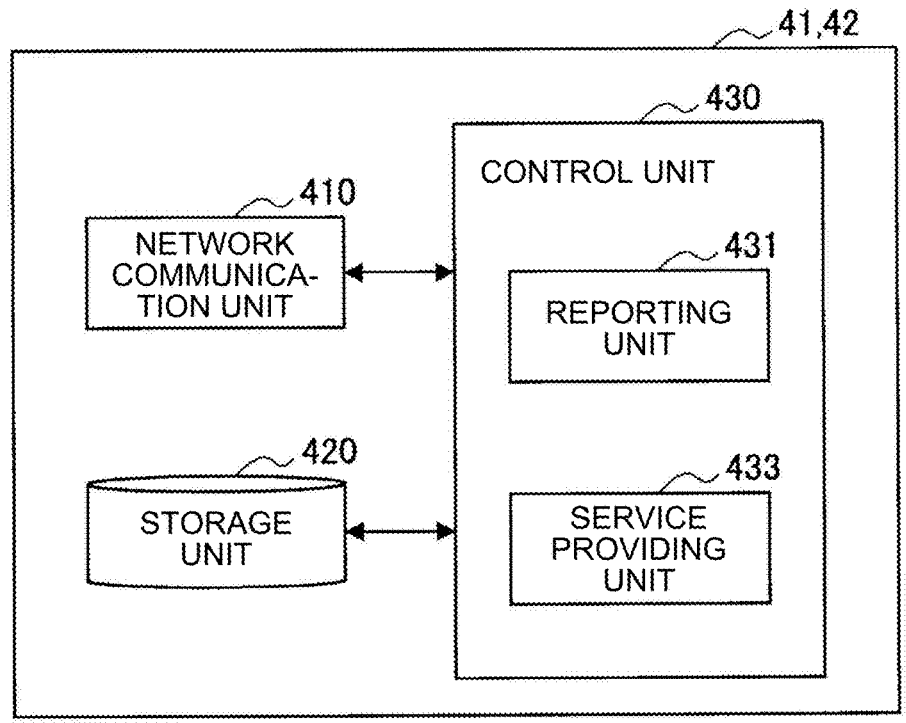
FIG. 12 is a block diagram illustrating an example of a configuration of each of an MEC application server and an MCE according to the present embodiment.

FIG. 12 is a block diagram illustrating an example of a configuration of each of the MEC application server 41 and the MCE 42 according to the present embodiment. With reference to FIG. 12, each of the MEC application server 41 and the MCE 42 includes a network communication unit 410, a storage unit 420, and a control unit 430.

(1) Network Communication Unit 410

The network communication unit 410 transmits and receives information. For example, the network communication unit 410 transmits information to other nodes, and receives information from the other nodes. For example, the other nodes include the base station 100, entities in the core network, and the like.

(2) Storage Unit 420

The storage unit 420 temporarily or permanently stores therein a program and various kinds of data for operation of the MEC application server 41 or the MCE 42.

(3) Control Unit 430

The control unit 430 provides various functions of the MEC application server 41 or the MCE 42. The control unit 430 includes a reporting unit 431 and a service providing unit 433. The reporting unit 431 has a function to report various kinds of information on use of a network slice by the terminal device 200. For example, the reporting unit 431 reports the traffic prediction information on a service (a service for an MEC application or a service for MBMS), which is provided to the terminal device 200, to the NSME 300. The service providing unit 433 has a function to provide a service (a service for an MEC application or a service for MBMS) to the terminal device 200. Meanwhile, the control unit 430 may further include other structural elements in addition to the above-described structural elements. In other words, the control unit 430 may perform operation other than operation of the above-described structural elements.

2.5. Configuration Example of Gateway Device

Figure 13:
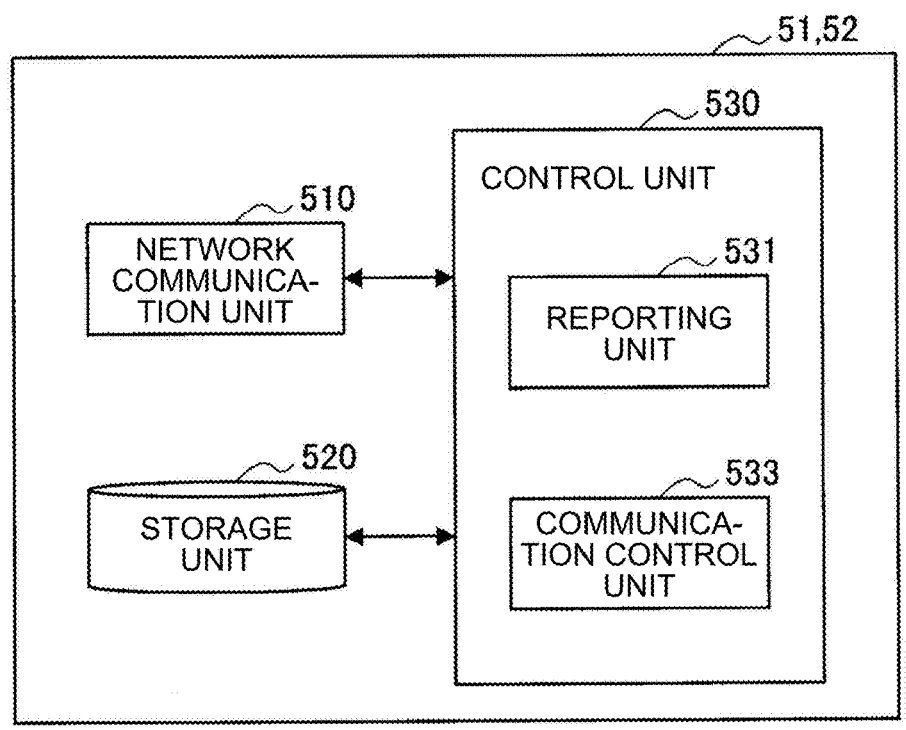
FIG. 13 is a block diagram illustrating an example of a configuration of each of an S-GW and a P-GW according to the present embodiment.

FIG. 13 is a block diagram illustrating an example of a configuration of each of the S-GW 51 and the P-GW 52 according to the present embodiment. With reference to FIG. 13, each of the S-GW 51 and the P-GW 52 includes a network communication unit 510, a storage unit 520, and a control unit 530.

(1) Network Communication Unit 510

The network communication unit 510 transmits and receives information. For example, the network communication unit 510 transmits information to other nodes, and receives information from the other nodes. For example, the other nodes include the base station 100, entities in the core network, and the like.

(2) Storage Unit 520

The storage unit 520 temporarily or permanently stores therein a program and various kinds of data for operation of the S-GW 51 or the P-GW 52.

(3) Control Unit 530

The control unit 530 provides various functions of the S-GW 51 or the P-GW 52. The control unit 530 includes a reporting unit 531 and a communication control unit 533. The reporting unit 531 has a function to report various kinds of information on use of a network slice by the terminal device 200. For example, the reporting unit 531 reports the performance measurement information to the NSME 300, and reports the capability information on a report of the performance measurement information to the MME 53. The communication control unit 533 has a function to provide a network slice, under the control of the NSME 300. For example, the communication control unit 533 allocates a resource corresponding to a network slice capacity determined by the NSME 300 to a network slice provided by the S-GW 51 or the P-GW 52. Meanwhile, the control unit 530 may further include other structural elements in addition to the above-described structural elements. In other words, the control unit 530 may perform operation other than operation of the above-described structural elements.

3. TECHNICAL FEATURE

3.1. Segments of Network Slice

A network slice may be divided into a plurality of segments. This will be described with reference to FIG. 14.

Figure 14:
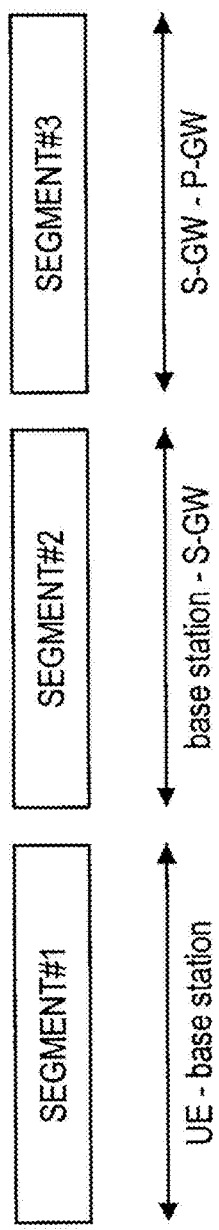
FIG. 14 is a diagram for explaining one example of segments of a network slice according to the present embodiment.

FIG. 14 is a diagram for explaining an example of segments of a network slice according to the present embodiment. In the example illustrated in FIG. 14, a network slice is divided into a segment #1, a segment #2, and a segment #3. The segment #1 is a network slice from the base station 100 to the terminal device 200. The segment #2 is a network slice from the base station 100 to the S-GW 51. The segment #3 is a network slice from the S-GW 51 to the P-GW 52. The terminal device 200 recognizes the network slices such that a single communication path from the terminal device 200 to the P-GW 52 is provided. However, in the entire system 1, the network slices have a tree structure. A plurality of network slices in the segment #1 are bundled in the segment #2, and a plurality of network slices in the segment #2 are bundled in the segment #3.

3.2. Control Based on Prediction of Traffic

<3.2.1. Technical Problem>

It is desirable to dynamically control a network slice capacity (in other words, an amount of resources to be allocated) in accordance with a condition of actual traffic in order to improve resource efficiency. For example, it is desirable to dynamically control the network slice capacity in accordance with traffic of user data and traffic of control signals. When dynamically controlling the network slice capacity, a target capacity is determined, and the network slice capacity is increased or decreased to reach the target. However, the way to determine the target capacity has not been clarified.

Specifically, because it takes a time to create a network slice (in other words, a delay occurs), it has not been clarified at which later time traffic needs to be used as a reference for creating a network slice. Further, a mechanism for controlling the network slice capacity has not been clarified.

<3.2.2. Technical Feature>

(1) Overview

The terminal device 200 reports the traffic prediction information to the NSME 300. The traffic prediction information is information that is used by the NSME 300 to determine resource allocation to a network slice used by the terminal device 200. Specifically, the traffic prediction information is information for predicting traffic that may occur in the future in the network slice used by the terminal device 200. The traffic prediction information is used to determine a target value of a network slice capacity. The terminal device 200 may spontaneously report the traffic prediction information to the NSME 300, or may report the traffic prediction information to the NSME 300 in response to a request from the NSME 300.

The traffic prediction information may be regarded as information indicating a potential need for a network slice in the terminal device 200 or the like. The potential need for the network slice is not a network slice capacity that is currently used, but a network slice capacity that the terminal device 200 or the like may desire to use in the future.

The NSME 300 acquires the traffic prediction information reported by the terminal device 200. To perform acquisition, the NSME 300 may transmit a message to request a report of the traffic prediction information to the terminal device 200. The NSME 300 transmits the message to the terminal device 200 by using, as a trigger, start of an application provided to the terminal device 200, for example. This message is also referred to as a counting request. Further, hereinafter, a procedure for collecting the traffic prediction information is also referred to as a counting procedure. Meanwhile, the counting procedure for collecting the traffic prediction information is a procedure for the network slice, and is different from the counting procedure in MBMS as described above.

The NSME 300 determines a target value of the network slice capacity on the basis of the acquired traffic prediction information. Then, the NSME 300 controls the network slice capacity used by the terminal device 200 such that the network slice capacity matches the determined target value. The network slice capacity is controlled based on the traffic prediction information, so that it is possible to improve resource efficiency.

(2) Traffic Prediction Information

The traffic prediction information is information for predicting traffic that may occur in the future in the network slice used by the terminal device 200. Examples of information included in the traffic prediction information will be described below.

Start Time

The traffic prediction information may include information indicating a start time of communication using the network slice. Examples of the information indicating the start time of the communication using the network slice is illustrated in Table 1 below. According to Table 1, indices corresponding to a plurality of candidate start times of the communication using the network slice are defined. The traffic prediction information includes one of the indices.

TABLE 1

Examples of start time

| Index | Description |
|---|---|
| 0 | Immediately started |
| 1 | Started after 10 milliseconds |
| 2 | Started within 1 second |
| 3 | Started within 10 seconds |
| 4 | Started within 1 hour |
| 5 | Started within 1 day |
| 6 | Unknown |

Duration

The traffic prediction information may include information indicating duration of the communication using the network slice. Examples of the information indicating the duration of the communication using the network slice is illustrated in Table 2 below. According to Table 2, indices corresponding to a plurality of kinds of candidate duration of the communication using the network slice are defined. The traffic prediction information includes one of the indices.

TABLE 2

Examples of duration

| Index | Description |
|---|---|
| 0 | Within 10 milliseconds |
| 1 | Within 1 second |
| 2 | Within 10 seconds |
| 3 | Within 1 hour |
| 4 | Within 1 day |
| 5 | Within 1 week |
| 6 | Infinite |
| 7 | Unknown |

Ratio of Radio Resource Control (RRC) State

The traffic prediction information may include information indicating a ratio of an RRC state during the duration of the communication using the network slice. The ratio of the RRC state is a ratio of an RRC idle state and an RRC connection state. In NR, an RRC inactive state is introduced. Therefore, the ratio of the RRC state in NR is a ratio of the RRC idle state, the RRC connection state, and the RRC inactive state. The RRC idle state indicates a state in which an RRC connection of the terminal device 200 is not established. The RRC connection state indicates a state in which the RRC connection of the terminal device 200 is established and there is a possibility that the terminal device 200 may transmit and receive data. The RRC inactive state indicates a state in which the RRC connection of the terminal device 200 is established and the terminal device 200 does not transmit and receive data. Meanwhile, the ratio of the RRC state may be regarded as a proportion of a time of the RRC connection state to the entire duration of the communication using the network slice.

Requirement for Network Slice

The traffic prediction information may include information indicating requirement for the communication using the network slice. The information indicating the requirement for the network slice may include information indicating a data volume, QoS of user data, QoS of control data, and the like. The information indicating the data volume may include 100 byte/s (second), 1000 byte/s, 1 Mbyte/s, 1 Gbyte/s, 100 Gbyte/s, unknown, and the like. QoS of each of the user data and the control data is related to a delay and an error rate, similarly to QoS in LTE. For example, a delay of 50 ms (milliseconds), a Bit error rate (BER) of 0.001, and the like are required as QoS of the user data, and a delay of 10 ms and a BER of 0.00001 are required as QoS of the control data.

Thus, examples of the information included in the traffic prediction information have been described above. Table 3 below illustrates examples of the traffic prediction information.

TABLE 3

Examples of traffic prediction information

| Example | Start time | Duration | Ratio of RRC state | Requirement for network slice |
|---|---|---|---|---|
| 1 | Started immediately | 10 ms | 1/10 | Delay of 10 ms or smaller |
| 2 | Within 10 seconds | Within 1 hour | 1 | Data volume: 10 Mbyte/s |

(3) Control of Network Slice Capacity Based on Traffic Prediction Information The NSME 300 controls the network slice capacity on the basis of the traffic prediction information collected from the terminal device 200. Specifically, the NSME 300 determines resource allocation to the network slice used by the terminal device 200, on the basis of the traffic prediction information. Determination of the resource allocation to the network slice used by the terminal device 200 includes an increase or a decrease of a capacity of an existing network slice and includes determination of a capacity of a new network slice and establishment of the new network slice. Control of the network slice capacity is realized by, for example, determination of an amount of computer resources allocated to network functions and connections among the network functions by switching. In the following, with reference to FIG. 15, an example of the flow of a procedure related to the control of the network slice capacity will be described.

Figure 15:
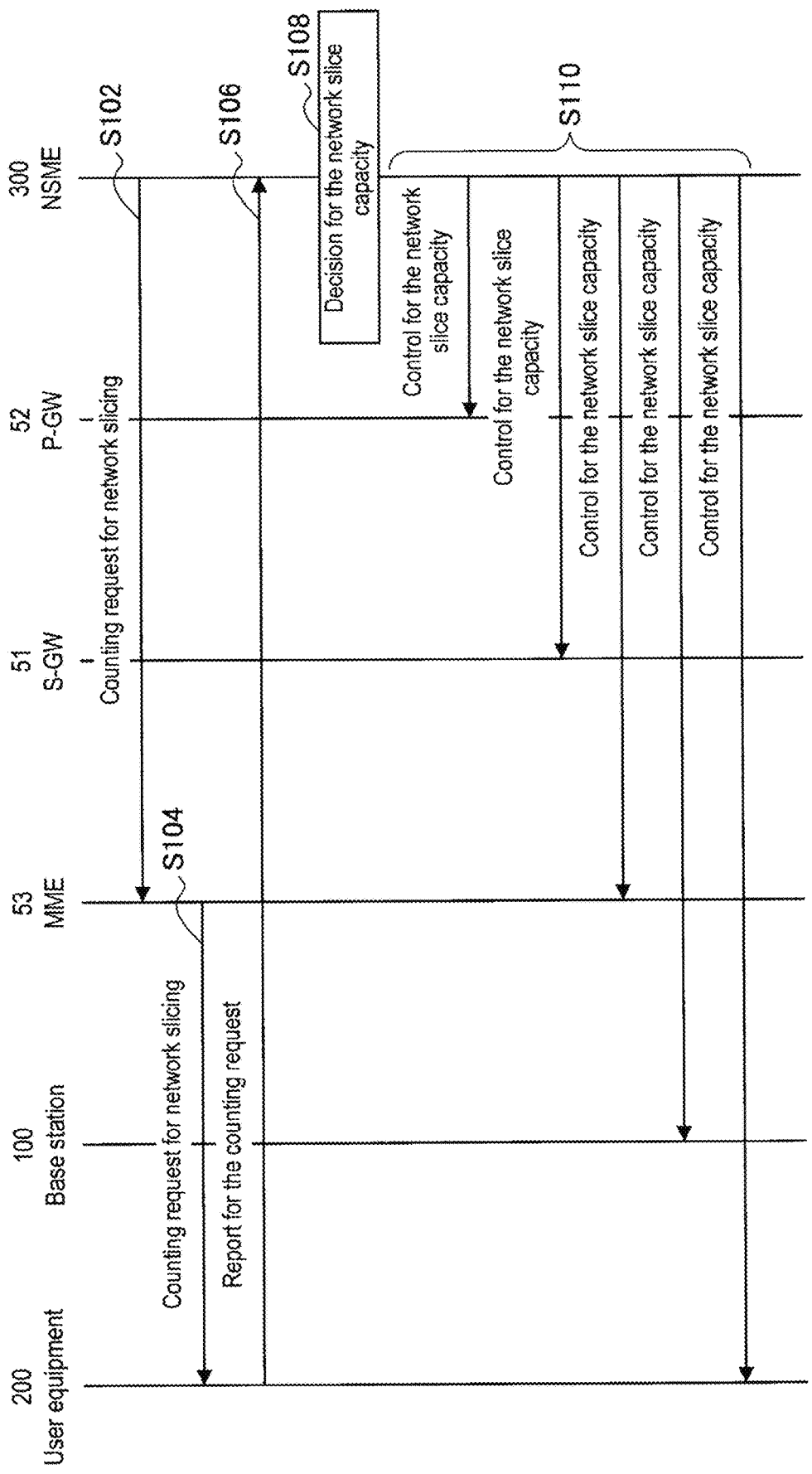
FIG. 15 is a sequence diagram illustrating an example of the flow of a procedure for controlling a network slice capacity by the system according to the present embodiment.

FIG. 15 is a sequence diagram illustrating an example of the flow of a procedure for controlling the network slice capacity by the system 1 according to the present embodiment. In the present sequence, the terminal device 200, the base station 100, the MME 53, the S-GW 51, the P-GW 52, and the NSME 300 are involved. As illustrated in FIG. 15, first, the NSME 300 transmits a counting request to the MME 53 (Step S102). Subsequently, the MME 53 transfers the received counting request to the terminal device 200 (Step S104). The MME 53 is able to transmit a message to each of the terminal devices 200, and therefore is used as a relay point of the counting request. Subsequently, the terminal device 200 reports the traffic prediction information to the NSME 300, as a report for the counting request (Step S106). Examples of the traffic prediction information are illustrated in Table 3 above. Then, the NSME 300 makes a decision for the network slice capacity on the basis of the traffic prediction information acquired from the terminal device 200 (Step S108). Thereafter, the NSME 300 transmits a message to each of the entities such as the terminal device 200, the base station 100, the MME 53, the S-GW 51, and the P-GW 52, and controls the network slice capacity (Step S110).

The message for controlling the network slice capacity includes, for example, designation of a computer resource to be used for a network slice, an instruction to establish a new network slice, an instruction to integrate network slices, or the like. Meanwhile, the designation of the computer resource to be used for an existing network slice may be designation of an amount of increase or decrease. Examples of the message for controlling the network slice capacity are illustrated in Table 4 below.

TABLE 4

Examples of message for controlling network slice capacity

| Item | Description |
| --- | --- |
| Designation of network slice ID | Network slice ID to be designated when existing network slice is to be designated |
| Designation #1 of computer resource | Number of cores |
| Designation #2 of computer resource | Memory volume |
| Designation #3 of computer resource | Hard disk volume (e.g. 1 Gbyte) |
| Designation #4 of computer resource | Ethernet speed (e.g. 100 Mbps) |

Here, the terminal device 200 that is incompatible with the counting procedure may be present. Therefore, the terminal device 200 reports capability information indicating whether the terminal device 200 is able to report the traffic prediction information, to the core network side (for example, the MME 53). With this configuration, it is possible to limit the terminal device 200 that serves as a destination of the counting request to the terminal device 200 that is able to report the traffic prediction information. In the following, the flow of a procedure related to collection of the capability information and determination of a destination of the counting request will be described in detail with reference to FIG. 16.

Figure 16:
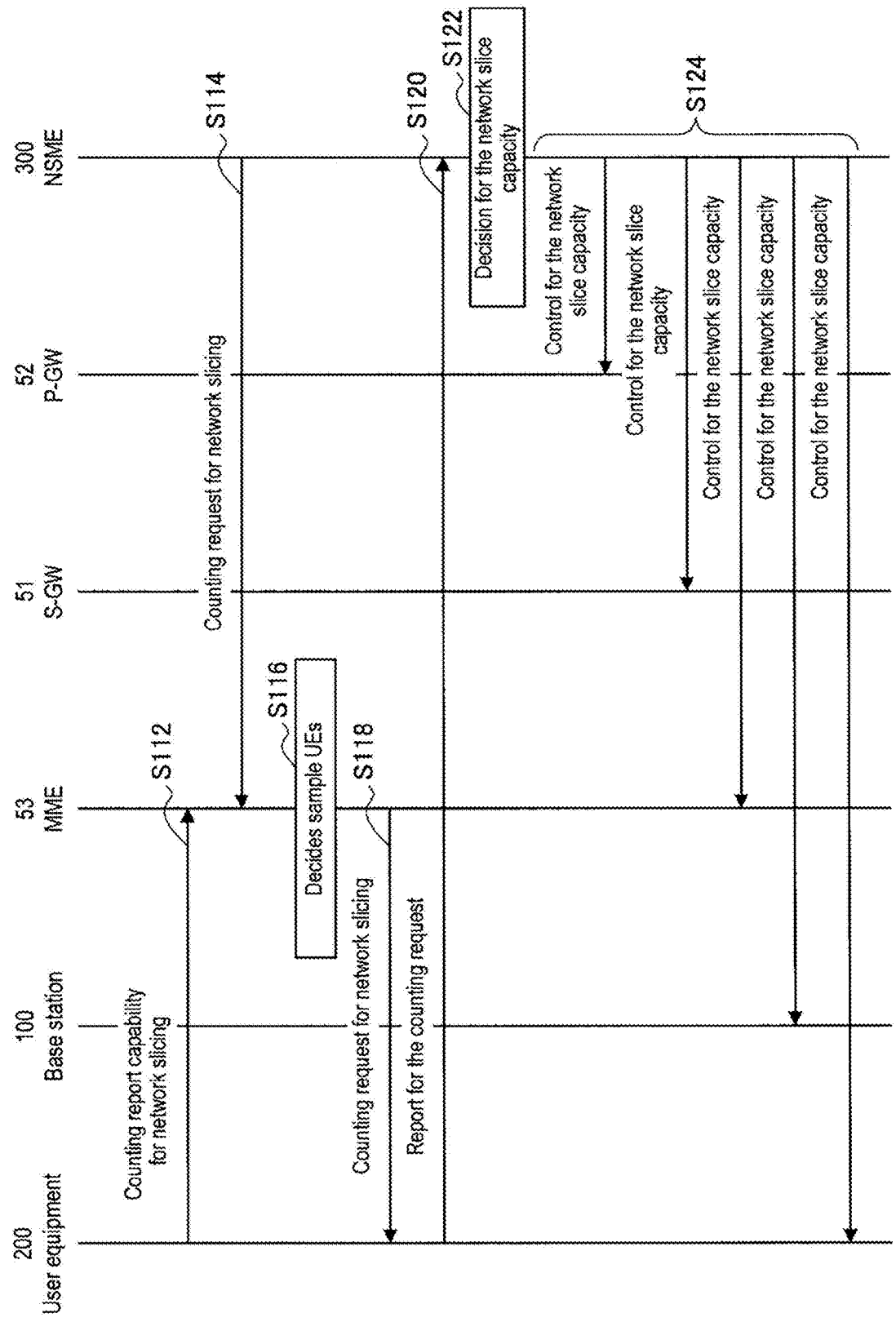
FIG. 16 is a sequence diagram illustrating an example of the flow of the procedure for controlling the network slice capacity by the system according to the present embodiment.

FIG. 16 is a sequence diagram illustrating an example of the flow of the procedure for controlling the network slice capacity by the system 1 according to the present embodiment. In the present sequence, the terminal device 200, the base station 100, the MME 53, the S-GW 51, the P-GW 52, and the NSME 300 are involved. As illustrated in FIG. 16, first, the terminal device 200 reports, to the MME 53, the capability information indicating whether the terminal device 200 is able to report the traffic prediction information (Step S112). Thereafter, the NSME 300 transmits a counting request to the MME 53 (Step S114). Then, the MME 53 determines the terminal device 200 that serves as a sample to be caused to report the traffic prediction information, on the basis of the capability information collected from the terminal device 200 (Step S116). Then, the MME 53 transfers a counting request to the terminal device 200 that is determined as the sample (Step S118). Subsequent processes at Steps S120 to S124 are the same as the processes at Steps S106 to S110 described above with reference to FIG. 15.

Here, the traffic prediction information returned in response to the counting request is different from what is called a Service Level Agreement (SLA). The SLA is a contract that is made between a service provider and a service subscriber about a service level. In cellular communication, a service provider (for example, a communication carrier) has a duty to allocate a communication resource to the terminal device 200 in accordance with the SLA. In contrast, the NSME 300 does not have a duty to provide the same network slice as requested in the traffic prediction information to the terminal device 200.

(4) DIFFERENCE FOR EACH SERVICE PROVIDER

Various services may be provided to the terminal device 200. Contents of the traffic prediction information and/or the counting procedure may be different depending on a type of an application provided by the terminal device 200. This will be described in detail below.

First Example

In a first example, a service provided to the terminal device 200 is a service of an application that is arranged on the Internet. The service provider arranges the application on the original server 61 illustrated in FIG. 7, for example. In the following, contents of the traffic prediction information and a counting procedure in the present example will be described in detail.

Collection from Terminal Device 200

The traffic prediction information may be collected from the terminal device 200. In this case, a trigger of the collection of the traffic prediction information is given by the service provider.

The service provider (for example, the original server 61) notifies the NSME 300 that the service provider starts to provide an application to the terminal device 200, before starting to provide the application to the terminal device 200. Accordingly, the NSME 300, by using the notice as a trigger, transmits a counting request to the terminal device 200 to which the application is to be provided, and receives a report of the traffic prediction information. With this configuration, the NSME 300 is able to control a network slice capacity on the basis of prediction of traffic that may occur due to the application that is to be started.

Meanwhile, the NSME 300 does not always start the counting procedure upon receiving the notice from the service provider. The NSME 300 may be able to select whether to start to the counting procedure. The NSME 300 may select whether to start to the counting procedure by integrating a plurality of notices. The notice from the service provider may include, for example, a type of the application to be started, an ID (for example, a subscriber number) of the terminal device 200, and the like.

An example of the flow of the procedure will be described below with reference to FIG. 17.

Figure 17:
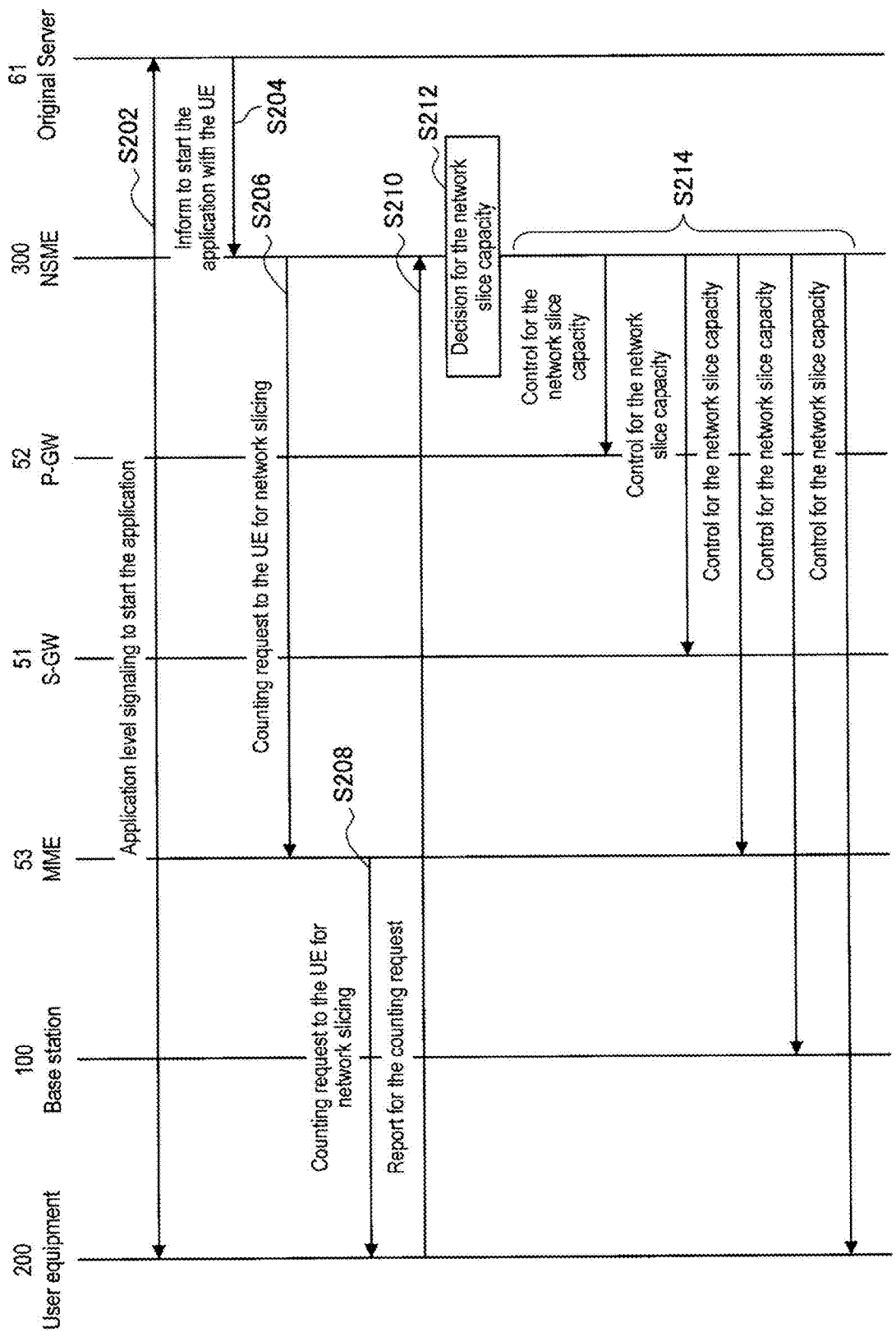
FIG. 17 is a sequence diagram illustrating an example of the flow of the procedure for controlling the network slice capacity by the system according to the present embodiment.

FIG. 17 is a sequence diagram illustrating an example of the flow of a procedure for controlling the network slice capacity by the system 1 according to the present embodiment. In the present sequence, the terminal device 200, the base station 100, the MME 53, the S-GW 51, the P-GW 52, the NSME 300, and the original server 61 are involved. An application of the service provider is arranged on the original server 61.

As illustrated in FIG. 17, first, the original server 61 transmits, to the terminal device 200, application level signaling indicating that the application is to be started (Step S202). Subsequently, the original server 61 transmits, to the NSME 300, information indicating that the application for the terminal device 200 is to be started (Step S204). This information includes, for example, a type of the application to be started, an ID (for example, a subscriber number) of the terminal device 200, and the like. Subsequently, the NSME 300 transmits, to the MME 53, a counting request for which a destination is set to the terminal device 200 to which the application is to be provided (Step S206), and the MME 53 transfers the counting request to the terminal device 200 (Step S208). Subsequent processes at Steps S210 to S214 are the same as the processes at Steps S106 to S110 described above with reference to FIG. 15.

Collection from Service Provider

The traffic prediction information may be collected from the service provider.

The service provider (for example, the original server 61), when starting to provide the application to the terminal device 200, reports the traffic prediction information to the NSME 300 spontaneously or in response to a request from the NSME 300. The NSME 300 controls the network slice capacity on the basis of the traffic prediction information reported from the service provider.

The traffic prediction information reported from the original server 61 is the same as the traffic prediction information reported from the terminal device 200. Specifically, the traffic prediction information reported from the original server 61 includes information for predicting traffic that may occur in the future in the network slice used by the terminal device 200. For example, the traffic prediction information reported from the original server 61 includes the information for which examples are illustrated in Table 3.

The traffic prediction information reported from the original server 61 may include other kinds of information in addition to or in place of the same information as the traffic prediction information reported from the terminal device 200. For example, the traffic prediction information reported from the original server 61 may include a type of the application to be started, the number of the terminal devices 200 (in other words, the number of subscribers) to which the application is to be provided, and the like. With this configuration, an integrated use prediction about the application to be provided to the plurality of terminal devices 200 is provided to the NSME 300.

When the traffic prediction information is reported from the service provider, a report of the traffic prediction information from the terminal device 200 may be omitted. It is of course possible to receive reports of the traffic prediction information from both of the service provider and the terminal device 200. In this case, the NSME 300 controls the network slice capacity on the basis of the traffic prediction information reported from both of the service provider and the terminal device 200.

An example of the flow of the procedure will be described below with reference to FIG. 18.

Figure 18:
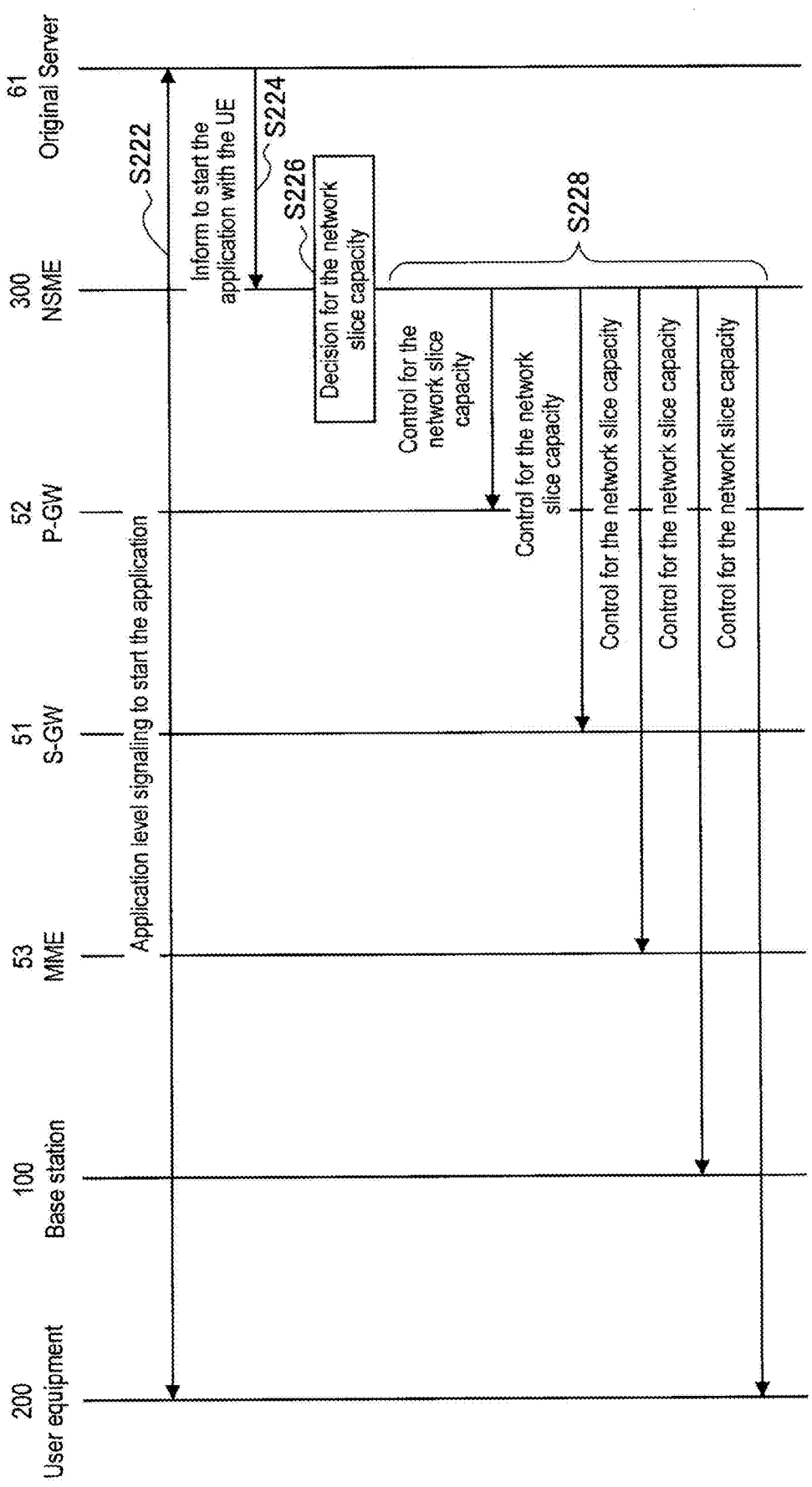
FIG. 18 is a sequence diagram illustrating an example of the flow of the procedure for controlling the network slice capacity by the system according to the present embodiment.

FIG. 18 is a sequence diagram illustrating an example of the flow of a procedure for controlling the network slice capacity by the system 1 according to the present embodiment. In the present sequence, the terminal device 200, the base station 100, the MME 53, the S-GW 51, the P-GW 52, the NSME 300, and the original server 61 are involved. An application of the service provider is arranged on the original server 61.

As illustrated in FIG. 18, first, the original server 61 transmits, to the terminal device 200, application level signaling indicating that the application is to be started (Step S222). Subsequently, the original server 61 transmits, to the NSME 300, information indicating that the application for the terminal device 200 is to be started (Step S204). This information includes the traffic prediction information. Subsequent processes at Steps S226 to S228 are the same as the processes at Steps S108 to S110 described above with reference to FIG. 15.

Second Example

In a second example, a service provided to the terminal device 200 is a service of an MEC application. The service provider arranges the MEC application on the MEC application server 41 illustrated in FIG. 7, for example. In the following, contents of the traffic prediction information and a counting procedure in the present example will be described in detail.

The second example is basically the same as the first example except that a position of the application is different. For example, the traffic prediction information may be reported from the terminal device 200 or may be reported from the MEC application server 41. Further, the traffic prediction information reported from the MEC application server 41 includes information for predicting traffic that may occur in the future in the network slice used by the terminal device 200. For example, the traffic prediction information reported from the service provider includes the information for which examples are illustrated in Table 3.

The traffic prediction information reported from the MEC application server 41 may include other kinds of information in addition to or in place of the same information as the traffic prediction information reported from the terminal device 200. For example, the traffic prediction information reported from the MEC application server 41 may include a type of the application to be started, the number of the terminal devices 200 (in other words, the number of subscribers) to which the application is to be provided, and the like. With this configuration, an integrated use prediction about the application to be provided to the plurality of terminal devices 200 is provided to the NSME 300.

Location Information on MEC Application

As a specific point of the second example, the traffic prediction information includes location information on the MEC application. The location information on the MEC application may be identification information (for example, an IP address) of an entity in which the MEC application is arranged. Further, the location information on the MEC application may be information indicating a main segment in which traffic may be increased or decreased due to the MEC application. The segment is the same as those described above with reference to FIG. 14. The traffic prediction information including the location information on the MEC application may be reported from the MEC application server 41 or may be reported from the terminal device 200.

In the following, control of the network slice capacity based on the location information on the MEC application will be described in detail.

The MEC application may be arranged at any position in a network. It is desirable to increase the network slice capacity between the MEC application and the terminal device 200. This is because traffic increases due to the start of the MEC application between the MEC application and the terminal device 200. In contrast, it is often the case that it is not necessary to increase the network slice capacity on the network side (on the P-GW 52 side) relative to the MEC application.

Therefore, the NSME 300 controls the network slice capacity on the basis of the location information on the MEC application. For example, the NSME 300 allocates a larger amount of resources to a segment that is located on the terminal device 200 side relative to the position of the MEC application in the network slice than a segment that is located on the network side relative to the MEC application. By controlling the network slice capacity based on the location information on the MEC application, it is possible to selectively increase the capacity of the segment between the MEC application and the terminal device 200. With this configuration, it is possible to improve resource efficiency and reduce a delay of the MEC application.

An example of the flow of the procedure will be described below with reference to FIG. 19.

Figure 19:
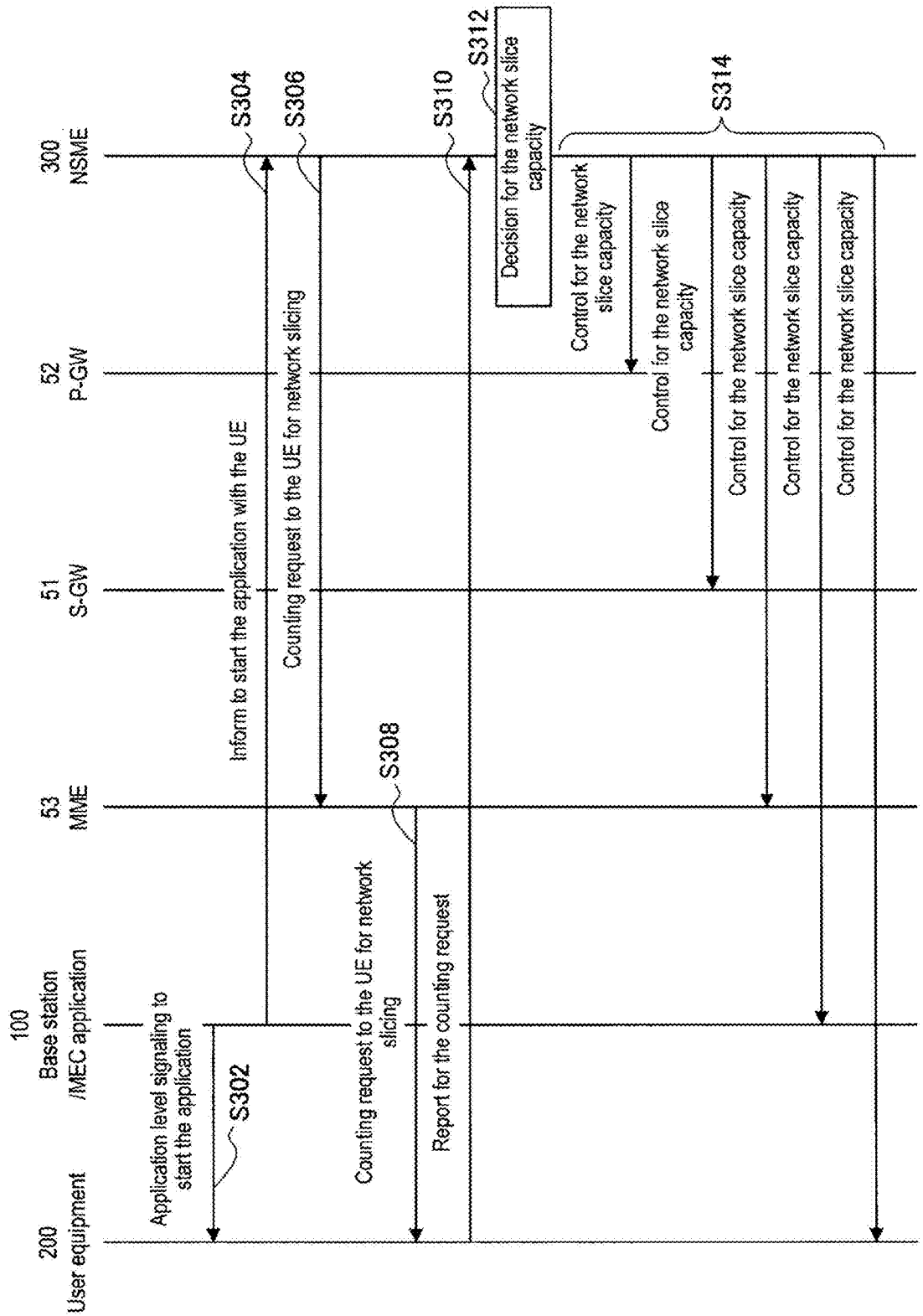
FIG. 19 is a sequence diagram illustrating an example of the flow of the procedure for controlling the network slice capacity by the system according to the present embodiment.

FIG. 19 is a sequence diagram illustrating an example of the flow of a procedure for controlling the network slice capacity by the system 1 according to the present embodiment. In the present sequence, the terminal device 200, the base station 100, the MME 53, the S-GW 51, the P-GW 52, and the NSME 300 are involved. In the present sequence, it is assumed that the MEC application server 41 is implemented as a logical entity and included in the base station 100. In other words, the MEC application is arranged on the base station 100.

As illustrated in FIG. 19, first, the base station 100 transmits, to the terminal device 200, application level signaling indicating that the MEC application is to be started (Step S302). Subsequently, the base station 100 transmits, to the NSME 300, information indicating that the MEC application for the terminal device 200 is to be started (Step S304). The information transmitted to the NSME 300 may include the location information on the MEC application. Subsequently, the NSME 300 transmits, to the MME 53, a counting request for which a destination is set to the terminal device 200 to which the MEC application is to be provided (Step S306), and the MME 53 transfers the counting request to the terminal device 200 (Step S308). Subsequent processes at Steps S310 to S314 are the same as the processes at Steps S106 to S110 described above with reference to FIG. 15.

Movement of MEC Application

The MEC application may be moved in accordance with movement of the terminal device 200 or the like. If the MEC application is moved, traffic is reduced in a moving source, and traffic is increased in a moving destination. Therefore, it is desirable to control the network slice capacity in accordance with movement of the MEC application.

Therefore, the traffic prediction information includes information on movement of the MEC application. The information on movement of the MEC application includes location information before movement, location information after movement, a moving time, information indicating a resource to be increased or decreased due to movement, and the like. The traffic prediction information including the information on movement of the MEC application may be reported from the MEC application server 41 or may be reported from the terminal device 200. Examples of the information on movement of the MEC application are illustrated in Table 5.

TABLE 5

Examples of information on movement of MEC application

| Item | Example |
| --- | --- |
| When to move | After 10 seconds |
| Amount of computer resources to be decreased in moving source | IP address of moving source and amount of computer resources to be decreased (number of cores, memory volume, etc.) |
| Amount of computer resources to be increased in moving destination | IP address of moving destination and amount of computer resources to be increased (number of cores, memory volume, etc.) |

The NSME 300 controls the network slice capacity on the basis of the information indicating movement of the MEC application. For example, the NSME 300 identifies a segment in which traffic is increased or decreased due to movement, and increases or decreases resources to be allocated to the segment. With this configuration, it is possible to improve resource efficiency both in the moving source and the moving destination of the MEC application, and it is possible to reduce a delay of the MEC application after movement.

Examples of the flow of the procedure will be described below with reference to FIG. 20 and FIG. 21.

Figure 20:
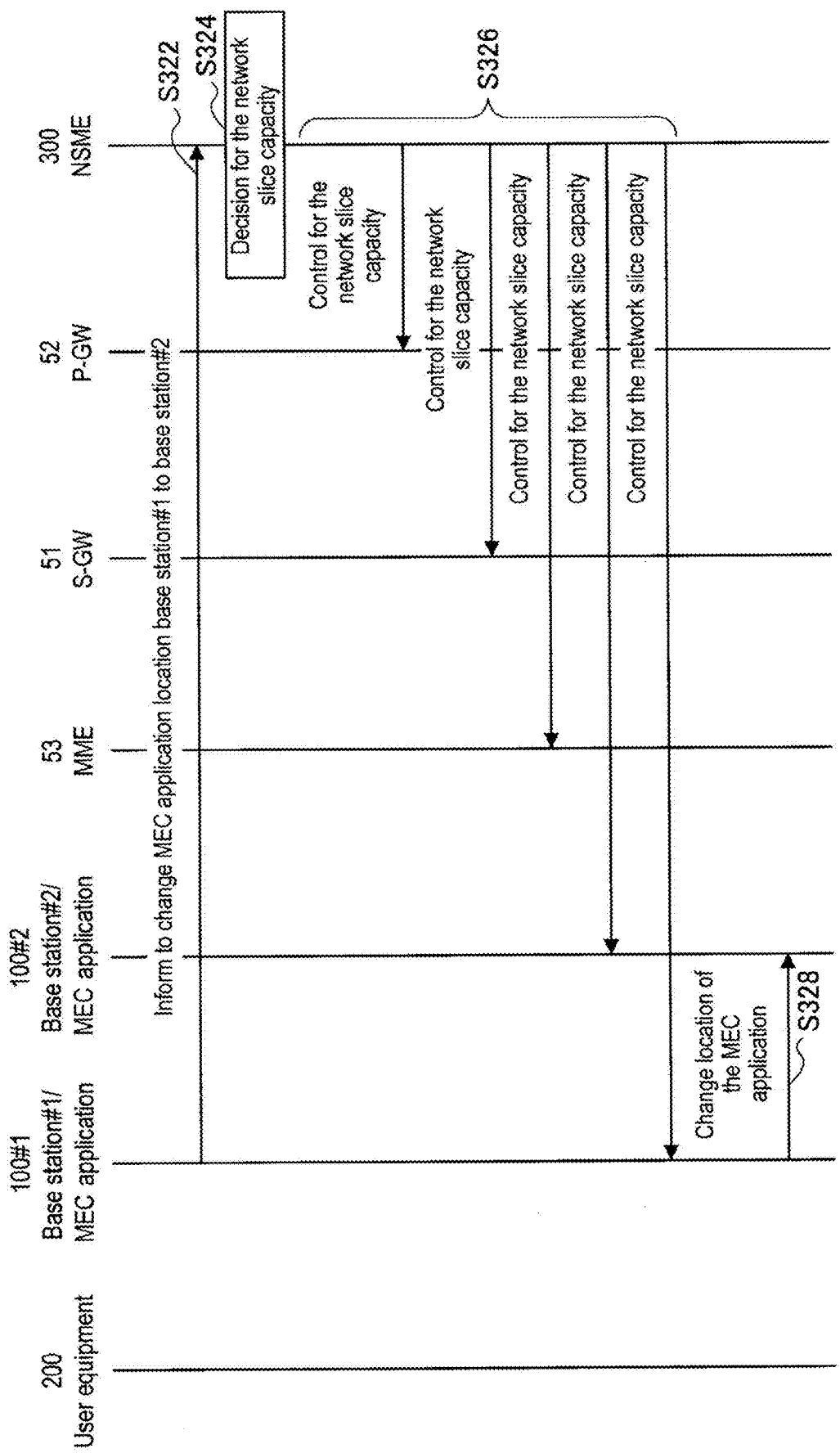
FIG. 20 is a sequence diagram illustrating an example of the flow of the procedure for controlling the network slice capacity by the system according to the present embodiment.

FIG. 20 is a sequence diagram illustrating an example of the flow of a procedure for controlling the network slice capacity by the system 1 according to the present embodiment. In the present sequence, a base station 100 #1, a base station 100 #2, the MME 53, the S-GW 51, the P-GW 52, and the NSME 300 are involved. In the present sequence, it is assumed that the MEC application server 41 is implemented as a logical entity and included in the base station 100. In other words, the MEC application is arranged in the base station 100. In the present sequence, a procedure that is performed when the MEC application arranged in the base station 100 #1 moves to the base station 100 #2 will be described.

As illustrated in FIG. 20, the base station 100 #1 notifies the NSME 300 of information indicating that the MEC application moves from the base station 100 #1 to the base station 100 #2 (Step S322). The NSME 300 makes a decision for the network slice capacity on the basis of the information provided by the base station 100 #1 (Step S324). Thereafter, the NSME 300 transmits a message to each of the entities, such as the base station 100 #1, the base station 100 #2, the MME 53, the S-GW 51, and the P-GW 52, and controls the network slice capacity (Step S326). Then, the base station 100 #1 moves the MEC application to the base station 100 #2 (Step S328).

Figure 21:
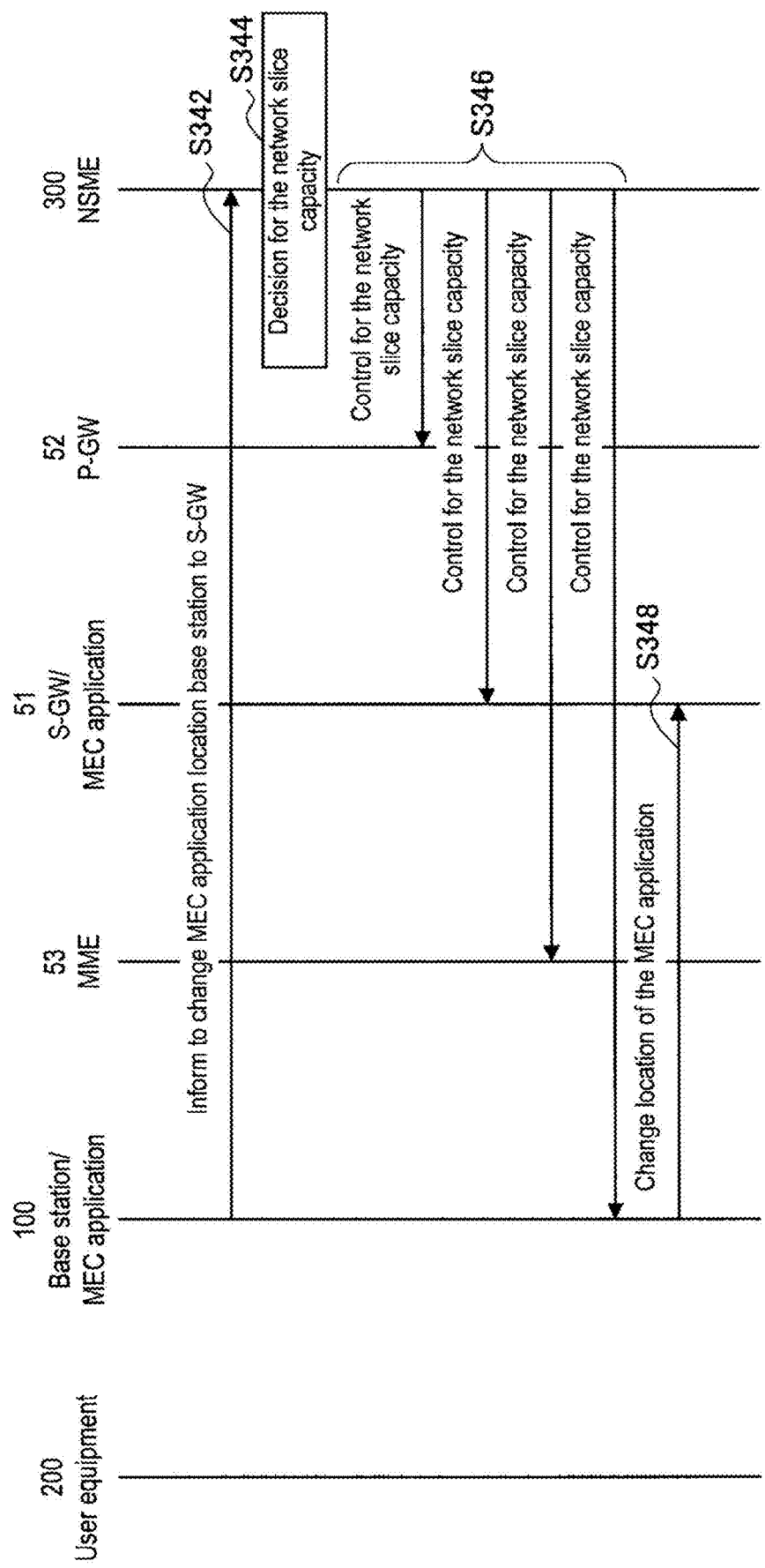
FIG. 21 is a sequence diagram illustrating an example of the flow of the procedure for controlling the network slice capacity by the system according to the present embodiment.

FIG. 21 is a sequence diagram illustrating an example of the flow of a procedure for controlling the network slice capacity by the system 1 according to the present embodiment. In the present sequence, the base station 100, the MME 53, the S-GW 51, the P-GW 52, and the NSME 300 are involved. In the present sequence, it is assumed that the MEC application server 41 is implemented as a logical entity and included in the base station 100. In other words, the MEC application is arranged in the base station 100. In the present sequence, a procedure that is performed when the MEC application arranged in the base station 100 #1 moves to the S-GW 51 will be described.

As illustrated in FIG. 21, the base station 100 notifies the NSME 300 of information indicating that the MEC application moves from the base station 100 to the S-GW (Step S342). Then, the NSME 300 makes a decision for the network slice capacity on the basis of the information provided by the base station 100 (Step S344). Thereafter, the NSME 300 transmits a message to each of the entities such as the base station 100, the MME 53, the S-GW 51, and the P-GW 52, and controls the network slice capacity (Step S346). Then, the base station 100 moves the MEC application to the S-GW 51 (Step S348).

Third Example

In a third example, a service provided to the terminal device 200 is an MBMS service. A service provider operates the MCE 42, the MBMS gateway 55, the BM-SC 56, and the content server 57 illustrated in FIG. 7, for example. In the following, contents of the traffic prediction information and a counting procedure in the present example will be described in detail.

In the present example, the traffic prediction information includes information indicating that a service to be provided is MBMS.

Further, the traffic prediction information includes information that is reported through a counting procedure in MBMS. Specifically, the traffic prediction information includes information on the number of users who are interested in an MBMS content (in other words, a program in MBMS). The MCE 42 performs a counting procedure at the time of starting to broadcast a content, counts the number of users who are interested in the content, and reports the traffic prediction information including information indicating a counting result to the NSME 300.

Furthermore, the traffic prediction information includes information indicating a traffic volume of each of broadcast, multicast, and unicast. This information may be generated based on the information that is reported through the counting procedure in MBMS. For example, whether the base station 100 provides a content by broadcast, multicast, or unicast is determined depending on the number of users who are interested in the MBMS content for each of the base stations 100. Then, the information is generated on the basis of the determination result and the traffic volume indicated by the content to be broadcasted.

In the case of MBMS, sessions are established between the MCE 42 and each of the base stations 100 that distribute the content to the terminal device 200. Therefore, the number of the sessions depends on the number of the base stations 100, but does not depend on the number of the terminal devices 200. For example, if the number of the base stations 100 that broadcast the content is M, M sessions are established between the MCE 42 and the base stations 100. In this manner, the number of the sessions does not depend on the number of the terminal devices 200, communication performed between the MCE 42 and the base station 100 has a low impact on the network slice capacity.

Meanwhile, the base station 100 is able to provide a content to the terminal device 200 by any of the methods such as broadcast, multicast, and unicast. A content providing method may have an impact on a type and a capacity of a network slice for MBMS in a RAN. For example, if broadcast is adopted, it is desirable to increase a capacity of a network slice for broadcast. In contrast, if unicast using a beam specific (UE specific) to the terminal device 200 is adopted for example, a network slice for MBMS in a RAN is implemented as unicast, so that it is desirable to increase a capacity of a network slice for unicast.

Therefore, the NSME 300 controls a type and a capacity of a network slice on the basis of the traffic prediction information. Specifically, if the traffic prediction information includes the information indicating that a to-be-provided service is MBMS, the NSME 300 controls a type and a capacity of a network slice in a RAN on the basis of the number of users who are interested in the content and the content providing method. For example, in a RAN in which unicast is adopted, the NSME 300 allocates a larger amount of resources to a network slice for MBMS that is implemented as unicast. Further, in a RAN in which broadcast is adopted, the NSME 300 allocates a larger amount of resources to a network slice for MBMS that is implemented as broadcast. Furthermore, the NSME 300 controls an amount of resources to be allocated to a network slice, in accordance with the number of users who are interested in the content. With this configuration, it is possible to optimize resource allocation to the network slice in the RAN in order to broadcast the MBMS content.

Moreover, the traffic prediction information includes information indicating a throughput to be satisfied and information indicating a viewing area. The information indicating the viewing area may be identification information (for example, an IP address) on the base station 100 that broadcasts the MBMS content. The NSME 300 controls an amount of resources to be allocated to a network slice, in accordance with the information indicating the throughput to be satisfied. With this configuration, it is possible to optimize resource allocation to the network slice in the RAN in order to broadcast the MBMS content. Furthermore, with use of the information indicating the viewing area, the NSME 300 is able to identify a network slice for which the capacity needs to be controlled.

An example of the flow of the procedure will be described below with reference to FIG. 22.

Figure 22:
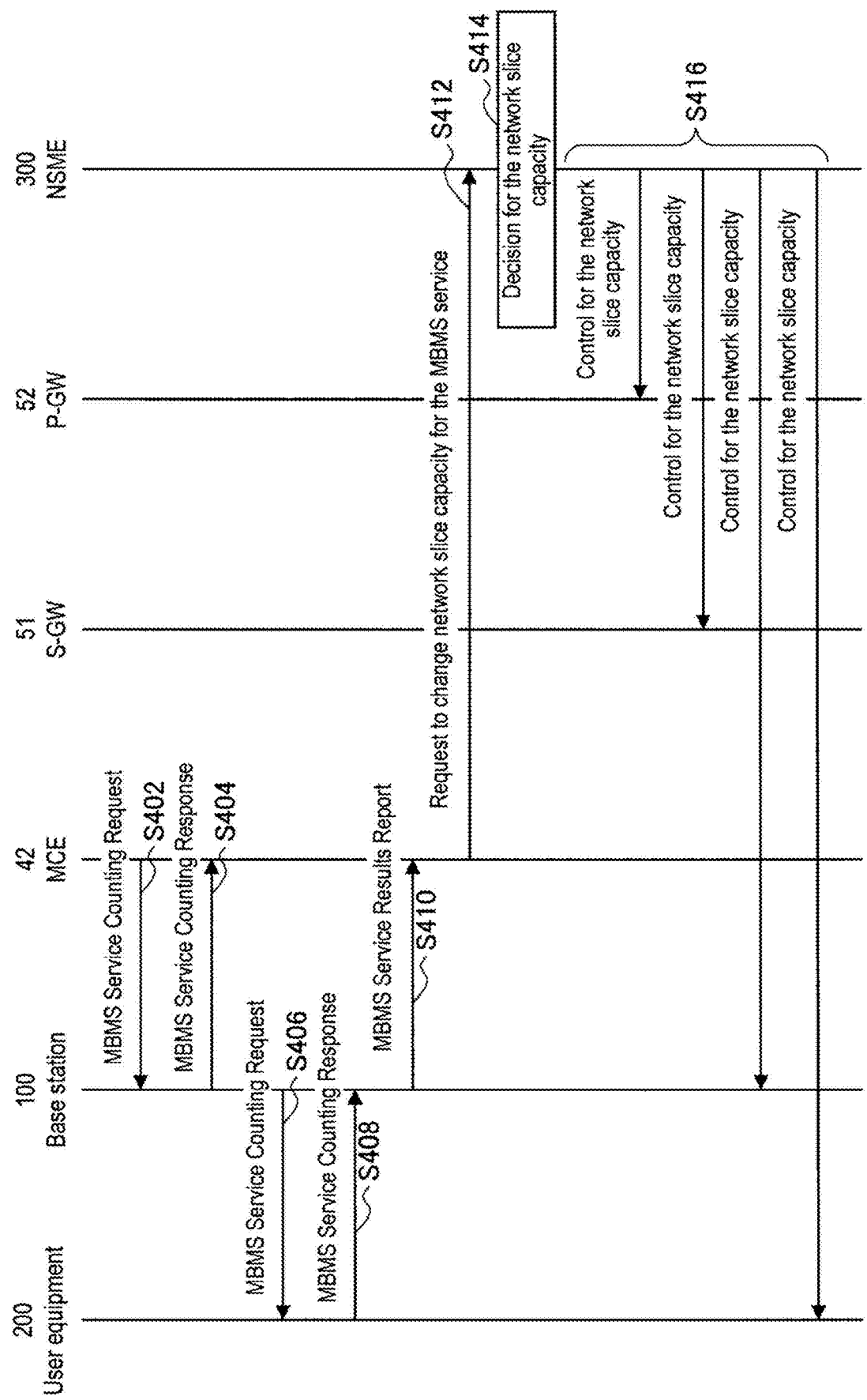
FIG. 22 is a sequence diagram illustrating an example of the flow of the procedure for controlling the network slice capacity by the system according to the present embodiment.

FIG. 22 is a sequence diagram illustrating an example of the flow of a procedure for controlling the network slice capacity by the system 1 according to the present embodiment. In the present sequence, the terminal device 200, the base station 100, the MCE 42, the S-GW 51, the P-GW 52, and the NSME 300 are involved.

As illustrated in FIG. 22, first, at Steps S402 to S410, a counting procedure for MBMS is performed. Processes at respective Steps are the same as the processes at Steps S12 to S20 described above with reference to FIG. 8. Subsequently, the MCE 42 transmits a request to change a network slice capacity for an MBMS service to the NSME 300. This request includes the traffic prediction information. The NSME 300 makes a decision for the network slice capacity on the basis of the request received from the MCE 42 (Step S414). Thereafter, the NSME 300 transmits a message to each of the entities such as the terminal device 200, the base station 100, the S-GW 51, and the P-GW 52 and controls the network slice capacity (Step S416).

<3.3. Control Based on Performance Measurement Result>

<3.3.1. Technical Problem>

It is desirable to appropriately change the network slice capacity in accordance with an actual use condition. To cope with this, it is desirable to provide a report about how much each of the entities involved in a network slice is satisfied with a current network slice capacity.

In this background, a mechanism that is able to appropriately change a network slice capacity in accordance with an actual use condition will be provided. Meanwhile, a content to be reported in this mechanism may be different from channel quality that is reported through an existing procedure called a measurement report procedure.

<3.3.2. Technical Feature>

(1) Overview

Each of the entities involved in the network slice used by the terminal device 200 measures performance of the network slice used by the terminal device 200, and reports performance measurement information indicating a measurement result to the NSME 300. The performance prediction information is information that is used by the NSME 300 to determine resource allocation to the network slice used by the terminal device 200. The performance measurement information is used to appropriately change the network slice capacity used by the terminal device 200. The entity that performs reporting may spontaneously report the performance measurement information to the NSME 300 or may report the performance measurement information to the NSME 300 in response to a request from the NSME 300.

The NSME 300 acquires the performance measurement information reported from each of the entities. To perform acquisition, the NSME 300 may transmit a message to request a report of the performance measurement information to the entity that is caused to perform reporting. This message is also referred to as a performance report request.

The entity that reports the performance measurement information is at least one of the terminal device 200, the base station 100, the S-GW 51, and the P-GW 52.

(2) Performance Measurement Information

The performance measurement information is information indicating a measurement result of performance of the network slice. The performance measurement information may include, for example, a measurement result of a delay and a throughput.

The performance measurement information is information that indicates a measurement result in a predetermined time period, instead of a measurement result in a moment. For example, the performance measurement information may include a throughput in a predetermined time period and a distribution of a packet delay in the predetermined time period.

The performance measurement information is used to recognize performance of an entire pipe as a network slice. Therefore, the performance measurement information need not be measured and reported for each of bearers addressed to each of the terminal devices 200. The performance of the entire pipe as the network slice is indicated by, for example, a degree at which a delay and a throughput indicated by set QoS are satisfied. Therefore, it is desirable to measure and report the performance measurement information for each QoS of traffic included in the network slice. QoS itself may be written as a delay and an error rate, but it is desirable that, as the information for controlling the network slice capacity, the performance measurement information includes a delay and a throughput for each set QoS.

Therefore, a delay and a throughput are measured for each QoS. Pieces of data with a plurality of kinds of QoS that are transmitted to or from the various terminal devices 200 may pass through a single network slice. Therefore, measurement results of delays and throughputs of all of the terminal devices 200 are integrated for each QoS. Then, the measurement result of the delay and the throughput for each QoS is reported as the performance measurement information.

Here, with reference to FIG. 6 again, the plurality of terminal devices 200 are present (the UEs #1, #2, and #3) that use the single network slice #1, and each of the terminal devices 200 uses a plurality of kinds of QoS (QoS of 1 and 2). In the example illustrated in FIG. 6, a delay and a throughput are measured in each of the bearers #1 to #6. Then, measurement results for the bearers #1, #2, and #3 for which QoS is set to 1 are integrated and reported as the performance measurement report information for QoS of 1. Further, measurement results for the bearers #4, #5, and #6 for which QoS is set to 2 are integrated and reported as the performance measurement report information for QoS of 2.

The performance is measured for each of segments. Then, the performance measurement information is reported for each of the segments. Specifically, each of the entities involved in the network slice used by the terminal device 200 may report, as the performance measurement information, a measurement result of performance of a segment for which each of the entities serves as one end (an entrance or an exit) among a plurality of segments included in the network slice used by the terminal device 200. For example, the terminal device 200 may measure the performance of the segment #1 that is a segment for which the terminal device 200 serves as one end, and report the performance measurement information to the NSME 300. Further, the base station 100 may measure the performance of at least one of the segments #1 and #2 that are segments for which the base station 100 serves as one ends, and report the performance measurement information to the NSME 300. Furthermore, the S-GW 51 may measure the performance of at least one of the segments #2 and #3 that are segments for which the S-GW 51 serves as one ends, and report the performance measurement information to the NSME 300. Moreover, the P-GW 52 may measure the performance of the segment #3 that is the segment for which the P-GW 52 serves as one end, and report the performance measurement information to the NSME 300.

The delay may be measured by obtaining a difference between a timestamp that is added to data by the entity at the entrance of the segment and a time at which the data arrives at the entity at the exit of the segment. In this case, the delay is typically measured by the entity at the exit of the segment.

The delay may be measured by obtaining a difference between a time at which data arrives at the entity at the entrance of the segment and a time at which a reception response (ACK or NACK) of the data from the entity at the exit of the segment arrives at the entity at the entrance. In this case, the delay is typically measured by the entity at the entrance of the segment.

The throughput may be measured by, for example, counting a traffic volume that has passed through the entity at the entrance of the segment and a traffic volume that has passed through the entity at the exit of the segment for a predetermined time period for each QoS. The throughput is typically measured by each of the entities at the entrance and the exit of the segment.

Here, the entity at the entrance and the entity at the exit may separately report respective measurement results to the NSME 300. Alternatively, one of the entity at the entrance and the entity at the exit may integrate the measurement results obtained by the entity at the entrance and the entity at the exit, and report the result to the NSME 300.

Examples of the performance measurement information will be illustrated in Table 6 below.

TABLE 6

Examples of performance measurement information

|  | Report example #1 | Report example #2 | Report example #3 |
|---|---|---|---|
| Subject of report | Base station | Terminal device | S-GW |
| Segment | Segment #1 | Segment #1 | Segment #2 |
| UL/DL | UL | DL | DL |
| QoS | QoS = 1 | QoS = 1 | QoS = 2 |
| Throughput | 50 Mbps | 100 Mbps | 1 Gbps |
| Delay | 5 ms | 3 ms | 2 ms |

In the example illustrated in Table 6 as described above, the performance measurement information on the segment #1 (a segment between the base station and the terminal device) is reported from both of the base station 100 and the terminal device 200. In other words, in the example illustrated in Table 6 above, the performance measurement information on the same segment is reported by each of the entities at the entrance and the exit of the segment.

(3) Efficiency of Collection of Performance Measurement Information

The NSME 300 collects the performance measurement information indicating a measurement result of performance of each of segments included in the network slice used by the terminal device 200, from the entities at the ends of the segments. The NSME 300 may specify a part of entities as a sample that is to be caused to report the performance measurement information from among a plurality of entities for which each of the segments serves as an end, and collect the performance measurement information from the entity specified as the sample. For example, the NSME 300 transmits a performance report request to a part of entities that serves as a sample to be caused to report the performance measurement information among a plurality of entities for which each of the segments serves as an end, and causes the specified entity to report the performance measurement information. With this configuration, it is possible to reduce load on each of the entities to report the performance measurement information. The number of entities, for which each of the segments serves as an end, increases as the segment is located closer to the terminal device 200. Therefore, an effect to reduce the load on reporting, which is achieved by limiting the entity that is caused to report the performance measurement information, increases in the segment that is located closer to the terminal device 200.

Here, the entity that is incompatible with the performance measurement and report procedure may be present. Therefore, each of the entities (in particular, the base station 100 and the terminal device 200) involved in the network slice used by the terminal device 200 may report capability information indicating whether the entity is able to report the performance measurement information to the core network side (for example, the MME 53). With this configuration, it is possible to limit the base station 100 and the terminal device 200 that serve as destinations of the performance report request to the base station 100 and the terminal device 200 that are able to report the performance measurement information.

In the following, a concrete example of the collection of the performance measurement information will be described.

As for the segment #1, the performance of the network slice between a part of the terminal devices 200 and the base station 100 is measured and reported as a representative value of the performance of the network slice of the segment #1. Specifically, in the segment #1, the plurality of terminal devices 200 that use the network slice that passes through the base station 100 may be involved. Therefore, the base station 100 reports, as the performance measurement information on the segment #1, a measurement result of the performance of the base station 100 and a measurement result of the performance of the terminal device 200 that is specified as a sample among the plurality of terminal devices 200 to the NSME 300.

As for the segment #2, the performance of the network slice between a part of the base stations 100 and the S-GW 51 is measured and reported as a representative value of the performance of the network slice of the segment #2. Specifically, in the segment #2, the S-GW 51 and the plurality of base stations 100 that use the network slice that passes through the S-GW 51 may be involved. Therefore, the S-GW 51 reports, as the performance measurement information on the segment #2, a measurement result of the performance of the S-GW 51 and a measurement result of the performance of the base station 100 that is specified as a sample among the plurality of base stations 100 to the NSME 300.

As for the segment #3, the performance of the network slice between a part of the S-GW 51 and the P-GW 52 is measured and reported as a representative value of the performance of the network slice of the segment #3. Specifically, in the segment #3, the P-GW 52 and the plurality of S-GWs 51 that use the network slices that pass through the P-GW 52 may be involved. Therefore, the P-GW 52 reports, as the performance measurement information on the segment #3, a measurement result of the performance of the P-GW 52 and a measurement result of the performance of the S-GW 51 that is specified as a sample among the plurality of the S-GWs 51 to the NSME 300.

(4) Control of Network Slice Capacity Based on Performance Measurement Information The NSME 300 controls the network slice capacity on the basis of the collected performance measurement information. Specifically, the NSME 300 determines resource allocation to the network slice used by the terminal device 200, on the basis of the performance information. Determination of the resource allocation to the network slice used by the terminal device 200 includes determination of whether to change the network slice capacity that is currently used by the terminal device 200, determination of an amount of increase or decrease when the capacity is to be changed, or the like. Control of the network slice capacity is realized by, for example, determination of an amount of computer resources allocated to network functions and connections among the network functions by switching. In the following, with reference to FIG. 23, an example of the flow of a procedure related to the control of the network slice capacity will be described.

Figure 23:
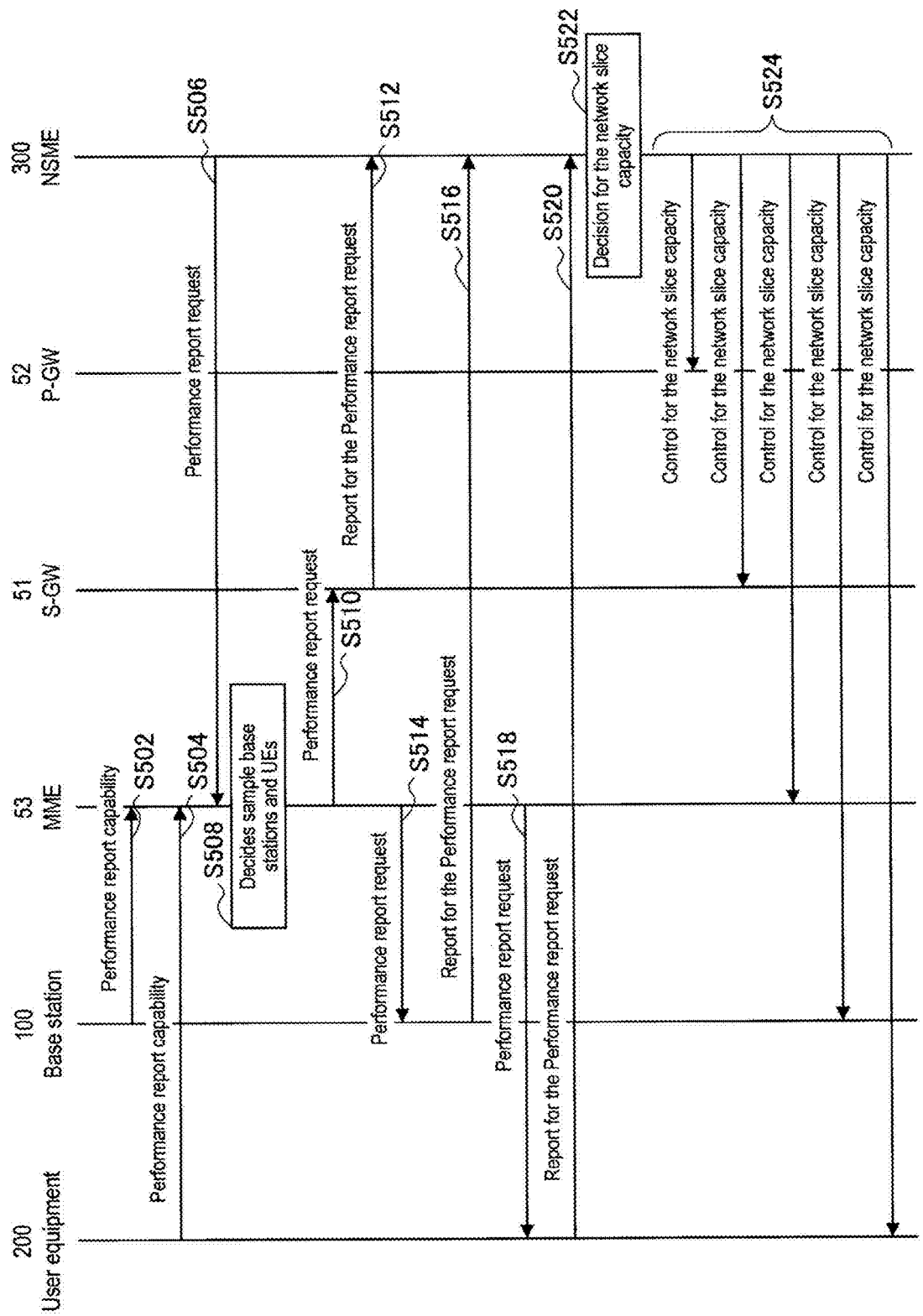
FIG. 23 is a sequence diagram illustrating an example of the flow of the procedure for controlling the network slice capacity by the system according to the present embodiment.

FIG. 23 is a sequence diagram illustrating an example of the flow of a procedure for controlling the network slice capacity by the system 1 according to the present embodiment. In the present sequence, the terminal device 200, the base station 100, the MME 53, the S-GW 51, the P-GW 52, and the NSME 300 are involved.

As illustrated in FIG. 23, first, the base station 100 reports, to the MME 53, capability information indicating whether the base station 100 is able to perform report the performance measurement information (Step S502). Similarly, the terminal device 200 reports, to the MME 53, capability information indicating whether the terminal device 200 is able to report the performance measurement information (Step S504).

Subsequently, the NSME 300 transmits a performance report request to the MME 53 (Step S506). Then, the MME 53 determines the base station 100 and the terminal device 200 that serve as samples to be caused to report the performance measurement information, on the basis of the capability information acquired at Step S502 and S504 (Step S508). Then, the MME 53 transfers a performance report request to the S-GW 51 and to the base station 100 and the terminal device 200 that are determined as the samples.

First, the MME 53 transfers the performance report request to the S-GW 51 (Step S510). Accordingly, the S-GW 51 measures performance of a network slice, and reports the performance measurement information as a report for the performance report request to the NSME 300 (Step S512).

Subsequently, the MME 53 transfers the performance report request to the base station 100 that is determined as the sample (Step S514). Accordingly, the base station 100 measures performance of a network slice, and reports the performance measurement information as a report for the performance report request to the NSME 300 (Step S516).

Then, the MME 53 transfers the performance report request to the terminal device 200 that is determined as the sample (Step S518). Accordingly, the terminal device 200 measures performance of a network slice, and reports the performance measurement information as a report for the performance report request to the NSME 300 (Step S520).

Then, the NSME 300 makes a decision for the network slice capacity on the basis of the performance measurement information acquired from the base station 100, the terminal device 200, and the S-GW 51 (Step S522). Thereafter, the NSME 300 transmits a message to each of the entities such as the terminal device 200, the base station 100, the MME 53, the S-GW 51, and the P-GW 52 and controls the network slice capacity (Step S524).

In the processes as described above, the performance measurement information on the same segment is reported by each of the entities at the entrance and the exit of the segment. In contrast, the performance measurement information on the same segment may be integrated and reported by one of the entities at the entrance and the exit of the segment. With this configuration, it is possible to reduce signaling for reporting the performance measurement information. For example, the base station 100 may integrate and report the performance measurement information on the segment #1 (the segment between the base station and the terminal device). In this case, it is possible to reduce signaling in the core network. The flow of processes in this case will be described with reference to FIG. 24.

Figure 24:
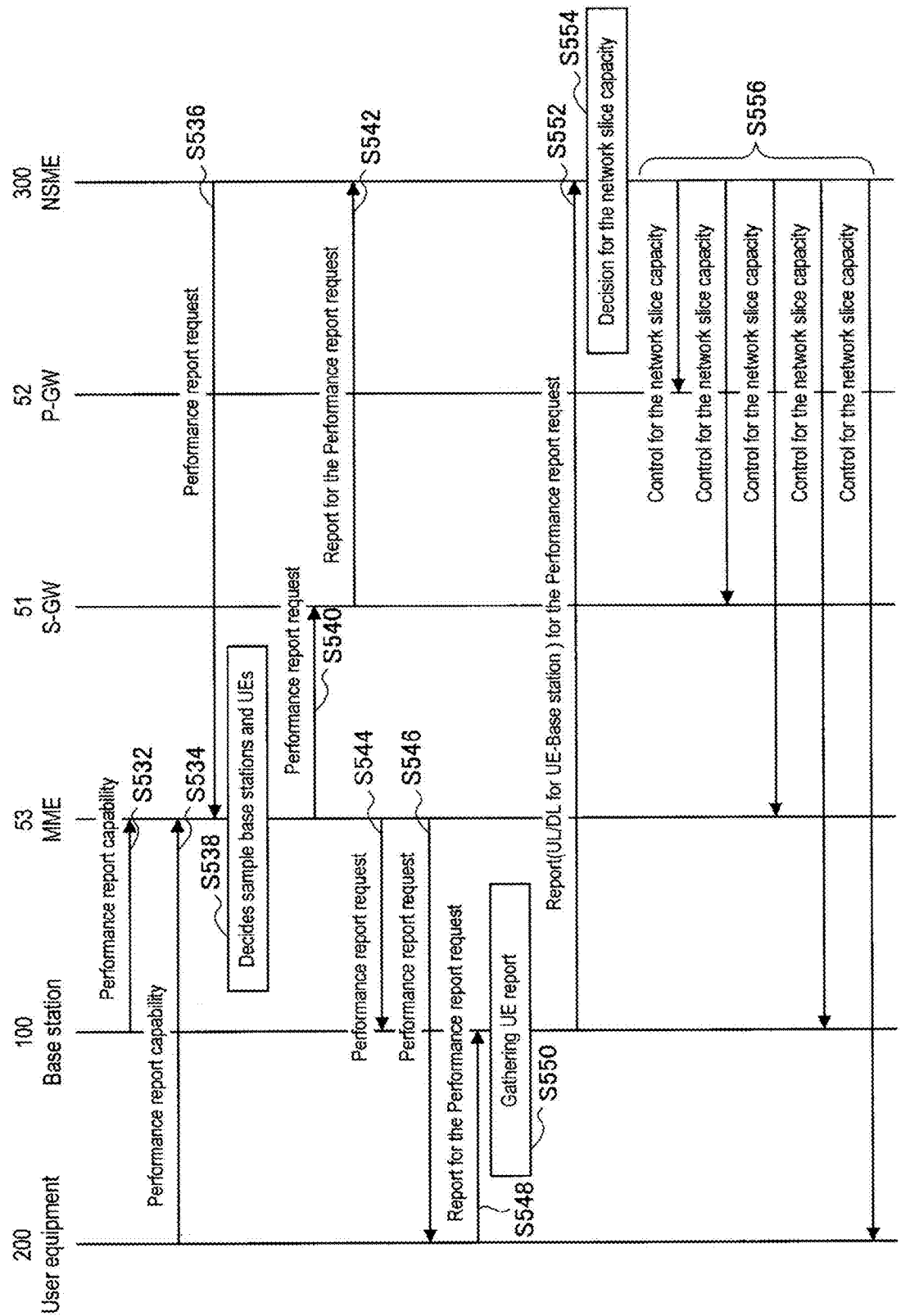
FIG. 24 is a sequence diagram illustrating an example of the flow of the procedure for controlling the network slice capacity by the system according to the present embodiment.

FIG. 24 is a sequence diagram illustrating an example of the flow of a procedure for controlling the network slice capacity by the system 1 according to the present embodiment. In the present sequence, the terminal device 200, the base station 100, the MME 53, the S-GW 51, the P-GW 52, and the NSME 300 are involved.

Processes at Steps S532 to S538 illustrated in FIG. 24 are the same as the processes at Steps S502 to S508 described above with reference to FIG. 23. At Step S538, the MME 53 determines the base station 100 and the terminal device 200 that serve as samples to be caused to report the performance measurement information, on the basis of the capability information acquired from the base station 100 and the terminal device 200. Then, the MME 53 transfers a performance report request to the S-GW 51 and to the base station 100 and the terminal device 200 that are determined as the samples.

Processes at Steps S540 to S542 are the same as the processes at Steps S510 to S512 described above with reference to FIG. 23.

Subsequently, the MME 53 transfers a performance report request to the base station 100 and the terminal device 200 that are determined as the samples (Step S544 and S546). Accordingly, the terminal device 200 measures performance of a network slice, and reports the performance measurement information as a report for the performance report request to the base station 100 (Step S548). The base station 100 measures performance of a network slice, and generates the performance measurement information to be reported to the NSME 300 by integrating the performance measurement information reported from the terminal device 200 (Step S550). For example, the base station 100 generates information indicating a measurement result of a delay and a throughput in uplink and downlink in the segment #1 (the segment between the base station and the terminal device). Then, the base station 100 reports the generated performance measurement information to the NSME 300 (Step S552).

Processes at Steps S554 to S556 are the same as the processes at Steps S522 to S524 described above with reference to FIG. 23.

4. APPLICATION EXAMPLES

The technology according to the present disclosure is applicable to various products. For example, the control entities, such as the NSME 300, the MEC application server 41, the MCE 42, the S-GW 51, and the P-GW 52, may be implemented as any kind of servers, such as tower servers, rack servers, or blade servers. Further, the control entities may be control modules mounted on a server (for example, an integrated circuit module configured with a single die, or a card or a blade to be inserted in a slot of a blade server).

Furthermore, for example, the base station 100 may be implemented by any kind of evolved Node B (eNB), such as a macro eNB or a small eNB. The small eNB may be a certain eNB, such as a pico eNB, a micro eNB, or a home (femto) eNB, that covers a smaller cell than a macrocell. Alternatively, the base station 100 may be implemented by other kinds of base stations, such as NodeB or Base Transceiver Station (BTS). The base station 100 may include a main body (also referred to as a base station device) that controls radio communication, and one or more Remote Radio Heads (RRHs) that are arranged at different places from the main body. Furthermore, various kinds of terminals (to be described later) temporarily or permanently execute functions of a base station and operate as the base station 100.

Moreover, for example, the terminal device 200 may be implemented as a mobile terminal, such as a smartphone, a tablet Personal Computer (PC), a notebook PC, a mobile game terminal, a mobile/dongle mobile router, or a digital camera, or an in-vehicle terminal, such as a car navigation device. Furthermore, the terminal device 200 may be implemented by a terminal (also referred to as a Machine Type Communication (MTC) terminal) that performs Machine To Machine (M2M) communication. Moreover, the terminal device 200 may be a radio communication module (for example, an integrated circuit module configured with a single die) that is mounted on the above-described terminals.

<4.1. Application Example on Control Entity>

Figure 25:
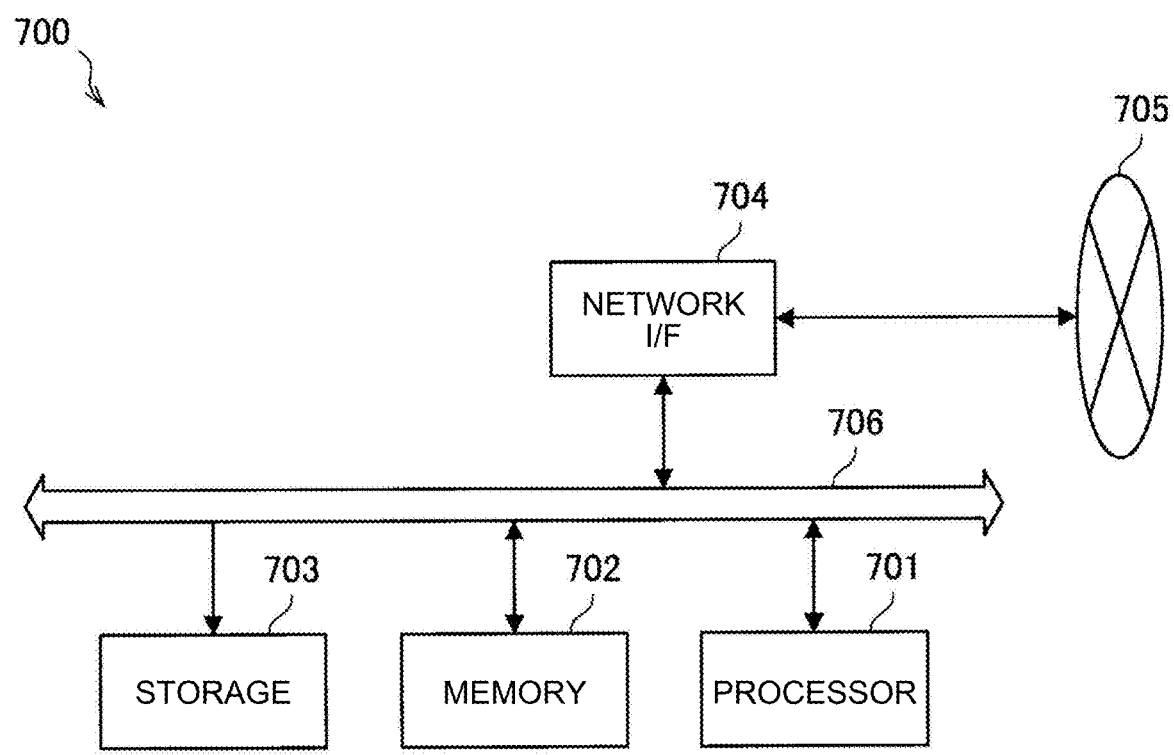
FIG. 25 is a block diagram illustrating an example of a schematic configuration of a server.

FIG. 25 is a block diagram illustrating an example of a schematic configuration of a server 700 to which the technology according to the present disclosure may be applied. The server 700 includes a processor 701, a memory 702, a storage 703, a network interface 704, and a bus 706.

The processor 701 may be, for example, a Central Processing Unit (CPU) or a Digital Signal Processor (DSP), and controls various functions of the server 700. The memory 702 includes a Random Access Memory (RAM) and a Read Only Memory (ROM), and stores therein a program to be executed by the processor 701 and data. The storage 703 may include a storage medium, such as a semiconductor memory or a hard disk.

The network interface 704 is a wired communication interface for connecting the server 700 to a wired communication network 705. The wired communication network 705 may be a core network, such as an Evolved Packet Core (EPC), or a Packet Data Network (PDN), such as the Internet.

The bus 706 connects the processor 701, the memory 702, the storage 703, and the network interface 704 to one another. The bus 706 may include two or more buses (for example, a high-speed bus and a low-speed bus) with different speeds.

In the server 700 illustrated in FIG. 25, one or more structural elements (the acquisition unit 331 and/or the network slice control unit 333) included in the control unit 330 described above with reference to FIG. 11, one or more structural elements (the reporting unit 431 and/or the service providing unit 433) included in the control unit 430 described above with reference to FIG. 12, or one or more structural elements (the reporting unit 531 and/or the communication control unit 533) included in the control unit 530 described above with reference to FIG. 13 may be implemented by the processor 701. As one example, a program that causes a processor to function as one or more of the above-described structural elements (in other words, a program that causes the processor to perform operation of one or more of the above-described structural elements) may be installed in the server 700, and the processor 701 may execute the program. As another example, the server 700 may include a module including the processor 701 and the memory 702, and the module may implement one or more of the above-described structural elements. In this case, the above-described module may store, in the memory 702, a program that causes a processor to function as one or more of the above-described structural elements, and cause the processor 701 to execute the program. As described above, it may be possible to provide the server 700 or the above-described module as a device that includes one or more of the above-described structural elements, and provide the above-described program that causes a processor to function as the above-described structural elements. Furthermore, it may be possible to provide a readable recording medium in which the above-described program is recorded.

Moreover, in the server 700 illustrated in FIG. 25, for example, the network communication unit 310 described above with reference to FIG. 11, the network communication unit 410 described above with reference to FIG. 12, or the network communication unit 510 described above with reference to FIG. 13 may be implemented by the network interface 704. Furthermore, the storage unit 320, the storage unit 420, or the storage unit 520 may be implemented by the memory 702 and/or the storage 703.

<4.2. Application Examples of Base Station>

First Application Example

Figure 26:
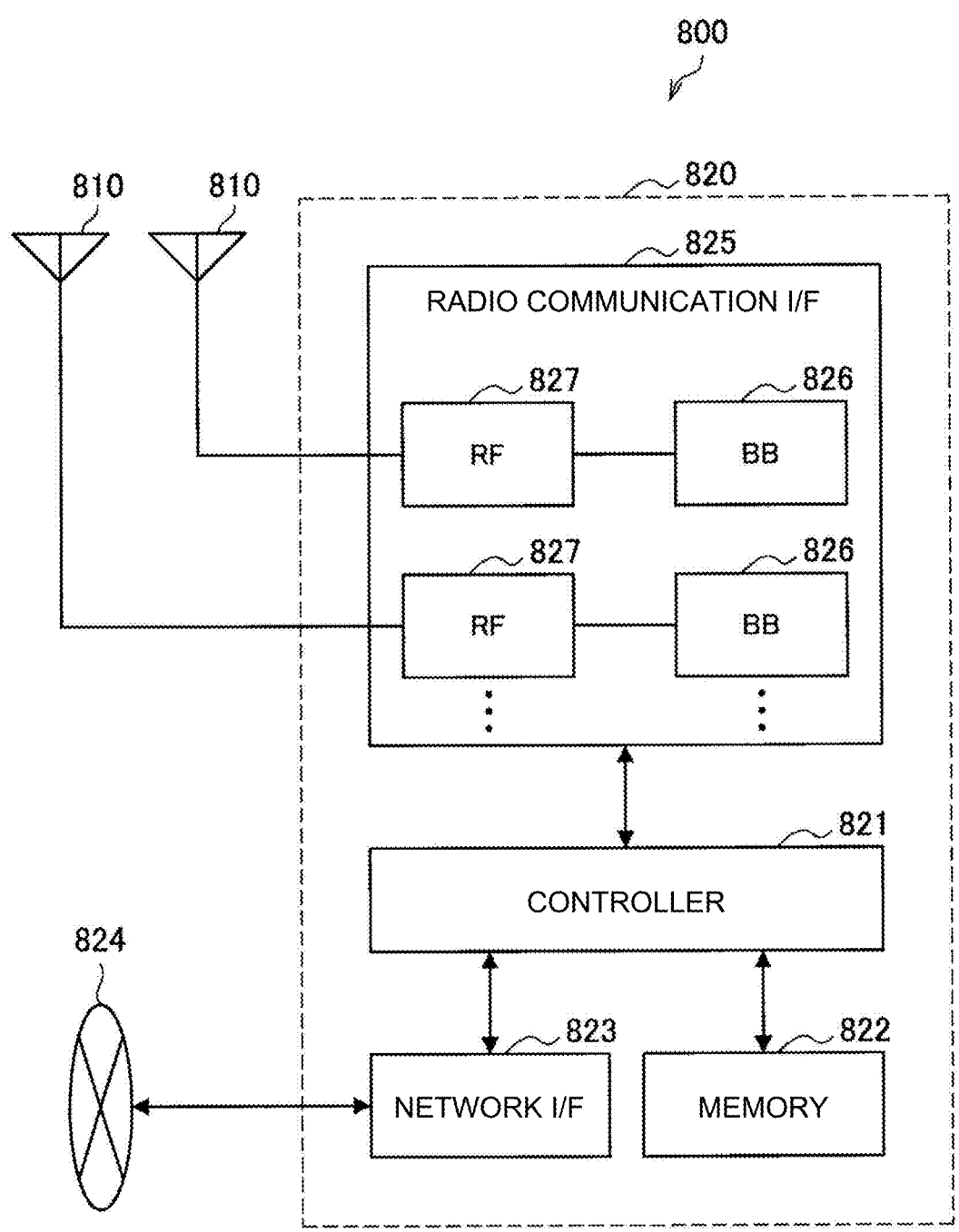
FIG. 26 is a block diagram illustrating a first example of a schematic configuration of an eNB.

FIG. 26 is a block diagram illustrating a first example of a schematic configuration of an eNB to which the technology according to the present disclosure is applicable. An eNB 800 includes one or more antennas 810 and a base station device 820. All of the antennas 810 and the base station device 820 are connected to one another via RF cables.

Each of the antennas 810 includes one or more antenna elements (for example, a plurality of antenna elements that constitute a MIMO antenna), and is used for transmission and reception of radio signals by the base station device 820. The eNB 800 may include the plurality of antennas 810 as illustrated in FIG. 26, and the plurality of antennas 810 may respectively correspond to a plurality of frequency bands used by the eNB 800, for example. Meanwhile, while the example in which the eNB 800 includes the plurality of antennas 810 is illustrated in FIG. 26, the eNB 800 may include the single antenna 810.

The base station device 820 includes a controller 821, a memory 822, a network interface 823, and a radio communication interface 825.

The controller 821 may be, for example, a CPU or a DSP, and operates various functions in a higher-level layer of the base station device 820. For example, the controller 821 generates a data packet from data in a signal processed by the radio communication interface 825, and transfers the generated packet via the network interface 823. The controller 821 may generate a bundled packet by bundling data obtained from processors in a plurality of basebands, and transfer the generated bundled packet. Further, the controller 821 may have a logical function to perform control, such as Radio Resource Control, Radio Bearer Control, Mobility Management, Admission Control, or Scheduling. Furthermore, this control may be performed in cooperation with peripheral eNBs or core network nodes. The memory 822 includes a RAM and a ROM, and stores therein a program to be executed by the controller 821, and various kinds of control data (for example, a terminal list, transmission power data, scheduling data, and the like).

The network interface 823 is a communication interface for connecting the base station device 820 to a core network 824. The controller 821 may communicate with a core network node or a different eNB via the network interface 823. In this case, the eNB 800 and the core network node or the different eNB may be connected to each other via a logical interface (for example, an S1 interface or an X2 interface). The network interface 823 may be a wired communication interface or a radio communication interface for radio backhaul. If the network interface 823 is a radio communication interface, the network interface 823 may use, for radio communication, a higher frequency band than a frequency band that is used by the radio communication interface 825.

The radio communication interface 825 supports any of cellular communication systems, such as Long Term Evolution (LTE) or LTE-Advanced, and provides radio communication to a terminal that is located in a cell of the eNB 800 via the antennas 810. The radio communication interface 825 may typically include baseband (BB) processors 826, RF circuits 827, and the like. The BB processors 826 may perform, for example, encoding/decoding, modulation/demodulation, multiplexing/inverse multiplexing, and the like, and perform various kinds of signal processing for each of layers (for example, L1, Media Access Control (MAC), Radio Link Control (RLC), and Packet Data Convergence Protocol (PDCP)). The BB processors 826 may include a part or all of the above-described logical functions, instead of the controller 821. The BB processors 826 may be modules each including a memory for storing a communication control program, a processor for executing the program, and a related circuit, and functions of the BB processors 826 may be changeable by updating the program. Further, the above-described modules may be card or blades that are inserted in a slot of the base station device 820, or may be chips that are mounted on the above-described cards or the above-described blades. In contrast, the RF circuits 827 may include mixers, filters, amplifiers, and the like, and transmit and receive radio signals via the antennas 810.

The radio communication interface 825 may include the plurality of BB processors 826 as illustrated in FIG. 26, and the plurality of BB processors 826 may respectively correspond to a plurality of frequency bands used by the eNB 800, for example. Further, the radio communication interface 825 may include the plurality of RF circuits 827 as illustrated in FIG. 26, and the plurality of RF circuits 827 may respectively correspond to a plurality of antenna elements, for example. Meanwhile, FIG. 26 illustrates an example in which the radio communication interface 825 includes the plurality of BB processors 826 and the plurality of RF circuits 827, but the radio communication interface 825 may include the single BB processor 826 or the single RF circuit 827.

In the eNB 800 illustrated in FIG. 26, one or more structural elements (the reporting unit 151 and/or the communication control unit 153) included in the control unit 150 described above with reference to FIG. 9 may be implemented by the radio communication interface 825. Alternatively, at least a part of the structural elements may be implemented by the controller 821. As one example, the eNB 800 may include a module that includes a part (for example, the BB processors 826) or the whole of the radio communication interface 825 and/or the controller 821, and the module may implement one or more of the above-described structural elements. In this case, the above-described module may store therein a program that causes a processor to function as one or more of the structural elements (in other words, a program that causes the processor to perform operation of one or more of the above-described structural elements), and execute the program. As another example, it may be possible to install, in the eNB 800, a program that causes a processor to function as one or more of the structural elements, and cause the radio communication interface 825 (for example, the BB processors 826) and/or the controller 821 to execute the program. As described above, it may be possible to provide the eNB 800, the base station device 820, or the above-described module as a device that includes one or more of the structural elements, and provide a program that causes a processor to function as one or more of the structural elements. Furthermore, it may be possible to provide a readable recording medium in which the above-described program is recorded.

Moreover, in the eNB 800 illustrated in FIG. 26, the radio communication unit 120 described above with reference to FIG. 9 may be implemented by the radio communication interface 825 (for example, the RF circuits 827). Furthermore, the antenna unit 110 may be implemented by the antenna 810. Moreover, the network communication unit 130 may be implemented by the controller 821 and/or the network interface 823. Furthermore, the storage unit 140 may be implemented by the memory 822.

Second Application Example

Figure 27:
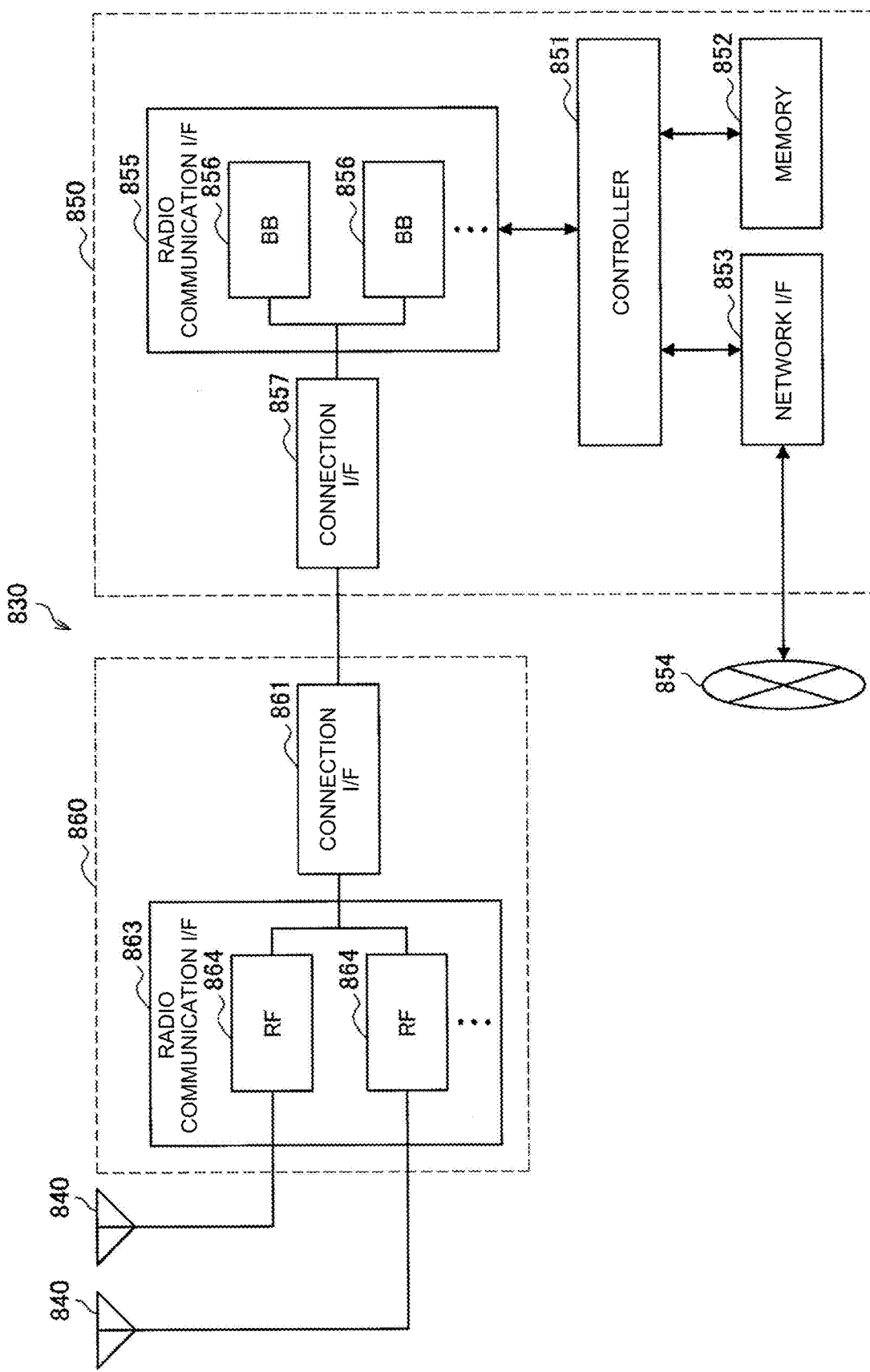
FIG. 27 is a block diagram illustrating a second example of a schematic configuration of an eNB.

FIG. 27 is a block diagram illustrating a second example of a schematic configuration of an eNB to which the technology according to the present disclosure is applicable. An eNB 830 includes one or more antennas 840, a base station device 850, and an RRH 860. All of the antennas 840 and the RRH 860 may be connected to one another via RF cables. Furthermore, the base station device 850 and the RRH 860 may be connected to each other via a high-speed line, such as an optical fiber cable.

Each of the antennas 840 includes one or more antenna elements (for example, a plurality of antenna elements that constitute a MIMO antenna), and is used for transmission and reception of radio signals by the RRH 860. The eNB 830 may include the plurality of antennas 840 as illustrated in FIG. 27, and the plurality of antennas 840 may respectively correspond to a plurality of frequency bands used by the eNB 830, for example. Meanwhile, while the example in which the eNB 830 includes the plurality of antennas 840 is illustrated in FIG. 27, the eNB 830 may include the single antenna 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described above with reference to FIG. 26.

The radio communication interface 855 supports any of cellular communication systems, such as LTE or LTE-Advanced, and provides radio communication to a terminal that is located in a sector corresponding to the RRH 860 via the RRH 860 and the antenna 840. The radio communication interface 855 may typically include BB processors 856 or the like. The BB processors 856 are the same as the BB processors 826 that are described above with reference to FIG. 26, except that the BB processors 856 are connected to RF circuits 864 of the RRH 860 via the connection interface 857. The radio communication interface 855 may include the plurality of BB processors 856 as illustrated in FIG. 27, and the plurality of BB processors 856 may respectively correspond to frequency bands used by the eNB 830, for example. Meanwhile, while the example in which the radio communication interface 855 includes the plurality of BB processors 856 is illustrated in FIG. 27, the radio communication interface 855 may include the single BB processor 856.

The connection interface 857 is an interface for connecting the base station device 850 (the radio communication interface 855) and the RRH 860. The connection interface 857 may be a communication module for communication via the above-described high-speed line that connects the base station device 850 (the radio communication interface 855) and the RRH 860.

Further, the RRH 860 includes a connection interface 861 and a radio communication interface 863.

The connection interface 861 is an interface for connecting the RRH 860 (the radio communication interface 863) and the base station device 850. The connection interface 861 may be a communication module for communication via the above-described high-speed line.

The radio communication interface 863 transmits and receives a radio signal via the antennas 840. The radio communication interface 863 may typically include the RF circuits 864 or the like. The RF circuits 864 may include mixers, filters, amplifiers, and the like, and transmit and receive radio signals via the antennas 840. The radio communication interface 863 may include the plurality of RF circuits 864 as illustrated in FIG. 27, and the plurality of RF circuits 864 may respectively correspond to a plurality of antenna elements, for example. Meanwhile, while the example in which the radio communication interface 863 includes the plurality of RF circuits 864 is illustrated in FIG. 27, the radio communication interface 863 may include the single RF circuit 864.

In the eNB 830 illustrated in FIG. 27, one or more structural elements (the reporting unit 151 and/or the communication control unit 153) included in the control unit 150 described above with reference to FIG. 9 may be implemented by the radio communication interface 855 and/or the radio communication interface 863. Alternatively, at least a part of the structural elements may be implemented by the controller 851. As one example, the eNB 830 may include a module that includes a part (for example, the BB processors 856) or the whole of the radio communication interface 855 and/or the controller 851, and the module may implement one or more of the above-described structural elements. In this case, the above-described module may store therein a program that causes a processor to function as one or more of the structural elements (in other words, a program that causes the processor to perform operation of one or more of the above-described structural elements), and execute the program. As another example, it may be possible to install, in the eNB 830, a program that causes a processor to function as one or more of the structural elements, and cause the radio communication interface 855 (for example, the BB processors 856) and/or the controller 851 to execute the program. As described above, it may be possible to provide the eNB 830, the base station device 850, or the above-described module as a device that includes one or more of the structural elements, and provide a program that causes a processor to function as one or more of the structural elements. Furthermore, it may be possible to provide a readable recording medium in which the above-described program is recorded.

Moreover, in the eNB 830 illustrated in FIG. 27, for example, the radio communication unit 120 described above with reference to FIG. 9 may be implemented by the radio communication interface 863 (for example, the RF circuits 864). Furthermore, the antenna unit 110 may be implemented by the antenna 840. Moreover, the network communication unit 130 may be implemented by the controller 851 and/or the network interface 853. Furthermore, the storage unit 140 may be implemented by the memory 852.

4.3. Application Examples of Terminal Device

First Application Example

Figure 28:
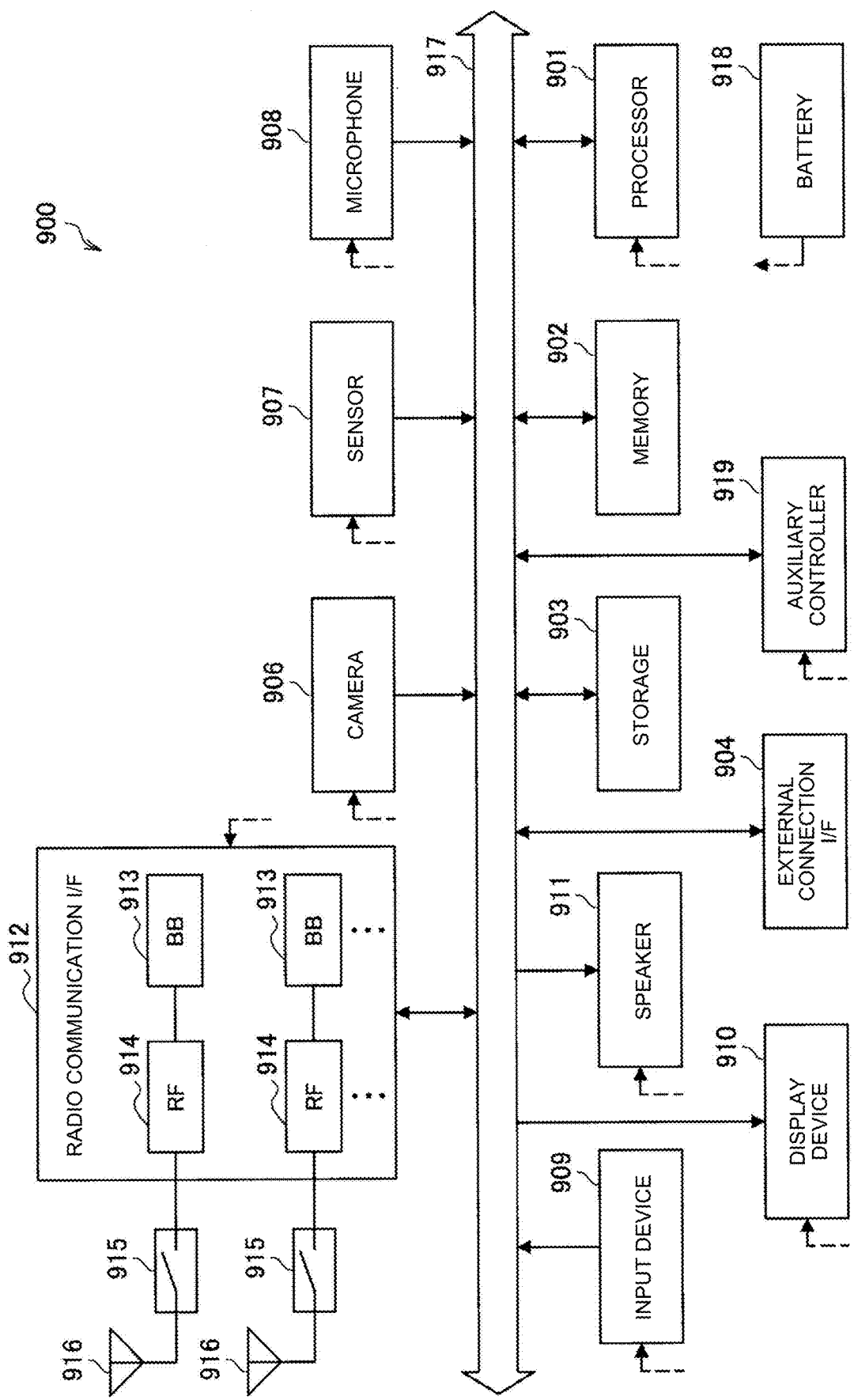
FIG. 28 is a block diagram illustrating an example of a schematic configuration of a smartphone.

FIG. 28 is a block diagram illustrating an example of a schematic configuration of a smartphone 900 to which the technology according to the present disclosure is applicable. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a System on Chip (SoC), and controls functions of an application layer and other layers of the smartphone 900. The memory 902 includes a RAM and a ROM, and stores therein a program to be executed by the processor 901 and data. The storage 903 may include a storage medium, such as a semiconductor memory or a hard disk. The external connection interface 904 is an interface for connecting an external device, such as a memory card or a Universal Serial Bus (USB) device, to the smartphone 900.

The camera 906 includes, for example, an imaging element, such as a Charge Coupled Device (CCD) or a Complementary Metal Oxide Semiconductor (CMOS), and generates a captured image. The sensor 907 may include, for example, a group of sensors, such as a ranging sensor, a gyro sensor, a geomagnetic sensor, and an acceleration sensor. The microphone 908 converts voice input to the smartphone 900 into a voice signal. The input device 909 may include, for example, a touch sensor that detects touch on a screen of the display device 910, a keypad, a keyboard, a button, a switch, or the like, and receives operation or input of information from a user. The display device 910 includes a screen, such as a liquid crystal display (LCD) or an organic light emitting diode (OLED) display, and displays an output image of the smartphone 900. The speaker 911 converts a voice signal output from the smartphone 900 into voice.

The radio communication interface 912 supports any of cellular communication systems, such as LTE or LTE-Advanced, and performs radio communication. The radio communication interface 912 may typically include BB processors 913, RF circuits 914, and the like. The BB processors 913 may perform, for example, encoding/decoding, modulation/demodulation, multiplexing/inverse multiplexing, and the like, and perform various kinds of signal processing for radio communication. In contrast, the RF circuits 914 may include mixers, filters, amplifiers, and the like, and transmit and receive radio signals via the antennas 916. The radio communication interface 912 may be a one-chip module in which the BB processors 913 and the RF circuits 914 are integrated. The radio communication interface 912 may include the plurality of BB processors 913 and the plurality of RF circuits 914 as illustrated in FIG. 28. Meanwhile, while the example in which the radio communication interface 912 includes the plurality of BB processors 913 and the plurality of RF circuits 914 is illustrated in FIG. 28, the radio communication interface 912 may include the single BB processor 913 or the single RF circuit 914.

Furthermore, the radio communication interface 912 may support other kinds of radio communication systems, such as a near-field radio communication system, a near-field radio communication system, or a radio Local Area Network (LAN) system, in addition to the cellular communication system, and, in this case, it may be possible to include the BB processor 913 and the RF circuit 914 for each of the radio communication systems.

Each of the antenna switches 915 switches connection destinations of the antennas 916 in a plurality of circuits (for example, circuits for different radio communication systems) that are included in the radio communication interface 912.

Each of the antennas 916 includes one or more antenna elements (for example, a plurality of antenna elements that constitute a MIMO antenna), and is used for transmission and reception of radio signals by the radio communication interface 912. The smartphone 900 may include the plurality of antennas 916 as illustrated in FIG. 28. While the example in which the smartphone 900 includes the plurality of antennas 916 is illustrated in FIG. 28, the smartphone 900 may include the single antenna 916.

Further, the smartphone 900 may include the antenna 916 for each of the radio communication systems. In this case, the antenna switch 915 may be omitted in the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to one another. The battery 918 supplies electric power to each of the blocks of the smartphone 900 illustrated in FIG. 28 via power supply lines that are partially indicated by dashed lines in the figure. The auxiliary controller 919 operates a minimum function of the smartphone 900 in a sleep mode, for example.

In the smartphone 900 illustrated in FIG. 28, one or more structural elements (the reporting unit 241 and/or the communication control unit 243) included in the control unit 240 described above with reference to FIG. 10 may be implemented by the radio communication interface 912. Alternatively, at least a part of the structural elements may be implemented by the processor 901 or the auxiliary controller 919. As one example, the smartphone 900 may include a module that includes a part (for example, the BB processor 913) or the whole of the radio communication interface 912, the processor 901, and/or the auxiliary controller 919, and the module may implement one or more of the above-described structural elements. In this case, the above-described module may store therein a program that causes a processor to function as one or more of the structural elements (in other words, a program that causes the processor to perform operation of one or more of the above-described structural elements), and execute the program. As another example, it may be possible to install, in the smartphone 900, a program that causes a processor to function as one or more of the structural elements, and cause the radio communication interface 912 (for example, the BB processors 913), the processor 901, and/or the auxiliary controller 919 to execute the program. As described above, it may be possible to provide the smartphone 900 or the above-described module as a device that includes one or more of the structural elements, and provide a program that causes a processor to function as one or more of the structural elements. Furthermore, it may be possible to provide a readable recording medium in which the above-described program is recorded.

Moreover, in the smartphone 900 illustrated in FIG. 28, for example, the radio communication unit 220 described above with reference to FIG. 10 may be implemented by the radio communication interface 912 (for example, the RF circuits 914). Furthermore, the antenna unit 210 may be implemented by the antenna 916. Moreover, the storage unit 230 may be implemented by the memory 902.

Second Application Example

Figure 29:
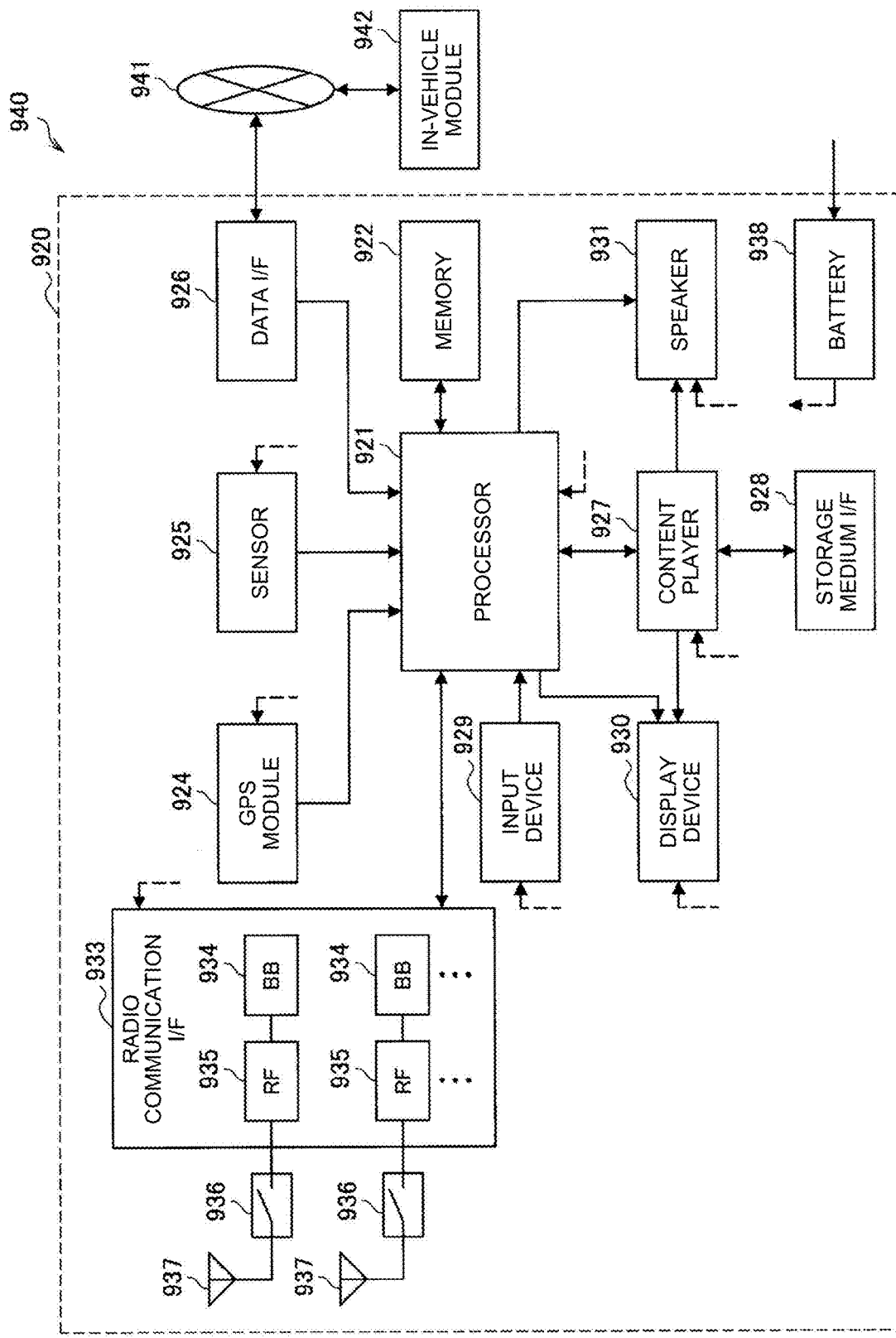
FIG. 29 is a block diagram illustrating an example of a configuration of a car navigation device.

FIG. 29 is a block diagram illustrating an example of a configuration of a car navigation device 920 to which the technology according to the present disclosure is applicable. The car navigation device 920 includes a processor 921, a memory 922, a Global Positioning System (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or an SoC, and controls a navigation function and other functions of the car navigation device 920. The memory 922 includes a RAM and a ROM, and stores therein a program to be executed by the processor 921 and data.

The GPS module 924 measures a position (for example, a latitude, a longitude, and an altitude) of the car navigation device 920 by using a GPS signal received from a GPS satellite. The sensor 925 may include, for example, a group of sensors, such as a gyro sensor, a geomagnetic sensor, and an atmospheric pressure sensor. The data interface 926 is connected to, for example, an in-vehicle network 941 via a terminal (not illustrated), and acquires data, such as vehicle speed data, that is generated on a vehicle side.

The content player 927 replays a content that is stored in a storage medium (for example, a CD or a DVD) that is inserted in the storage medium interface 928. The input device 929 includes, for example, a touch sensor that detects touch on a screen of the display device 930, a button, a switch, or the like, and receives operation or input of information from a user. The display device 930 includes a screen, such as an LCD or an OLED display, and displays an image of a navigation function or a replayed content. The speaker 931 outputs voice of the navigation function or the replayed content.

The radio communication interface 933 supports any of cellular communication systems, such as LTE or LTE-Advanced, and performs radio communication. The radio communication interface 933 may typically include BB processors 934, RF circuits 935, and the like. The BB processors 934 may perform, for example, encoding/decoding, modulation/demodulation, multiplexing/inverse multiplexing, and the like, and perform various kinds of signal processing for radio communication. In contrast, the RF circuits 935 may include mixers, filters, amplifiers, and the like, and transmit and receive radio signals via the antenna 937. The radio communication interface 933 may be a one-chip module in which the BB processors 934 and the RF circuits 935 are integrated. The radio communication interface 933 may include the plurality of BB processors 934 and the plurality of RF circuits 935 as illustrated in FIG. 29. Meanwhile, while the example in which the radio communication interface 933 includes the plurality of BB processors 934 and the plurality of RF circuits 935 is illustrated in FIG. 29, the radio communication interface 933 may include the single BB processor 934 or the single RF circuit 935.

Furthermore, the radio communication interface 933 may support other kinds of radio communication systems, such as a near-field radio communication system, a near-field radio communication system, or a radio LAN system, in addition to the cellular communication system, and, in this case, it may be possible to include the BB processor 934 and the RF circuit 935 for each of the radio communication systems.

Each of the antenna switches 936 switches connection destinations of the antennas 937 in a plurality of circuits (for example, circuits for different radio communication systems) that are included in the radio communication interface 933.

Each of the antennas 937 includes one or more antenna elements (for example, a plurality of antenna elements that constitute a MIMO antenna), and is used for transmission and reception of radio signals by the radio communication interface 933. The car navigation device 920 may include the plurality of antennas 937 as illustrated in FIG. 29. Meanwhile, while the example in which the car navigation device 920 includes the plurality of antennas 937 is illustrated in FIG. 29, the car navigation device 920 may include the single antenna 937.

Further, the car navigation device 920 may include the antenna 937 for each of the radio communication systems. In this case, the antenna switch 936 may be omitted in the configuration of the car navigation device 920.

The battery 938 supplies electric power to each of the blocks of the car navigation device 920 illustrated in FIG. 29 via power supply lines that are partially indicated by dashed lines in the figure. Furthermore, the battery 938 accumulates electric power supplied from the vehicle side.

In the car navigation device 920 illustrated in FIG. 29, one or more structural elements (the reporting unit 241 and/or the communication control unit 243) included in the control unit 240 described above with reference to FIG. 10 may be implemented by the radio communication interface 933. Alternatively, at least a part of the structural elements may be implemented by the processor 921. As one example, the car navigation device 920 may include a module that includes a part (for example, the BB processors 934) or the whole of the radio communication interface 933 and/or the processor 921, and the module may implement one or more of the above-described structural elements. In this case, the above-described module may store therein a program that causes a processor to function as one or more of the structural elements (in other words, a program that causes the processor to perform operation of one or more of the above-described structural elements), and execute the program. As another example, it may be possible to install, in the car navigation device 920, a program that causes a processor to function as one or more of the structural elements, and cause the radio communication interface 933 (for example, the BB processors 934) and/or the processor 921 to execute the program. As described above, it may be possible to provide the car navigation device 920 or the above-described module as a device that includes one or more of the structural elements, and provide a program that causes a processor to function as one or more of the structural elements. Furthermore, it may be possible to provide a readable recording medium in which the above-described program is recorded.

Moreover, in the car navigation device 920 illustrated in FIG. 29, for example, the radio communication unit 220 described above with reference to FIG. 10 may be implemented by the radio communication interface 933 (for example, the RF circuit 935). Furthermore, the antenna unit 210 may be implemented by the antenna 937. Moreover, the storage unit 230 may be implemented by the memory 922.

Furthermore, the technology according to the present disclosure may be realized as an in-vehicle system (or a vehicle) 940 that includes one or more of the blocks of the car navigation device 920 described above, the in-vehicle network 941, and an in-vehicle module 942. The in-vehicle module 942 generates vehicle-side data, such as vehicle speed, engine speed, or failure information, and outputs the generated data to the in-vehicle network 941.

5. CONCLUSION

Thus, one embodiment of the present disclosure has been described in detail above with reference to FIG. 1 to FIG. 29. As described above, the terminal device 200 according to the present embodiment performs communication using at least any of network slices. Further, the terminal device 200 reports, to the NSME 300 that controls the plurality of network slices, information used to determine resource allocation to the network slice to be used. The NSME 300 determines resource allocation on the basis of the information reported from the terminal device 200, so that it is possible to set an appropriate amount of resources to be allocated to the network slice used by the terminal device 200.

Specifically, the terminal device 200 reports, to the NSME 300, the traffic prediction information that is information for predicting traffic that may occur in the future in the network slice used by the terminal device 200. With this configuration, the network slice capacity is controlled in expectation of traffic that may occur in the future in the network slice used by the terminal device 200. Therefore, it is possible to set an appropriate network slice capacity and improve resource efficiency.

Furthermore, the terminal device 200 reports, to the NSME 300, the performance measurement information that is information indicating a measurement result of performance of the network slice used by the terminal device 200. With this configuration, the network slice capacity is controlled in accordance with current conditions of the network slice used by the terminal device 200. Therefore, it is possible to set an appropriate network slice capacity and improve resource efficiency.

Moreover, the NSME 300 determines resource allocation to the network slice used by the terminal device 200, on the basis of the information reported from the terminal device 200. Specifically, the NSME 300 controls the network slice capacity in expectation of traffic that may occur in the future in the network slice used by the terminal device 200 and/or in accordance with current conditions of the network slice used by the terminal device 200. Therefore, it is possible to set an appropriate network slice capacity and improve resource efficiency.

Furthermore, the base station 100, the MEC application server 41, the MCE 42, the S-GW 51, and the MME 53 report at least any of the traffic prediction information and the performance measurement information to the NSME 300. With this configuration, similarly to the case in which the information is reported from the terminal device 200, it is possible to set an appropriate network slice capacity and improve resource efficiency.

While the preferred embodiments of the present disclosure have been described in detail above with reference to the accompanying drawings, the technical scope of the present disclosure is not limited to the examples as described above. It is obvious that a person skilled in the technical field of the present disclosure may conceive various alternations and modifications within the scope of the appended claims, and it should be understood that they will naturally come under the technical scope of the present disclosure.

Furthermore, processes explained using the flowcharts and the sequence diagrams in the present specification need not always be performed in the same order as illustrated in the drawings. Some of the processing steps may be performed in a parallel manner. Moreover, it may be possible to adopt an additional processing step, or some of the processing steps may be omitted.

In addition, the effects described in the present specification are merely illustrative or exemplary, and not limiting. That is, the technology according to the present disclosure may exhibit other effects apparent to those skilled in the art from the description of the present specification, in addition to or instead of the effects described above.

The following configurations are also within the technical scope of the present disclosure.

(1)

A terminal device that performs communication using at least any of network slices, the terminal device comprising:
a control unit configured to report information to a communication control device, the information being used to determine resource allocation to a network slice used by the terminal device, the communication control device controlling the plurality of network slices.

(2)

The terminal device according to (1), wherein the information used to determine resource allocation to the network slice used by the terminal device includes first information for predicting traffic that may occur in the network slice used by the terminal device.

(3)

The terminal device according to (2), wherein the first information includes at least one of a time at which communication using the network slice is started, duration, a ratio of an RRC state, and requirement for the network slice.

(4)

The terminal device according to any one of (1) to (3), wherein the information used to determine resource allocation to the network slice used by the terminal device includes second information indicating a measurement result of performance of the network slice used by the terminal device.

(5)

The terminal device according to (4), wherein the second information includes information on a measurement result of performance of a segment for which the terminal device serves as one end among a plurality of segments included in the network slice used by the terminal device.

(6)

The terminal device according to (5), wherein the control unit measures performance for each QoS.

(7)

The terminal device according to any one of (1) to (6), wherein the control unit reports information that is used to determine resource allocation to the network slice used by the terminal device, in response to a request from the communication control device.

(8)

The terminal device according to any one of (1) to (7), wherein the control unit reports capability information indicating whether it is possible to report the information used to determine resource allocation to the network slice used by the terminal device.

(9)

A communication control device that controls a plurality of network slices, the communication control device comprising:
a control unit configured to determine resource allocation to a network slice used by a terminal device that performs communication using at least any of the network slices, on the basis of information that is reported from the terminal device and that is used to determine resource allocation to the network slice used by the terminal device.

(10)

The communication control device according to (9), wherein the information used to determine resource allocation to the network slice used by the terminal device includes first information for predicting traffic that may occur in the network slice used by the terminal device.

(11)

The communication control device according to (10), wherein a message for requesting a report of the first information is transmitted to the terminal device by using, as a trigger, a start of an application provided to the terminal device.

(12)

The communication control device according to any one of (9) to (11), wherein the information used to determine resource allocation to the network slice used by the terminal device includes second information indicating a measurement result of performance of the network slice used by the terminal device.

(13)

The communication control device according to (12), wherein the control unit collects the second information on each of segments included in the network slice used by the terminal device, from entities at ends of the segments.

(14)

A base station that provides a radio communication service to a terminal device that performs communication using at least any of network slices, the base station comprising:
a control unit configured to report second information to a communication control device, the second information being used to determine resource allocation to a network slice used by the terminal device, the communication control device controlling the plurality of network slices.

(15)

The base station according to (14), wherein the second information includes information indicating a measurement result of performance for each QoS with respect to a segment for which the base station serves as one end among a plurality of segments included in the network slice used by the terminal device.

(16)

The base station according to (14) or (15), wherein the control unit reports capability information indicating whether it is possible to report the second information.

(17)

A gateway device that relays information that is transmitted and received by a terminal device that performs communication using at least any of network slices, the gateway device comprising:
a control unit configured to report second information to a communication control device, the second information being used to determine resource allocation to a network slice used by the terminal device, the communication control device controlling the plurality of network slices.

(18)

The gateway device according to (17), wherein the second information includes information indicating a measurement result of performance for each QoS with respect to a segment for which the gateway device serves as one end among a plurality of segments included in the network slice used by the terminal device.

(19)

A control device that provides a service using a network slice to a terminal device that performs communication using at least any of network slices, the control device comprising:

a control unit configured to report first information to a communication control device, the first information being used to determine resource allocation to a network slice used by the terminal device, the communication control device controlling the plurality of network slices.

(20)

The control device according to (19), wherein the service is a service for an MEC application.

(21)

The control device according to (20), wherein the first information includes location information on the MEC application.

(22)

The control device according to (19), wherein the service is a service for Multimedia Broadcast and Multicast Service (MBMS).

(23)

The control device according to (22), wherein the first information includes information indicating a traffic volume of each of broadcast, multicast, and unicast.

(24)

The control device according to (22) or (23), wherein the first information includes identification information on a base station that broadcasts an MBMS content.

(25)

A method implemented by a terminal device that performs communication using at least any of network slices, the method comprising:

reporting information to a communication control device, the information being used to determine resource allocation to a network slice used by the terminal device, the communication control device controlling the plurality of network slices.

(26)

A method implemented by a communication control device that controls a plurality of network slices, the method comprising:

determining resource allocation to a network slice used by a terminal device that performs communication using at least any of the network slices, on the basis of information that is reported from the terminal device and that is used to determine resource allocation to the network slice used by the terminal device.

(27)

A method implemented by a base station that provides a radio communication service to a terminal device that performs communication using at least any of network slices, the method comprising:

reporting second information to a communication control device, the second information being used to determine resource allocation to a network slice used by the terminal device, the communication control device controlling the plurality of network slices.

(28)

A method implemented by a gateway device that relays information that is transmitted and received by a terminal device that performs communication using at least any of network slices, the method comprising:

reporting second information to a communication control device, the second information being used to determine resource allocation to a network slice used by the terminal device, the communication control device controlling the plurality of network slices.

(29)

A method implemented by a control device that provides a service using a network slice to a terminal device that performs communication using at least any of network slices, the method comprising:

reporting first information to a communication control device, the first information being used to determine resource allocation to a network slice used by the terminal device, the communication control device controlling the plurality of network slices.

(30)

A recording medium storing therein a program that causes a computer for controlling a terminal device that performs communication using at least any of network slices to execute:

reporting information to a communication control device, the information being used to determine resource allocation to a network slice used by the terminal device, the communication control device controlling the plurality of network slices.

(31)

A recording medium storing therein a program that causes a computer for controlling a communication control device that controls a plurality of network slices to execute:

determining resource allocation to a network slice used by a terminal device that performs communication using at least any of the network slices, on the basis of information that is reported from the terminal device and that is used to determine resource allocation to the network slice used by the terminal device.

(32)

A recording medium storing therein a program that causes a computer for controlling a base station that provides a radio communication service to a terminal device that performs communication using at least any of network slices to execute:

reporting second information to a communication control device, the second information being used to determine resource allocation to a network slice used by the terminal device, the communication control device controlling the plurality of network slices.

(33)

A recording medium storing therein a program that causes a computer for controlling a gateway device that relays information that is transmitted and received by a terminal device that performs communication using at least any of network slices to execute:

reporting second information to a communication control device, the second information being used to determine resource allocation to a network slice used by the terminal device, the communication control device controlling the plurality of network slices.

(34)

A recording medium storing therein a program that causes a computer for controlling a control device that provides a service using a network slice to a terminal device that performs communication using at least any of network slices to execute:

reporting first information to a communication control device, the first information being used to determine resource allocation to a network slice used by the terminal device, the communication control device controlling the plurality of network slices.

REFERENCE SIGNS LIST 1 system
11 cell
20 core network
30 PDN (Packet Data Network)
41 MEC application server
42 MCE
51 S-GW
52 P-GW
53 MME
54 HSS
55 MBMS gateway
56 BM-SC
57 content server
61 original server
100 base station
110 antenna unit
120 radio communication unit
130 network communication unit
140 storage unit
150 control unit
151 reporting unit
153 communication control unit
200 terminal device
210 antenna unit
220 radio communication unit
230 storage unit
240 control unit
241 reporting unit
243 communication control unit
300 NSME
310 network communication unit
320 storage unit
330 control unit
331 acquisition unit
333 network slice control unit
410 network communication unit
420 storage unit
430 control unit
431 reporting unit
433 service providing unit
510 network communication unit
520 storage unit
530 control unit
531 reporting unit
533 communication control unit

The invention claimed is:

1. A terminal device that performs communication using at least one of a plurality of network slices, the terminal device comprising:
a control circuitry configured to:
report information to a communication control device, the information being used to determine a resource allocation to a network slice of the plurality of network slices used by the terminal device, the communication control device controlling the plurality of network slices,
wherein the information used to determine the resource allocation to the network slice used by the terminal device includes first information for predicting traffic that may occur in the network slice used by the terminal device,
wherein the first information includes each of a time at which communication using the network slice is started, a duration that the terminal device will use the network slice, a ratio of a Radio Resource Control (RRC) state, and a requirement for the network slice, and
wherein the ratio of the RRC state comprises a ratio of parameter, the parameters including an RRC idle state, an RRC connection state, and an RRC inactive state, and
receive the determined resource allocation from the communication control device.

2. The terminal device according to claim 1; wherein the information used to determine the resource allocation to the network slice used by the terminal device includes second information indicating a measurement result of performance of the network slice used by the terminal device.

3. The terminal device according to claim 2, wherein the second information includes information on a measurement result of performance of a segment for which the terminal device serves as one end among a plurality of segments included in the network slice used by the terminal device.

4. The terminal device according to claim 3, wherein the control circuitry measures performance for each quality of service (QoS).

5. The terminal device according to claim 1, wherein the control circuitry reports the information that is used to determine the resource allocation to the network slice used by the terminal device, in response to a request from the communication control device.

6. The terminal device according to claim 1, wherein the control circuitry reports capability information indicating whether it is possible to report the information used to determine the resource allocation to the network slice used by the terminal device.

7. A communication control device that controls a plurality of network slices, the communication control device comprising:
a control circuitry configured to:
receive information from a terminal device,
determine a resource allocation to a network slice of the plurality of network slices used by a terminal device that performs communication using at least one of a plurality of network slices, on the basis of the information that is reported from the terminal device and that is used to determine resource allocation to the network slice used by the terminal device,
wherein the information used to determine the resource allocation to the network slice used by the terminal device includes first information for predicting traffic that may occur in the network slice used by the terminal device,
wherein the first information includes each of a time at which communication using the network slice is started, a duration that the terminal device will use the network slice, a ratio of a Radio Resource Control (RRC) state, and a requirement for the network slice, and
wherein the ratio of the RRC state comprises a ratio of parameter, the parameters including an RRC idle state, an RRC connection state, and an RRC inactive state, and transmit the determined resource allocation to the terminal device.

8. The communication control device according to claim 7, wherein the information used to determine the resource allocation to the network slice used by the terminal device includes second information indicating a measurement result of performance of the network slice used by the terminal device.

9. A method implemented by a terminal device that performs communication using at least one of a plurality of network slices, the method comprising:
reporting information to a communication control device, the information being used to determine a resource allocation to a network slice of the plurality of network slices used by the terminal device, the communication control device controlling the plurality of network slices,
wherein the information used to determine the resource allocation to the network slice used by the terminal device includes first information for predicting traffic that may occur in the network slice used by the terminal device,
wherein the first information includes each of a time at which communication using the network slices started, a duration that the terminal device will use the network s ratio of a Radio Resource Control (RRC) state, and a requirement for the network slice, and
wherein the ratio of the RRC state comprises a ratio of parameter, the parameters including an RRC idle state, an RRC connection state, and an RRC inactive state; and
receiving the determined resource allocation from the communication control device.

10. A method implemented by a communication control device that controls a plurality of network slices, the method comprising:
receiving information from a terminal device;
determining a resource allocation to a network slice of the plurality of network slices used by the terminal device that performs communication using at least one of a plurality of the network slices, on the basis of the information that is reported from the terminal device and that is used to determine resource allocation to the network slice used by the terminal device,
wherein the information used to determine the resource allocation to the network slice used by the terminal device includes first information for predicting tragic that may occur in the network slice used by the terminal device,
wherein the first information includes each of a time at which communication using the network slice is started, a duration that the terminal device will use the network slice, a ratio of a Radio Resource Control (RRC) state, and a requirement for the network slice, and
wherein the ratio of the RRC state comprises a ratio of parameter, the parameters including an RRC idle state, an RRC connection state and an RRC inactive state; and
transmitting the determined resource allocation to the terminal device.

\* \* \* \* \*